US009172874B2

(12) United States Patent
Kunishige et al.

(10) Patent No.: US 9,172,874 B2
(45) Date of Patent: Oct. 27, 2015

(54) IMAGING APPARATUS AND IMAGE GENERATION METHOD FOR GENERATING ONE PIECE OF IMAGE INCLUDING A MOVING IMAGE AND STILL IMAGE

(71) Applicant: OLYMPUS IMAGING CORP., Shibuya-ku, Tokyo (JP)

(72) Inventors: Keiji Kunishige, Hachioji (JP); Yoji Watanabe, Fuchu (JP); Yoichiro Okumura, Hino (JP)

(73) Assignee: OLYMPUS CORPORATION (JP)

( * ) Notice: Subject to any disclaimer, the term of this patent is extended or adjusted under 35 U.S.C. 154(b) by 25 days.

(21) Appl. No.: 14/021,273

(22) Filed: Sep. 9, 2013

(65) Prior Publication Data
US 2014/0071306 A1    Mar. 13, 2014

(30) Foreign Application Priority Data
Sep. 11, 2012  (JP) ................. 2012-199952

(51) Int. Cl.
*H04N 5/225*    (2006.01)
*H04N 5/232*    (2006.01)

(52) U.S. Cl.
CPC ........... *H04N 5/23245* (2013.01); *H04N 5/232* (2013.01)

(58) Field of Classification Search
CPC ........................ H04N 1/212; H04N 5/23245
USPC ............................................. 348/239, 220.1
See application file for complete search history.

(56) References Cited

U.S. PATENT DOCUMENTS

| | | | | |
|---|---|---|---|---|
| 2002/0197067 | A1* | 12/2002 | Ohnishi | 386/120 |
| 2004/0189823 | A1* | 9/2004 | Shibutani | 348/231.1 |
| 2007/0188621 | A1* | 8/2007 | Kitagawa | 348/211.99 |
| 2009/0033754 | A1* | 2/2009 | Yoshikawa | 348/220.1 |
| 2009/0309988 | A1* | 12/2009 | Kubo et al. | 348/220.1 |
| 2011/0050942 | A1* | 3/2011 | Migiyama et al. | 348/222.1 |

FOREIGN PATENT DOCUMENTS

| | | |
|---|---|---|
| JP | 2004-297177 | 10/2004 |
| JP | 2007-215086 | 8/2007 |

* cited by examiner

*Primary Examiner* — Twlyer Haskins
*Assistant Examiner* — Dwight C Tejano
(74) *Attorney, Agent, or Firm* — Volpe and Koenig, P.C.

(57) ABSTRACT

An imaging apparatus generates one piece of image including a moving image and a still image which are continuously shot. The apparatus includes an imaging unit, a still image acquisition instruction unit, a moving image acquisition start instruction unit, a time measuring unit, and a moving image time determination unit. The imaging unit acquires the moving image and the still image. The moving image acquisition start instruction unit instructs to start acquisition of the moving image prior to acquisition of the still image. The time measuring unit measures a time from a start of acquisition of the moving image to acquisition of the still image. The moving image time determination unit determines a moving image time which is a time of the moving image included in the image.

6 Claims, 39 Drawing Sheets

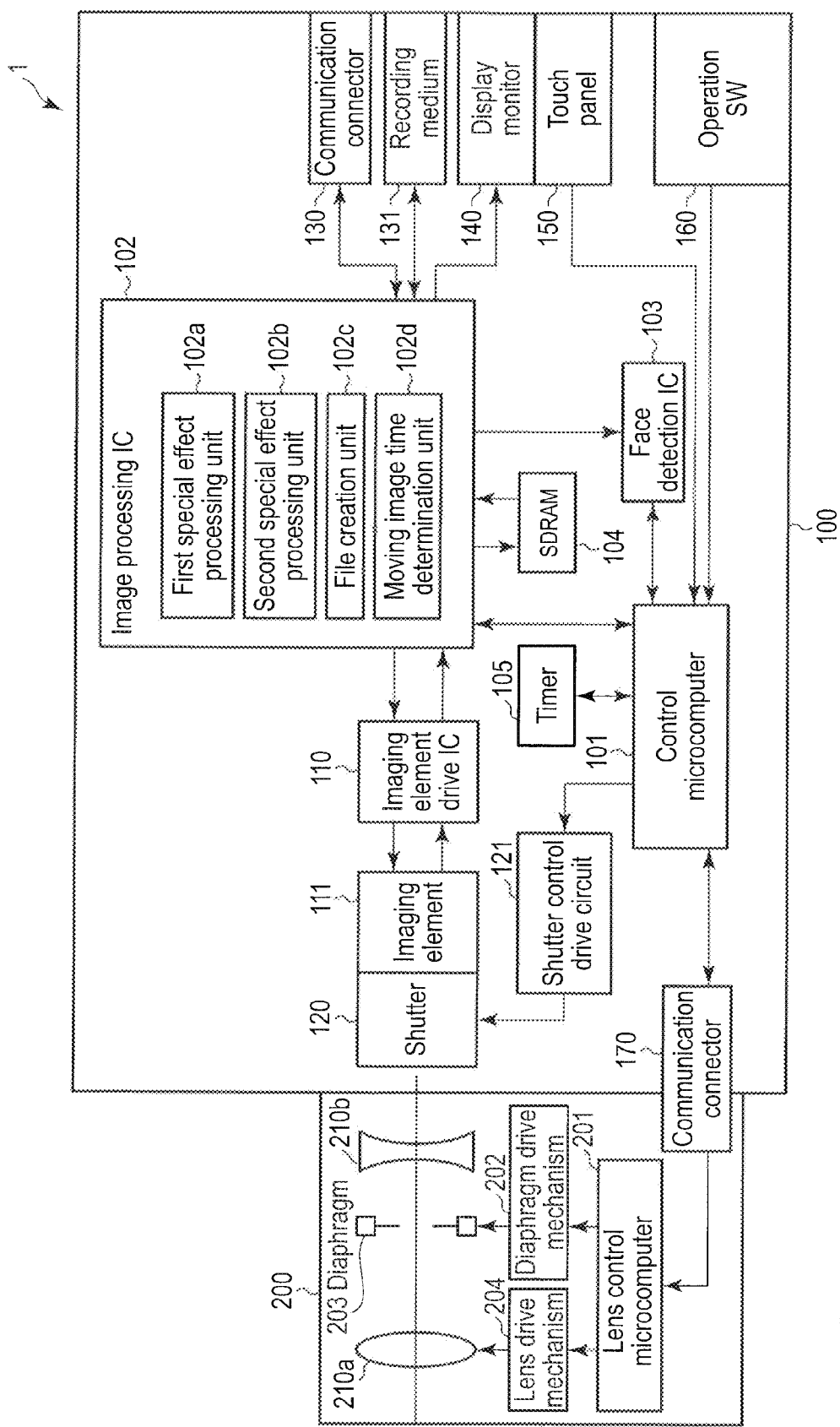
F I G. 4

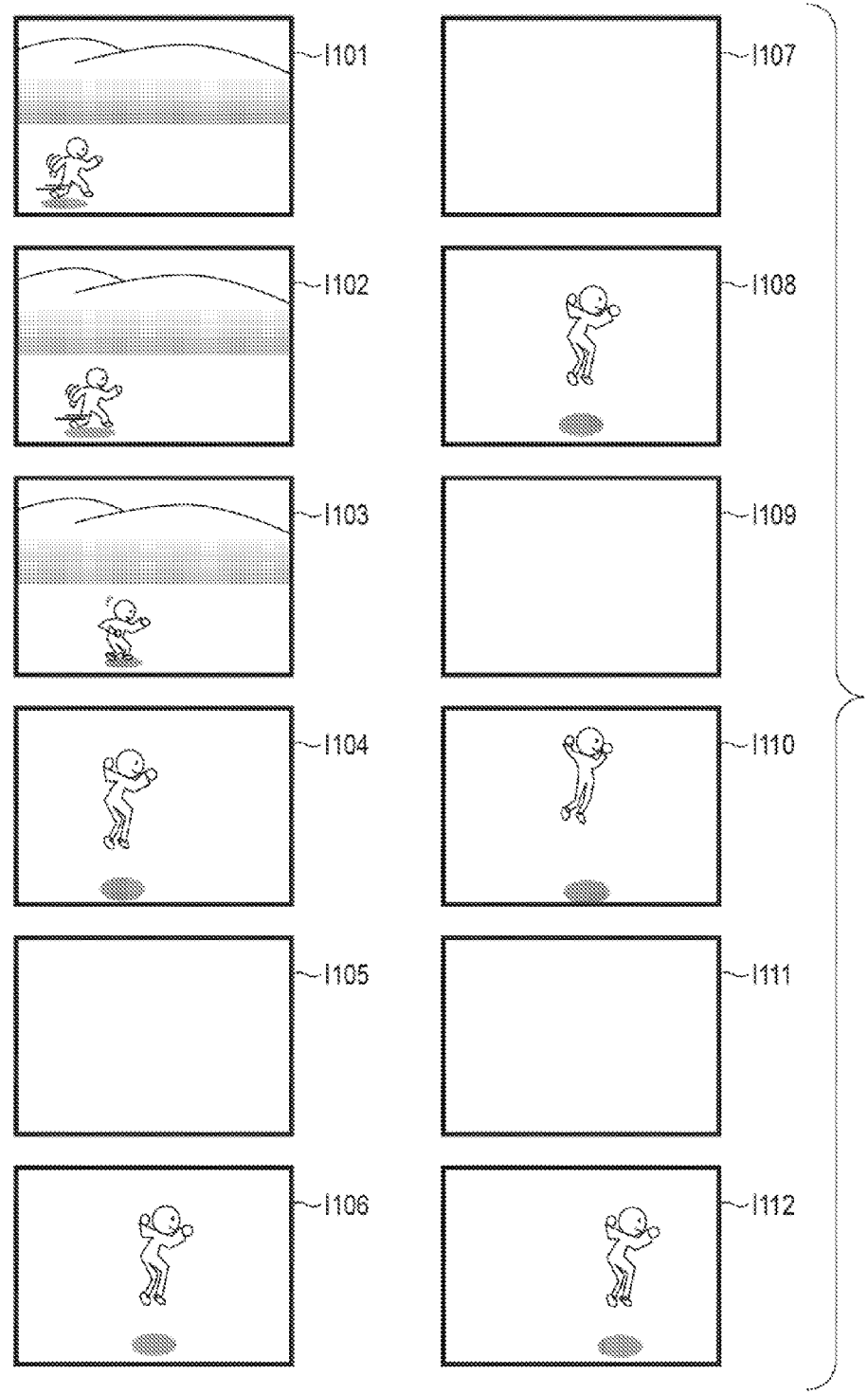
F I G. 6A

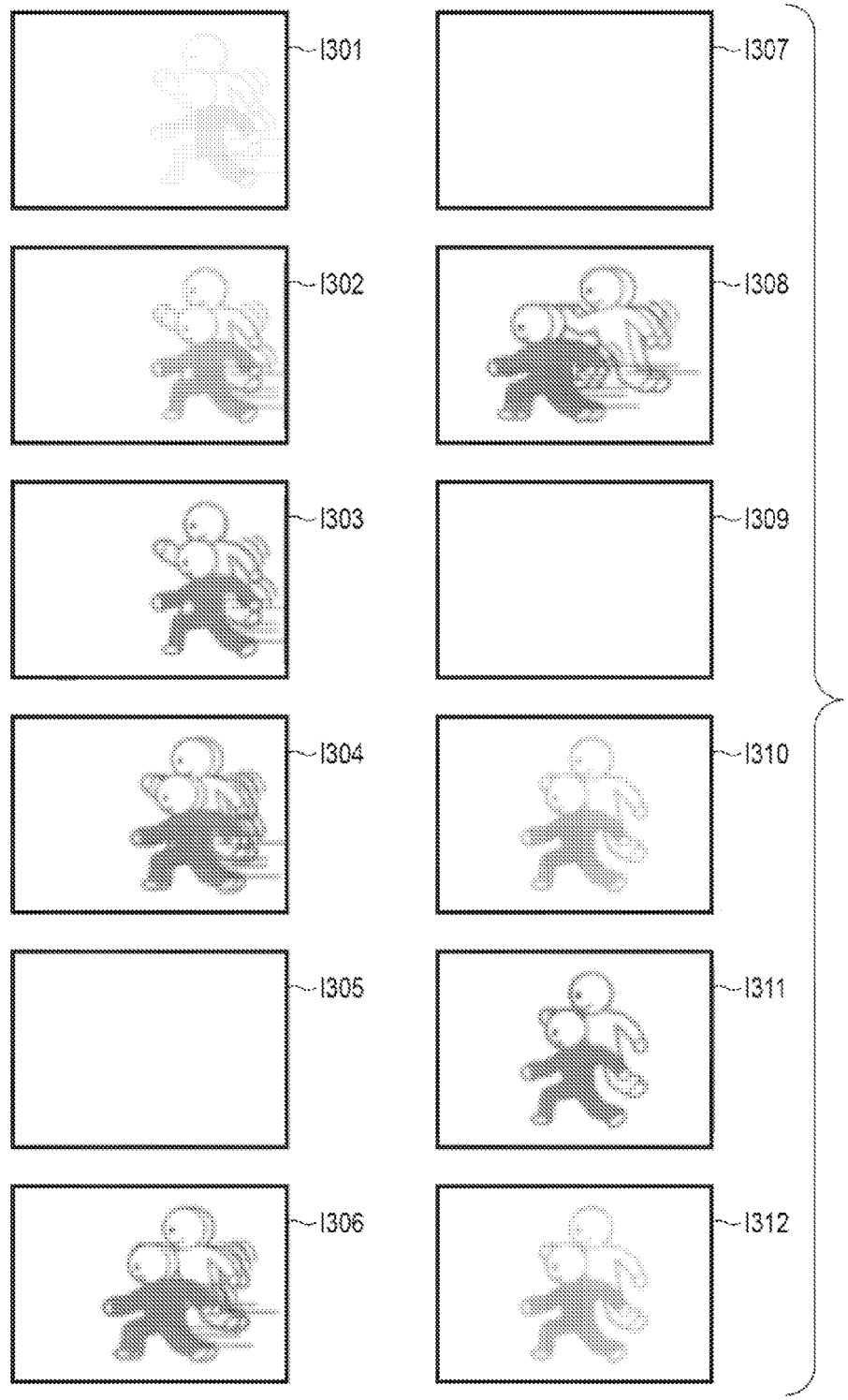
F I G. 10A

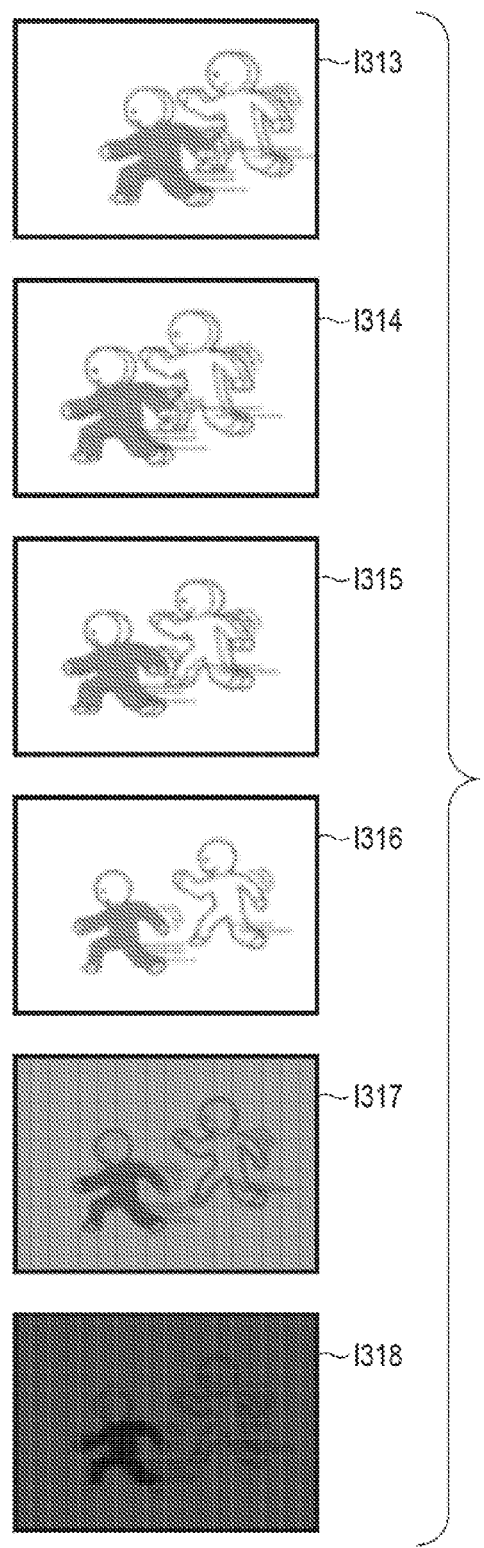
F I G. 10B

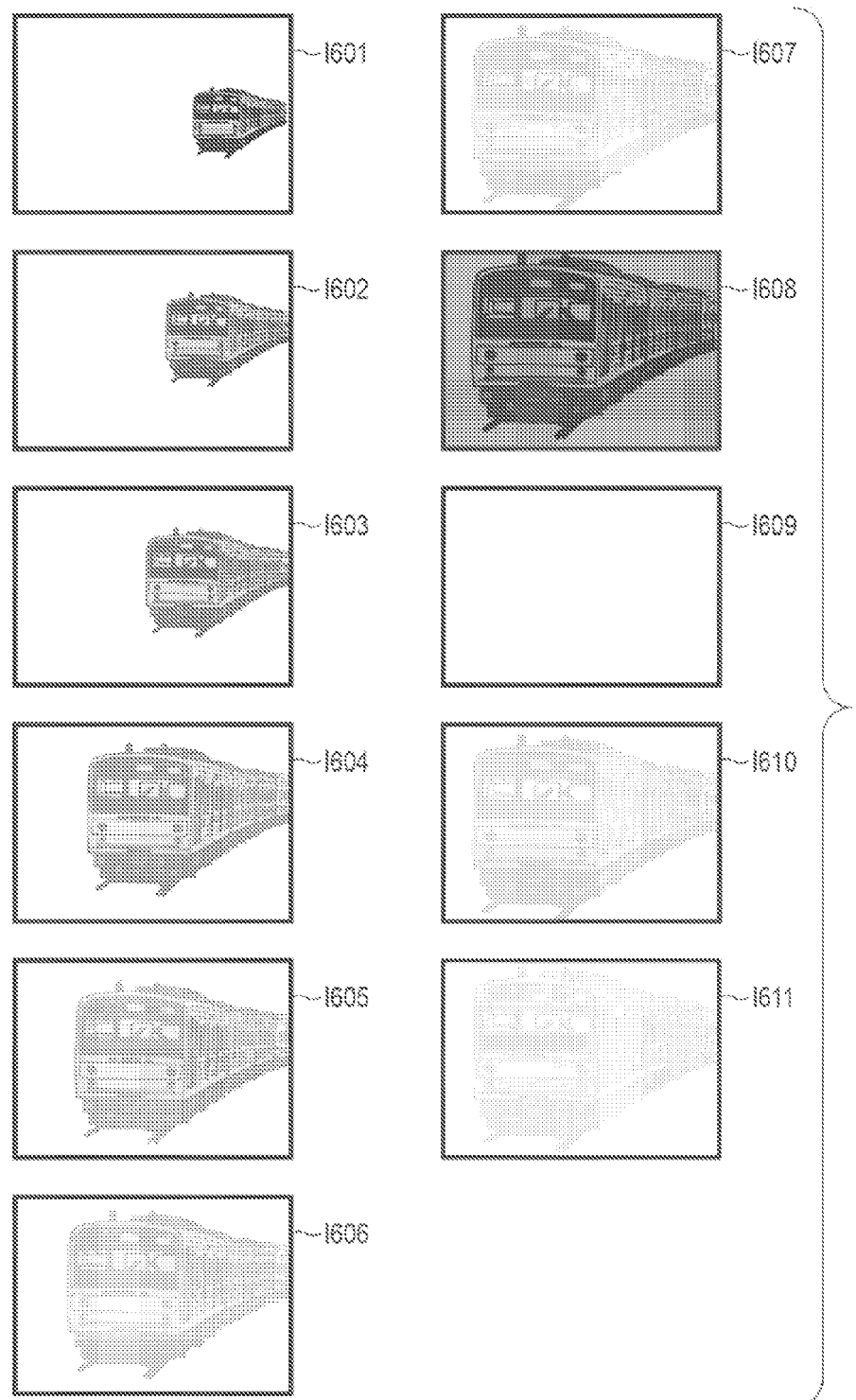
F I G. 16

F I G. 21A

| First special effect moving image portion | |
|---|---|
| First moving image portion | First transition portion / Still image portion |

F I G. 21B

| First special effect moving image portion | | Second special effect moving image portion | |
|---|---|---|---|
| First moving image portion | First transition portion / Still image portion | Second transition portion | Second moving image portion |

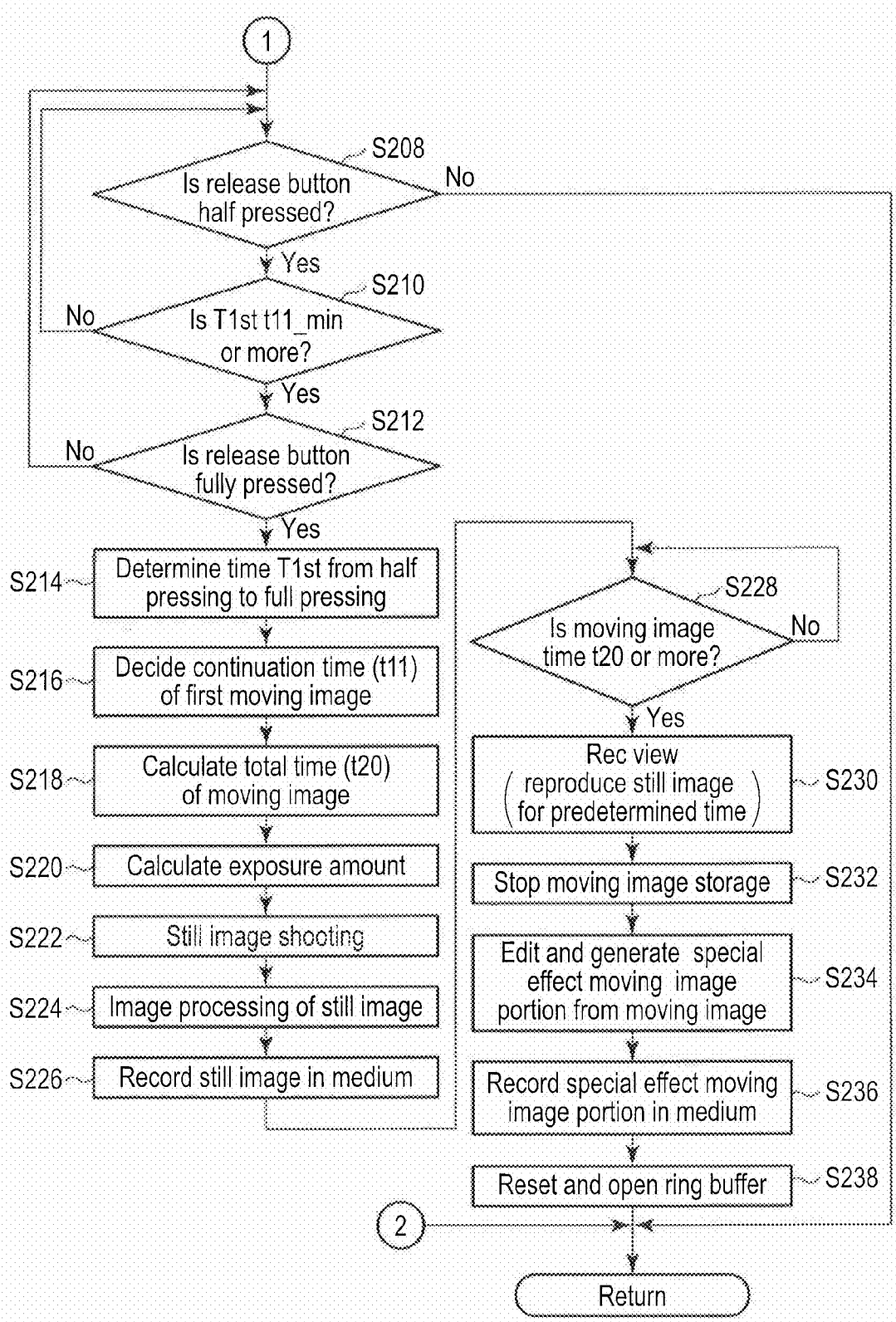
F I G. 23B

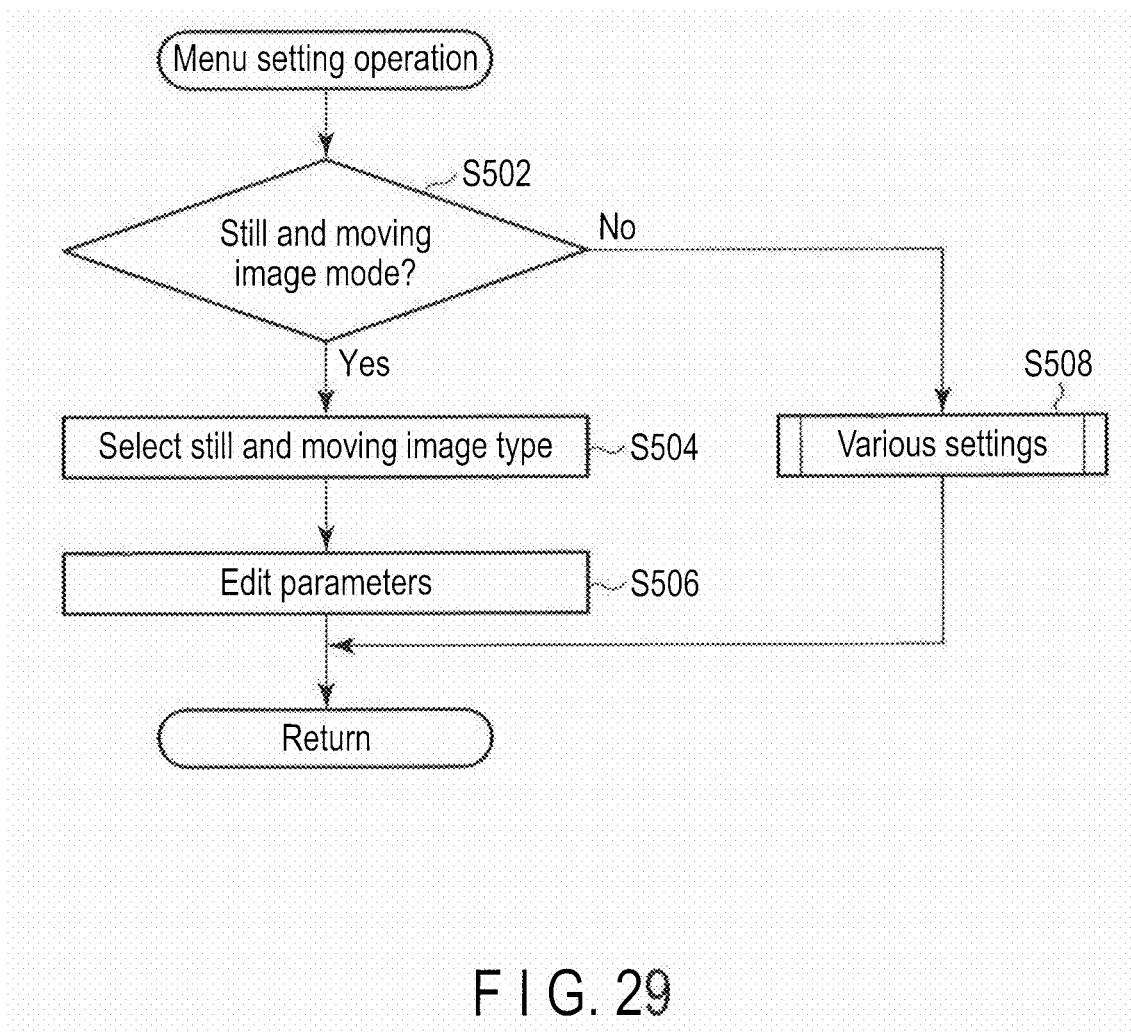
F I G. 29

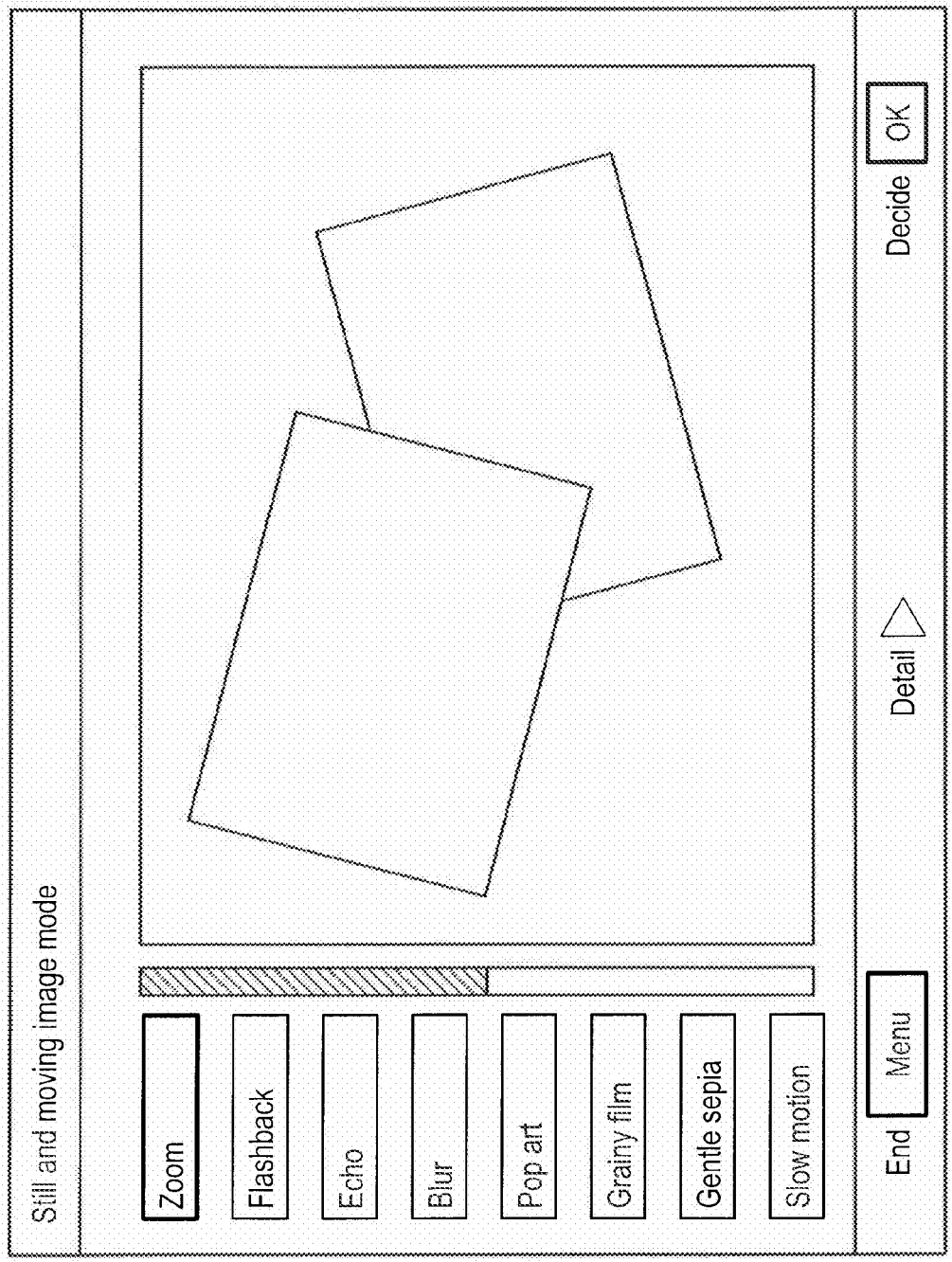
F I G. 30

FIG. 31

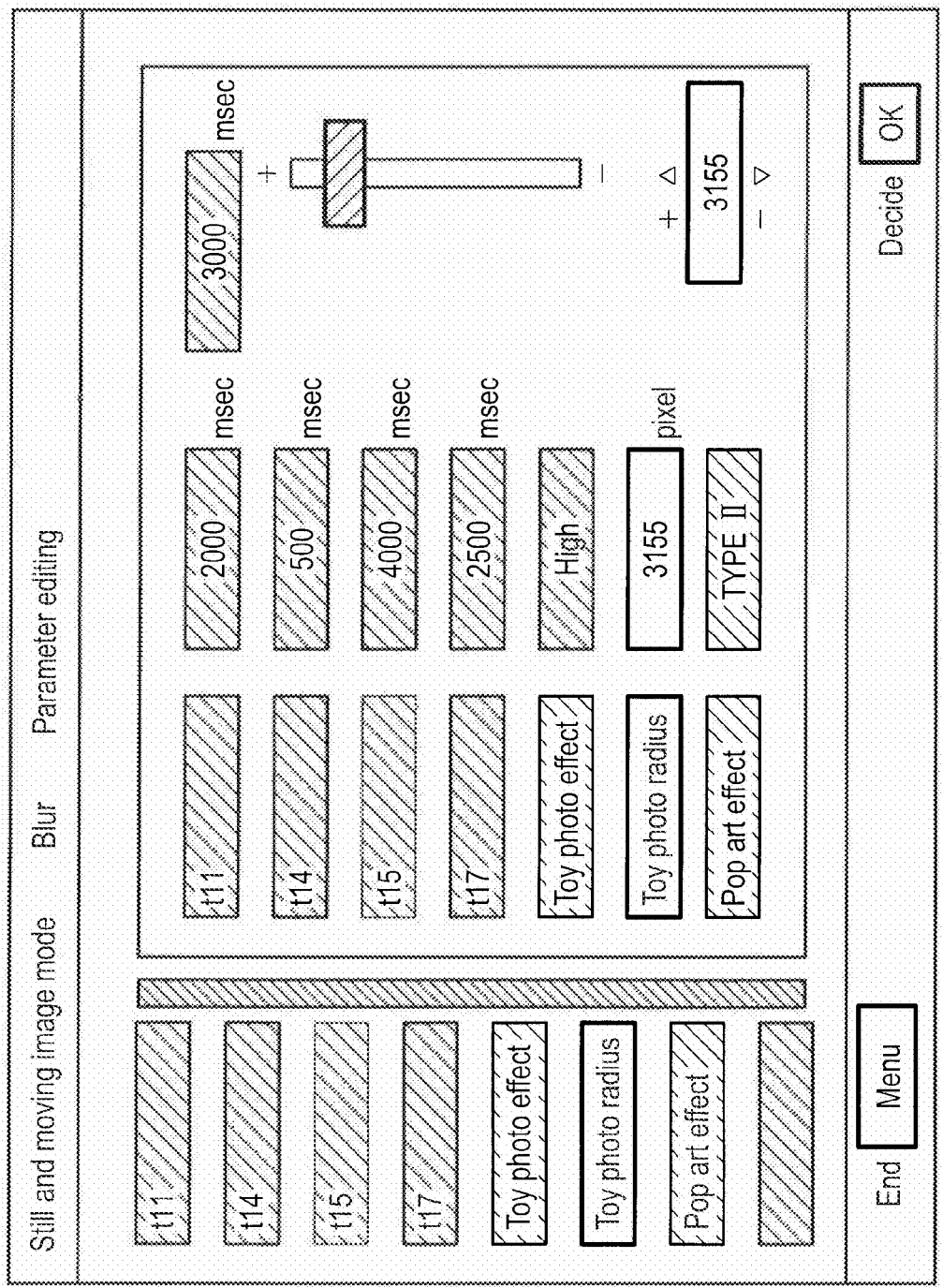
F I G. 32

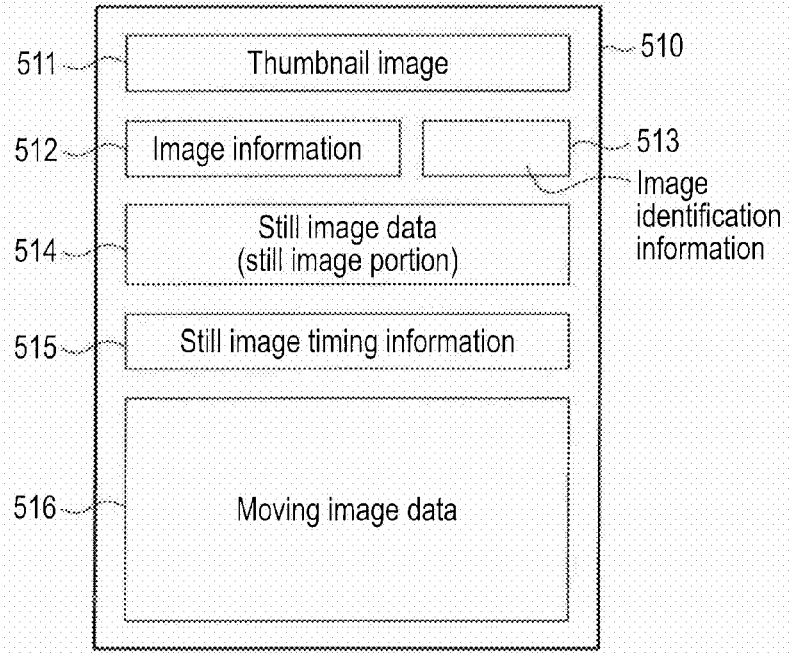
F I G. 36
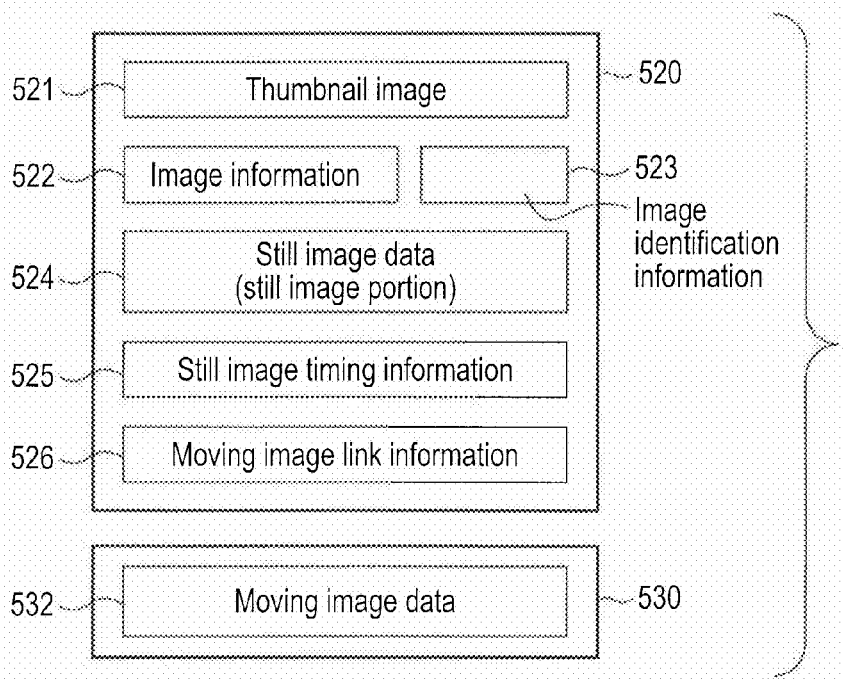
F I G. 37

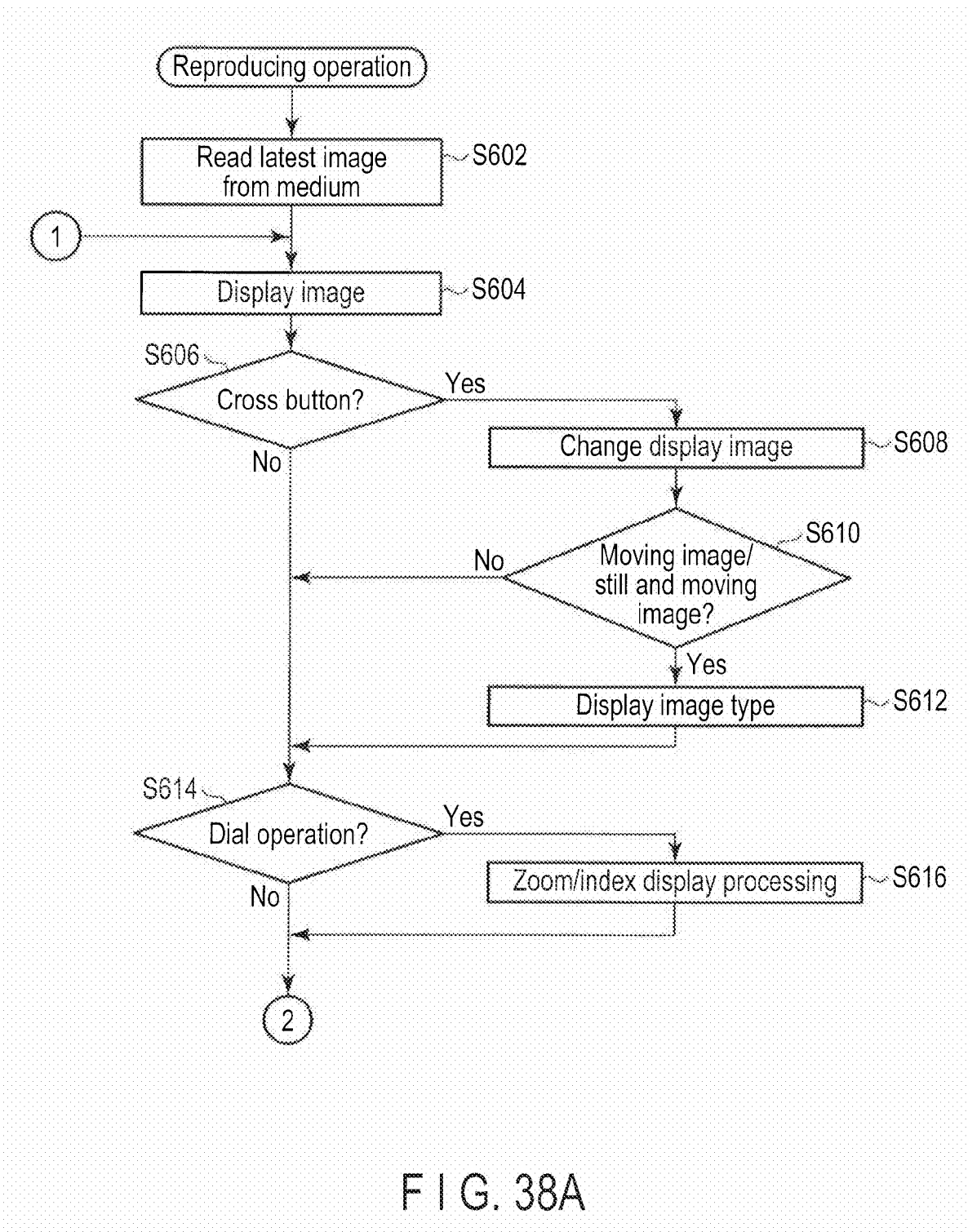
F I G. 38A

US 9,172,874 B2

IMAGING APPARATUS AND IMAGE GENERATION METHOD FOR GENERATING ONE PIECE OF IMAGE INCLUDING A MOVING IMAGE AND STILL IMAGE

CROSS REFERENCE TO RELATED APPLICATION

This application is based upon and claims the benefit of priority from prior Japanese Patent Application No. 2012-199952, filed Sep. 11, 2012, the entire contents of which are incorporated herein by reference.

FIELD OF INVENTION

The present invention relates to an imaging apparatus, a digital camera, an image generation method, and a storage medium storing an image generation program.

BACKGROUND

In general, digital cameras that record still images and moving images are known. For example, Jpn. Pat. Appln. KOKAI Publication No. 2007-215086 discloses a digital camera capable of shooting moving images, which can shoot a still image during shooting of a moving image. In this digital camera, recording of a moving image starts simultaneously with turning on a power supply. Further, Jpn. Pat. Appln. KOKAI Publication No. 2007-215086 discloses that a moving image is recorded while changing time allocation before and after each still image. Further, for example, Jpn. Pat. Appln. KOKAI Publication No. 2004-297177 discloses that, when preparations for shooting still pictures are completed, recording of a moving image is started and the moving image and the still images are recorded in association with each other in a ring buffer. When the moving image and the still images are recorded in association with each other, an atmosphere at the time of shooting the still image can be conveyed to a viewer. Further, Jpn. Pat. Appln. KOKAI Publication No. 2004-297177 discloses that, in regard to recording moving images before and after a still image, sound is recorded at the same time to convey an atmosphere.

SUMMARY

According to an aspect of the present invention, an imaging apparatus generates one piece of image including a moving image and a still image which are continuously shot. The apparatus includes an imaging unit configured to acquire the moving image and the still image; a still image acquisition instruction unit configured to instruct to acquire the still image; a moving image acquisition start instruction unit configured to instruct to start acquisition of the moving image prior to acquisition of the still image; a time measuring unit configured to measure a time from a start of acquisition of the moving image to acquisition of the still image and output the measured time; and a moving image time determination unit configured to determine a moving image time which is a time of the moving image included in the image based on a result of the time measurement performed by the time measuring unit.

According to an aspect of the invention, a digital camera generates one piece of image including a moving image and a still image which are continuously shot. The digital camera includes an imaging unit configured to acquire the moving image and the still image; a still image acquisition instruction unit configured to instruct to acquire the still image; a moving image acquisition start instruction unit configured to instruct to start acquisition of the moving image prior to acquisition of the still image; a time measuring unit configured to measure a time from a start of acquisition of the moving image to acquisition of the still image and output the measured time; and a moving image time determination unit configured to determine a moving image time which is a time of the moving image included in the image based on a result of the time measurement performed by the time measuring unit.

According to an aspect of the invention, an image generation method of generating one piece of image including a moving image and a still image which are continuously shot includes acquiring the moving image and the still image; instructing to acquire the still image; instructing to start acquisition of the moving image prior to acquisition of the still image; measuring a time from a start of acquisition of the moving image to acquisition of the still image and outputting the measured time; and determining a moving image time which is a time of the moving image included in the image based on an output of the time measurement.

According to an aspect of the invention, a non-transitory computer-readable storage medium stores a program that allows a computer in an image generating apparatus to generate one piece of image including a moving image and a still image that are continuously shot. The storage medium stores a code for acquiring the moving image and the still image; a code for instructing to acquire the still image; a code for instructing to start acquisition of the moving image prior to acquisition of the still image; a code for measuring a time from a start of acquisition of the moving image to acquisition of the still image and outputting the measured time; and a code for determining a moving image time which is a time of the moving image included in the image based on an output of the measured time.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a block diagram showing a structural view of the digital camera according to the embodiment;

FIG. 6A is a view showing an outline of an example of the first still and moving image created by the digital camera according to the embodiment;

FIG. 10A is a view showing an outline of an example of the third still and moving image created by the digital camera according to the embodiment;

FIG. 10B is a view showing the outline of an example of the third still and moving image created by the digital camera according to the embodiment, which is also a view showing the continuation of FIG. 10A;

FIG. 16 is a view showing an outline of an example of the sixth still and moving image created by the digital camera according to the embodiment;

FIG. 21A is a view showing an outline of a structural view of a still and moving image created by the digital camera according to the embodiment;

FIG. 21B is a view showing an outline of a structural example of a still and moving image created by the digital camera according to the embodiment;

FIGS. 23A and 23B are flowcharts showing an example of image operation processing executed by the digital camera according to the embodiment;

FIG. 29 is a flowchart showing an example of menu setting operation processing executed by the digital camera according to the embodiment;

FIG. 30 is a view showing a display image in the menu setting operation executed by the digital camera according to the embodiment;

FIG. 31 is a view showing an example of a display image in the menu setting operation executed by the digital camera according to the embodiment;

FIG. 32 is a view showing an example of a display image in the menu setting operation executed by the digital camera according to the embodiment;

FIG. 36 is a block diagram showing an example of a file configuration of a still and moving image created by the digital camera according to a modification of the embodiment;

FIG. 37 is a block diagram showing another example of a file configuration of a still and moving image created by the digital camera according to a modification of the embodiment; and FIGS. 38A and 38B are flowcharts showing an example of reproducing operation processing executed by the digital camera according to a modification of the embodiment.

DETAILED DESCRIPTION OF THE PREFERRED EMBODIMENTS

Figure 1:
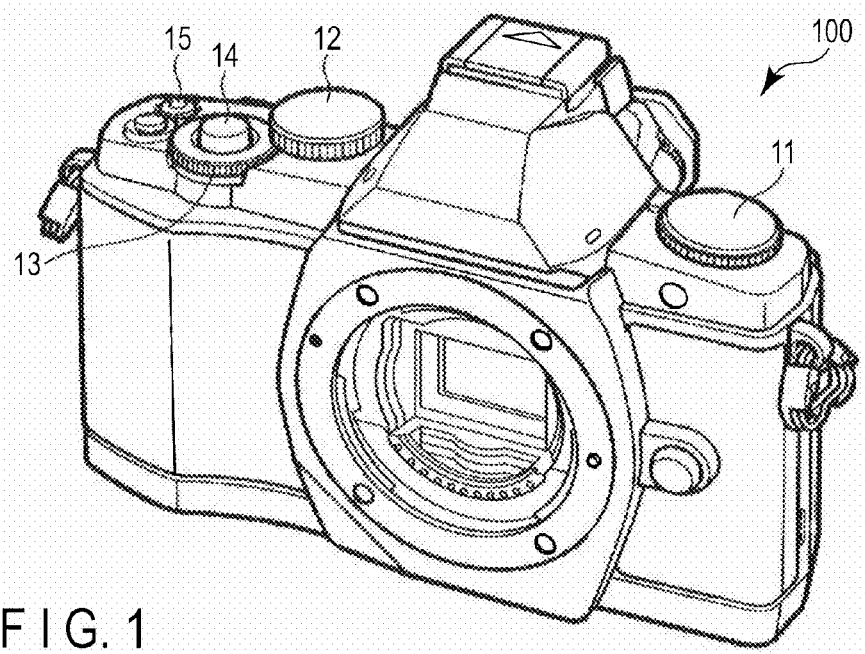
FIG. 1 is an appearance view showing an example of a camera body of a digital camera according to an embodiment.
Figure 2:
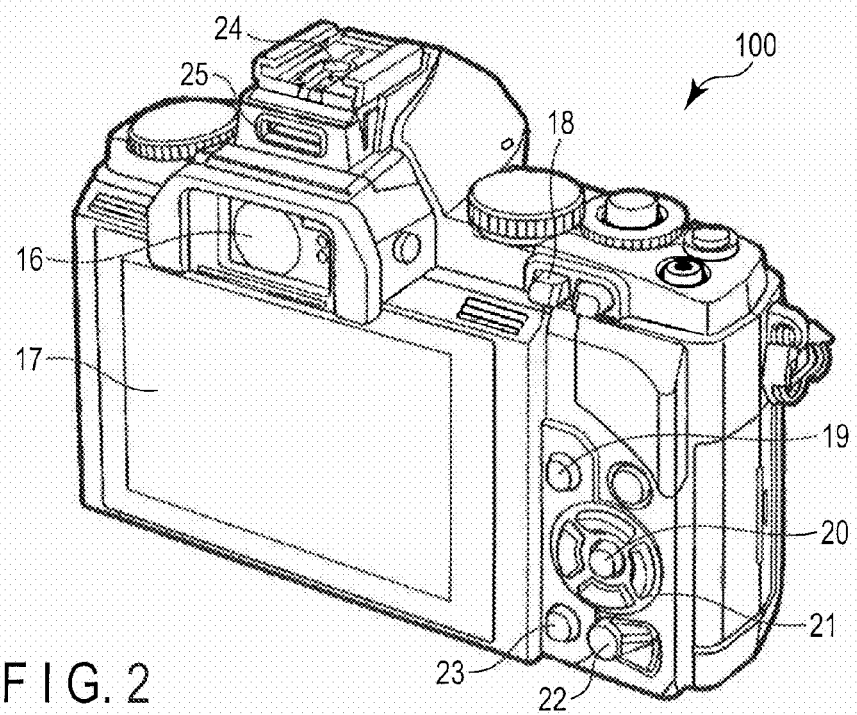
FIG. 2 is an appearance view showing an example of the camera body of the digital camera according to the embodiment.

An embodiment according to the present invention will now be described with reference to the drawings. A digital camera according to this embodiment is configured to create a picture including still images and moving images, in which the moving images for flattering each still image are provided before and after this still image, by performing shooting. Such a picture in which moving images are provided before and after each still image will be referred to as a still and moving image hereinafter. The digital camera according to this embodiment applies to moving images special effect processing for flattering a still image in a still and moving image. FIG. 1 and FIG. 2 shows appearance views of a body unit 100 of a digital camera according to this embodiment.

As shown in FIG. 1, the body unit 100 of the digital camera comprises a shooting mode dial 11, a main dial 12, a sub-dial 13, a release button 14, and a moving image recording button 15. As will be described later with reference to FIG. 3, the shooting mode dial 11 is a dial configured to select a still image, a moving image, a still and moving image, or the like or select, e.g., a shooting setting in the case of a still image. Each of the main dial 12 and the sub-dial 13 is a dial configured to, e.g., input selection of various shooting conditions. In this embodiment, the main dial 12 and the sub-dial 13 are also used for changing parameters concerning a still and moving image.

The release button 14 is a button configured to input an instruction of shooting a still image. Switches on two levels are provided to the release button 14, a 1st release switch (1RSW) is turned on when the release button 14 is half pressed, and a 2nd release switch (2RSW) is turned on when the release button 14 is fully pressed. For example, in a still image shooting, when the release button 14 is half pressed, a focusing position is determined. When the release button 14 is fully pressed, a still image is shot. For example, even in still and moving image shooting, when the release button 14 is fully pressed, a still image is acquired. Further, in this embodiment, a time required for the released button to be fully pressed after a half pressed state is used for a setting of each moving image included in the still and moving image. The moving image recording button 15 is a button configured to input instructions to start and finish recording of a moving image. When the moving image recording button 15 is pressed, recording of a moving image is started. When the moving image recording button 15 is again pressed, the recording of the moving image is finished.

Furthermore, as shown in FIG. 2, the body unit 100 comprises a finder 16, a touch panel equipped backside liquid crystal display monitor 17, a reproduction button 18, a menu button 19, a decision button 20, a cross button 21, a power supply ON/OFF lever 22, a delete button 23, a hot shoe 24, and a communication connector 25. The finder 16 and the touch panel equipped backside liquid crystal display monitor 17 function as a display unit configured to display live view images or various kinds of camera information.

The finder 16 is also referred to as an electric view finder (EVF), includes a small liquid crystal display or an organic EL display, and magnifies a display image with use of a dedicated optical system so that a photographer can visually confirm the display image. The finder 16 is hardly affected by external light and others, and a photographer can easily visually confirm a display image through the finder 16. The touch panel equipped backside liquid crystal display monitor 17 reproduces and displays a created still and moving image.

The reproduction button 18 is a button configured to input an instruction to reproduce each image recorded in a recording medium. The menu button 19 is a button configured to display a menu for various kinds of settings and others of the digital camera. The decision button 20 is a button configured to input an instruction to make a decision on, e.g., a menu screen. The cross button 21 is a button configured to, e.g., input an instruction to make a selection on the menu screen or input other various kinds of selections. The power supply ON/OFF lever 22 is a lever configured to input an instruction to turn on or off a power supply of the digital camera. In this embodiment, in a state that a "still and moving image" of the mode dial 11 is set to a position of an index 11b (see FIG. 3(b)), i.e., in a state that a still and moving image shooting mode is selected, when the power supply is turned on, recording of a moving image on a ring buffer is started. The delete button 23 is a button configured to input an instruction to delete an image recorded in a recording medium.

The hot shoe 24 is a region configured to connect an external accessory such as an external strobe to the digital camera. The communication connector 25 is a region to which a communication cable configured to communicate with an external accessory connected to the digital camera is connected.

Figure 3A:
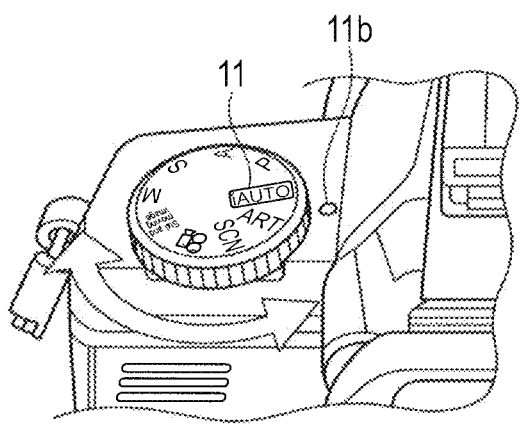
FIG. 3A is a view showing an example of a shooting mode dial of the digital camera according to the embodiment.
Figure 3B:
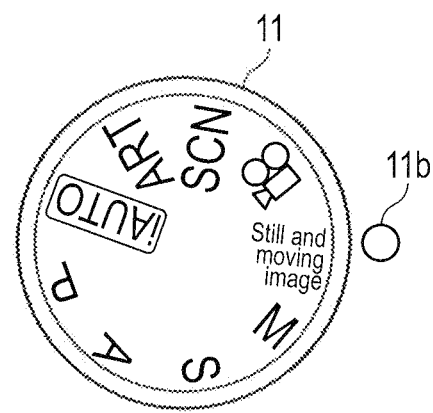
FIG. 3B is a view showing an example of the shooting mode dial of the digital camera according to the embodiment.

The shooting mode dial 11 will now be more specifically explained with reference to FIG. 3A and FIG. 3B. As shown in FIG. 3A and FIG. 3B, signs indicative of shooting modes are set down on the shooting mode dial 11. The shooting mode dial 11 rotates, and a shooting mode associated with a sign that coincides with a position of an index 11b is selected. For example, as shown in FIG. 3A and FIG. 3B, on the shooting mode dial 11 are set down "P" representing a program AE mode, "A" representing an aperture priority AE mode, "S" representing a shutter speed priority AE mode, "M" representing a manual mode, and others as a still image shooting mode. Moreover, there are also set down "still and moving image" representing a still and moving image according to this embodiment, a movie camera mark representing a moving image, "SCN" representing a scene mode in which a shooting setting associated with a shooting scene is configured, "ART" representing an art filter adding a special effect to a still image, and others.

FIG. 4 is a block diagram showing the digital camera 1 according to this embodiment. The digital camera 1 has the body unit 100 and a lens unit 200. The lens unit 200 is attachable to or detachable from the body unit 100. In this embodiment, as the digital camera 1, a camera in which the lens unit 200 is detachable from the body unit 100 and a lens is replaceable is shown. However, this embodiment is not restricted thereto, and it can be also applied to a camera in which a lens and a body are fixed.

The lens unit 200 comprises a lens 210a, a lens 210b, and a diaphragm 203. The lens unit 200 further comprises a lens drive mechanism 204 that drives the lens 210a and a diaphragm drive mechanism 202 that drives the diaphragm 203. The lens unit 200 further comprises a lens control microcomputer 201. To focus on a subject, the lens control microcomputer 201 controls the lens drive mechanism 204 and operates the lens 210a. Additionally, to adjust light intensity, the lens control microcomputer 201 controls the diaphragm drive mechanism 202 and operates the diaphragm 203. It is to be noted that FIG. 4 is a schematic view, and the lens 210a, the lens 210b, and others may be configured by any number of lenses. Further, this embodiment may have a zoom function.

The body unit 100 comprises a control microcomputer 101 that controls operations of respective units of the digital camera 1. The lens control microcomputer 201 and the control microcomputer 101 are connected through a communication connector 170. The control microcomputer 101 outputs instructions concerning various kinds of operations of the lens unit 200 to the lens control microcomputer 201.

The body unit 100 comprises an imaging element 111 that photo-electrically converts a subject image that has entered from the lens unit and generates an image signal. A shutter 120 is provided between the imaging element 111 and the lens 210b. An operation of the shutter 120 is controlled by a shutter control drive circuit 121 provided in the body unit 100. The shutter control drive circuit 121 is connected with the control microcomputer 101 and operates under control of the control microcomputer 101.

The body unit 100 comprises an imaging element drive IC 110, an image processing IC 102, a face detection IC 103, an SDRAM 104, and a timer 105. The image processing IC 102 operates under control of the control microcomputer 101. The imaging element drive IC 110 operates under control of the image processing IC 102. The imaging element drive IC 110 drives the imaging element 111 and acquires an analog signal concerning a subject image from the imaging element 111. The imaging element drive IC 110 converts the analog signal acquired from the imaging element 111 into a digital signal, performs some image processing including normally executed gamma conversion and others, and outputs a processed image signal to the image processing IC 102. The image processing IC 102 executes various kinds of image processing including creation of a still and moving image according to this embodiment. In the processing of the image processing IC 102, the SDRAM 104 is used for temporarily storing data or the like that is being processed. The face detection IC 103 executes face detection processing for detecting a position of a face in an image. The timer 105 is used for time measurement for determining a later-described first moving image time in a still and moving image according to this embodiment.

The image processing IC 102 includes a first special effect processing unit 102a, a second special effect processing unit 102b, a file creation unit 102c, and a moving image time determination unit 102d. In the creation of a still and moving image according to this embodiment, the first special effect processing unit 102a performs still image special effect processing to a still image and creates a special effect still image. In the creation of a still and moving image according to this embodiment, the second special effect processing unit 102b executes moving image special effect processing as a combination of special effects associated with the still image special effect to a moving image, thereby creating a special effect moving image. The file creation unit 102c creates a file concerning a still and moving image based on a special effect still image or a special effect moving image. In the creation of a still and moving image according to this embodiment, the moving image time determination unit 102d determines a time of a later-described first moving image in special effect moving images.

Additionally, in the body unit 100 are also provided a communication connector 130 configured to communicate with an external accessory and others, a recording medium 131 that is attachable to or detachable from the body unit 100, a display monitor 140, a touch panel 150, and an operation switch (an operation SW) 160. The recording medium 131 is a general recording medium and has, e.g., each image subjected to image processing by the image processing IC 102 recorded therein.

The display monitor 140 is associated with the finder 16 and the touch panel equipped backside liquid crystal display monitor 17 and displays each image subjected to image processing by the image processing IC 102. The touch panel 150 is provided in association with the liquid crystal display monitor. The touch panel 150 detects a position of touch of a user. The operation switch is an operation switch for various inputs of, e.g., the shooting mode dial 11, the main dial 12, the sub-dial 13, the release button 14, the moving image recording button 15, the menu button 19, the decision button 20, the cross button 21, the power supply ON/OFF lever 22, the delete button 23, and others. The communication connector 130 is associated with the hot shoe 24 or the communication connector 25.

In this embodiment, an example of a still and moving image created by the image processing IC 102 will now be described with reference to FIG. 5 to FIG. 20. In this embodiment, a combination of various kinds of image processing is prepared as a still and moving image. A type of each still and moving image created based on a combination of types of image processing will be referred to as a scenario.

FIG. 5, FIG. 7, FIG. 9, FIG. 11, FIG. 13, FIG. 15, FIG. 17, and FIG. 19 show an outline of an order of images included in a still and moving image in each scenario. Further, FIG. 6A, FIG. 6B, FIG. 8, FIG. 10A, FIG. 10B, FIG. 12, FIG. 14, FIG. 16, FIG. 18, and FIG. 20 schematically show an outline of processing executed for each image included in a still and moving image to promote understanding of each still and moving image in chronological order. It is to be noted that signs shown in respective frames in FIG. 5, FIG. 7, FIG. 9, FIG. 11, FIG. 13, FIG. 15, FIG. 17, and FIG. 19 correspond to reference signs shown in FIG. 6A, FIG. 6B, FIG. 8, FIG. 10A, FIG. 10B, FIG. 12, FIG. 14, FIG. 16, FIG. 18, and FIG. 20. Furthermore, each of FIG. 5, FIG. 7, FIG. 9, FIG. 11, FIG. 13, FIG. 15, FIG. 17, and FIG. 19 shows a time of each constituent element included in a still and moving image. The time of each of these constituent elements is a value shown in, e.g., the following Table 1. Each time of the constituent elements has a value in Table 1 set as an initial value, and it can be adjusted by a photographer. It is to be noted that a length of an entire still and moving image is determined as t20. When such initial values as shown in Table 1 are set, a photographer can easily acquire an impressive still and moving image without configuring fine settings.

Figure 5:
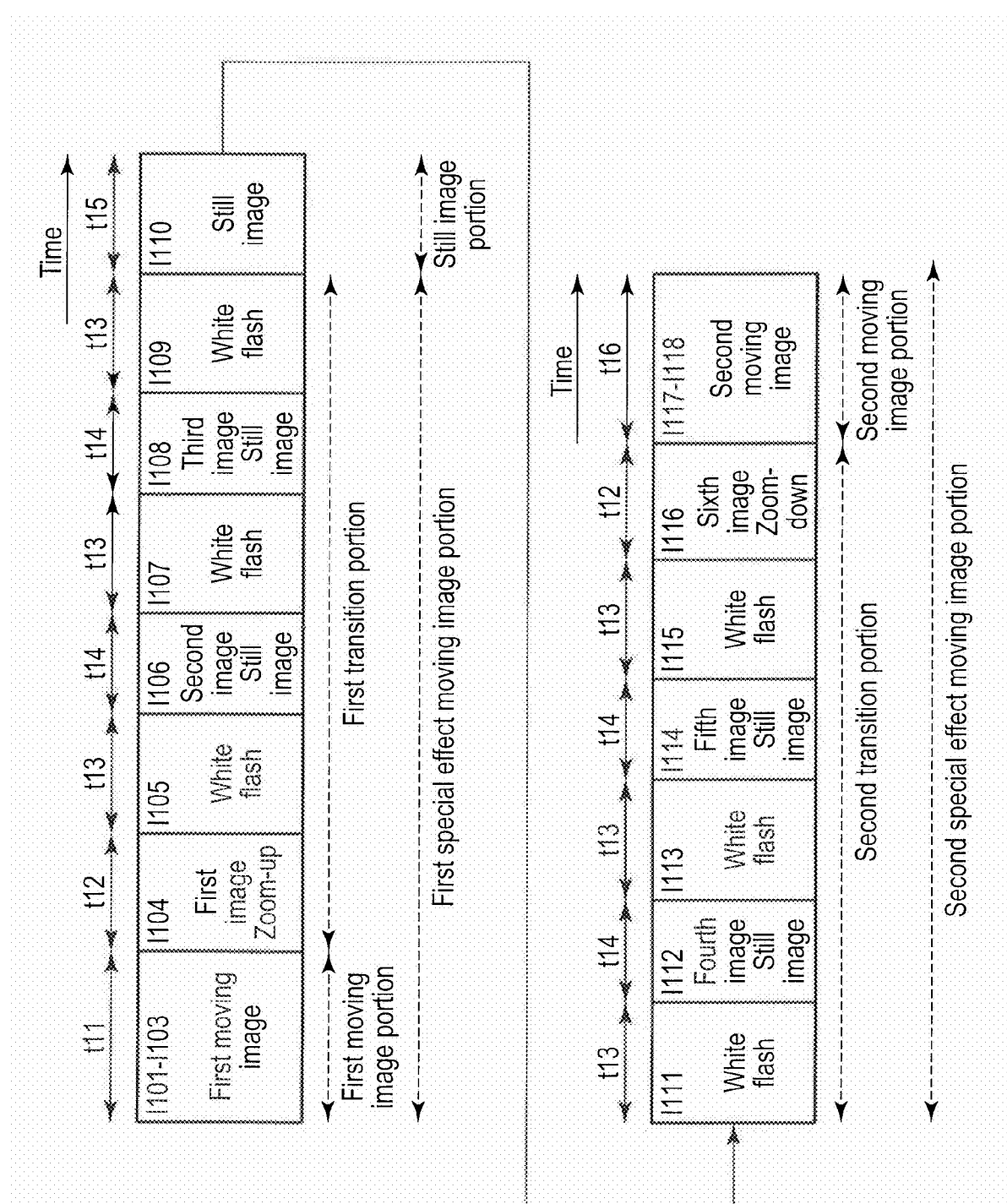
FIG. 5 is a view showing a structural example of images included in a first still and moving image created by a digital camera according to the embodiment.

Table 1 will now be explained based on an example of FIG. 5. A first column in Table shows a scenario name. t11 in a second column in Table 1 represents a time concerning a first moving image time which is a continuation time of the first moving image portion of each scenario. This time has two values, i.e., min and max, which are associated with t11_min and t11_max shown in FIG. 25, and will be described later. t12 in a third column in Table 1 corresponds to a zoom-up effect showing a time of a first image of I104 and a zoom-down effect showing a time of a sixth image of I116. t13 in a fourth column in Table 1 corresponds to a white flash effect showing a time of each of I105, I107, I109, I111, I113, and I115. t14 in a fifth column in Table 1 corresponds to an effect showing a time of each of a still image as a second image of I106, a still image as a third image of I108, a still image as a fourth image of I112, and a still image as a fifth image of I114. t15 in a sixth column in Table 1 corresponds to a time for displaying a still image of I110. t16 in a seventh column in Table 1 corresponds to a time for displaying a second moving image of each of I117 and I118. t17 in an eighth column in Table 1 corresponds to a black fadeout showing a time shown in I212 to I214 in FIG. 7 or a white fadeout effect showing a time in I511 in FIG. 13. A total (t20) in a ninth column in Table 1 represents a total time obtained by multiplying the respective types by the numbers of times of display and adding them, and an upper number of each time represents a total time when t11 takes min whilst a lower number of the same represents a total number when t11 takes max.

TABLE 1

| Scenario | t11 min max | t12 | t13 | t14 | t15 | t16 | t17 | Total (t20) min max |
|---|---|---|---|---|---|---|---|---|
| Zoom | 2000 6000 | 200 | 150 | 400 | 4000 | 6000 | | 14900 18900 |
| Flashback | 3000 7000 | | 150 | 2000 | 3000 | 5000 | 2500 | 20250 24250 |
| Echo | 2500 4000 | | 150 | 1500 | 3000 | 4000 | 2500 | 28950 30450 |
| Blur | 2000 3000 | | | 500 | 4000 | | 2500 | 15500 16500 |
| Pop art | 1000 4000 | | 150 | 300 | 3000 | | 2500 | 10950 13950 |

TABLE 1-continued

| Scenario | t11 min max | t12 | t13 | t14 | t15 | t16 | t17 | Total (t20) min max |
|---|---|---|---|---|---|---|---|---|
| Rough monochrome | 1000 4000 | | 150 | 250 | 4000 | | 3000 | 12650 15650 |
| Gentle sepia | 1000 4000 | | 150 | 300 | 4000 | | 2500 | 11950 14950 |
| Slow motion | 1500 4000 | | | 1000 | 2500 | 5000 | 2500 | 20000 22500 |

As shown in FIG. 5, FIG. 7, FIG. 11, FIG. 13, FIG. 15, FIG. 17, and FIG. 19, in any still and moving image, a first special effect moving image portion including a moving image subjected to special effect processing before a still image portion including still images and a second special effect moving image portion including a moving image subjected to special effect processing after the still image portion are provided, respectively. The first special effect moving image portion includes a first moving image portion whose length is determined in accordance with each shooting and a first transition portion that connects the first moving image portion and the still image portion. A length of the first moving image portion is determined as t11.

[First Still and Moving Image]

The image processing IC creates a still and moving image having a scenario name "zoom" as a first still and moving image. The first still and moving image will now be explained with reference to FIG. 5, FIG. 6A, and FIG. 6B. The first special effect moving image portion of the first still and moving image includes a moving image that is not subjected to special processing as a first moving image portion as represented by images I101 to I103 in FIG. 6A. A time of this moving image is t11. This time t11 is changed in accordance with each shooting as will be described later.

The first special effect moving image portion further includes a moving image subjected to image processing for gradually zooming up a main subject by electronic zoom as a first transition portion as represented by an image I104 in FIG. 6A. The main subject is identified by, e.g., face detection executed by the face detection IC 103. The main subject may be identified by any other method as a matter of course. A time of a zoom-up moving image is t12. As represented by images I105 to I109 in FIG. 6A, the first special effect moving image portion further includes a moving image in which each still image zoomed up by the electronic zoom and each white flash are alternately interposed as the first transition portion, for example. Here, the still images as the images I106 and I108 are still images extracted at a predetermined timing in an original moving image. The white flash instantaneously whitens each entire image like the images I105, I107, and I109 to obtain an effect like using a flashlight. A time of the white flash is t13, and a time between the white flash and the white flash is t14.

A still image of a still image portion in the first still and moving image is a still image enlarged by the electronic zoom as represented by the image I110 in FIG. 6. A time of this still image is t15.

Figure 6B:
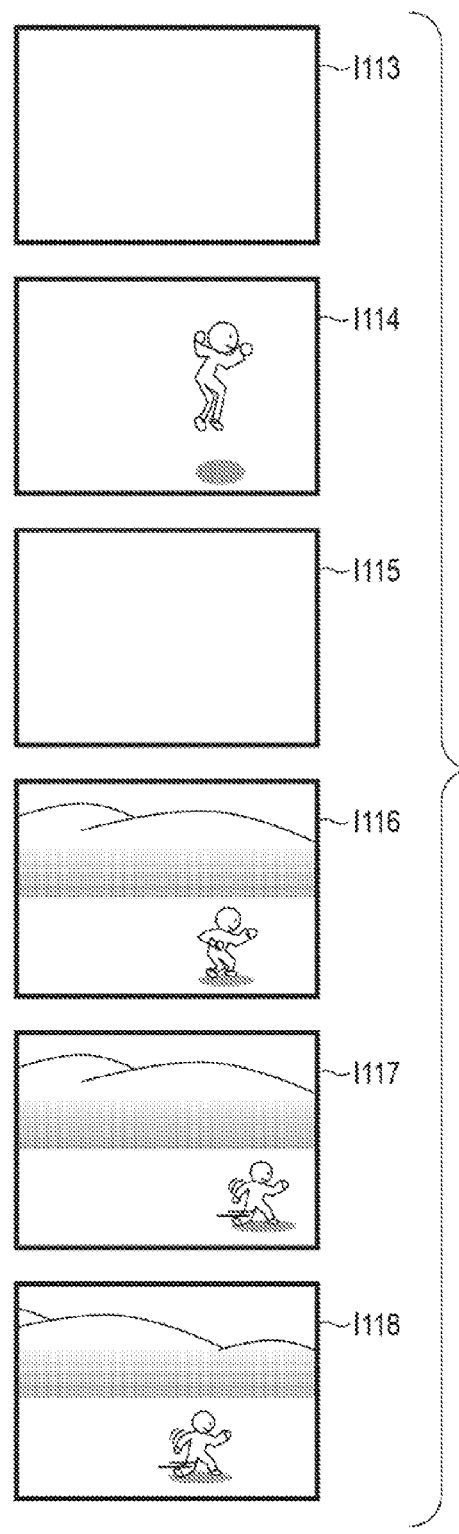
FIG. 6B is a view showing the outline of an example of the first still and moving image created by the digital camera according to the embodiment, which is also a view showing the continuation of FIG. 6A.

As a second transition portion, a second special effect moving image portion in the first still and moving image includes a moving image in which each zoomed-up still image and each white flash are alternately arranged as represented by the images I111 to I115 in FIG. 6A and FIG. 6B like the first special effect moving image. As the second transition portion, the second special effect moving image portion further includes a moving image subjected to image processing for gradually zooming down from the main subject as represented by the image I116 in FIG. 6B. A time of this zooming-down moving image is t12. At the end, as a second moving image portion, the second special effect moving image portion includes a moving image that is not subjected to special processing as represented by the images I117 and I118 in FIG. 6B.

As described above, in "zoom" as the first still and moving image, the still image in the still image portion is an image that has been zoomed up by using the electronic zoom. To flatter this still image, rendered is a special effect such that the moving image that is gradually zoomed up and the moving image in which each zoomed-up still image and each white flash are alternately shown are provided before the still image so that these moving images are connected to the subsequent zoomed-up still image with an impression. Moreover, the moving image in which each zoomed-up still image and each white flash are alternately shown and the moving image that is gradually zoomed down are provided after the still image. As described above, the first still and moving image is a lively moving image as a whole. Here, although the example in which the zoom up or the zoom down is realized by using the electronic zoom is illustrated, an optical zoom of the lens unit 200 may be driven in accordance with a scenario during shooting.

[Second Still and Moving Image]

The image processing IC 102 creates a still and moving image having a scenario name "flashback" as a second still and moving image. The second still and moving image will now be described with reference to FIG. 7 and FIG. 8. As represented by an image I201 in FIG. 8, a first special effect moving image portion of the second still and moving image includes a moving image that is not subjected to special effect processing as a first moving image portion. A length of the moving image that is not subjected to the special effect processing is a time t11. This time t11 is changed in accordance with each shooting as will be described later.

Figure 8:
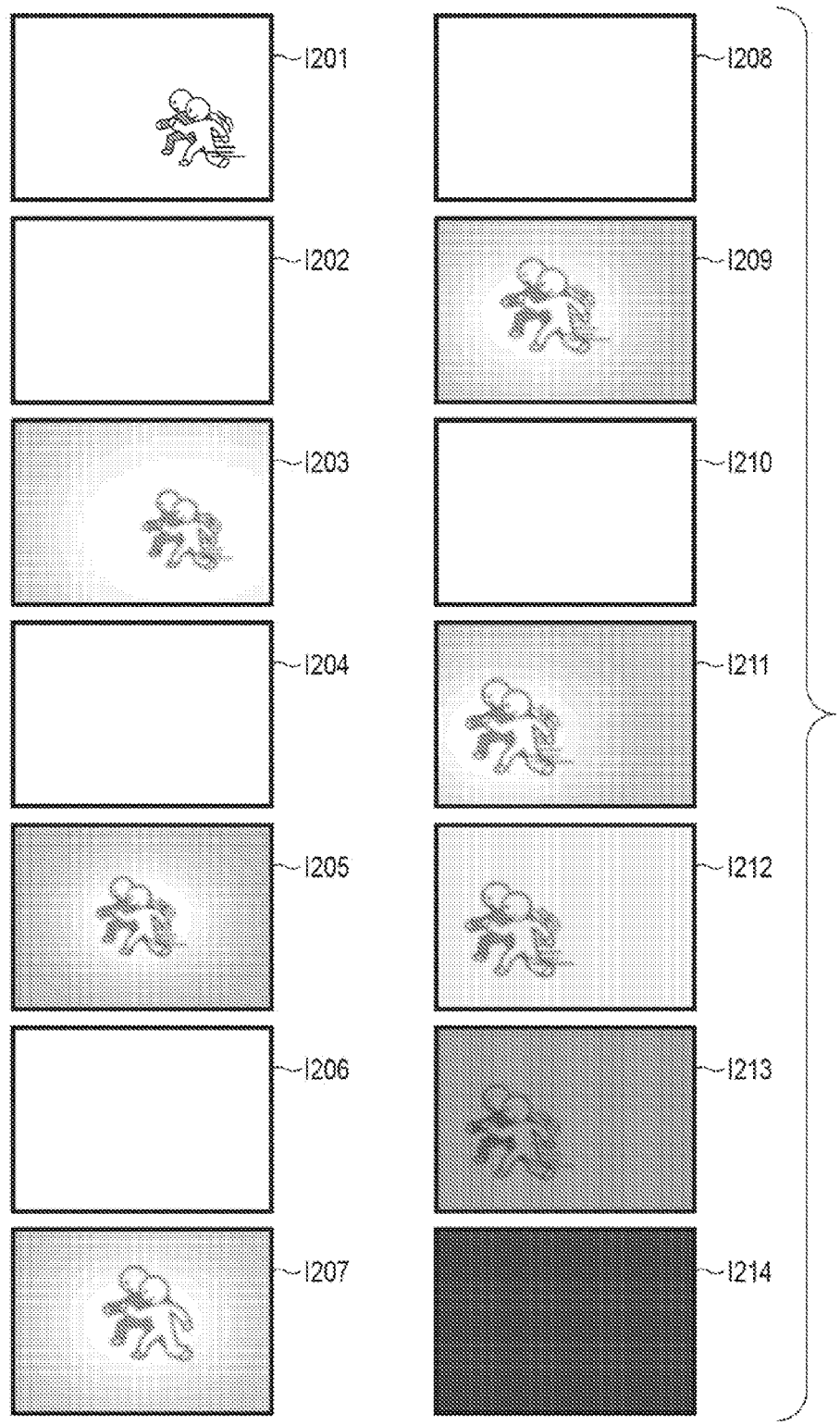
FIG. 8 is a view showing an outline of an example of the second still and moving image created by the digital camera according to the embodiment.
Figure 9:
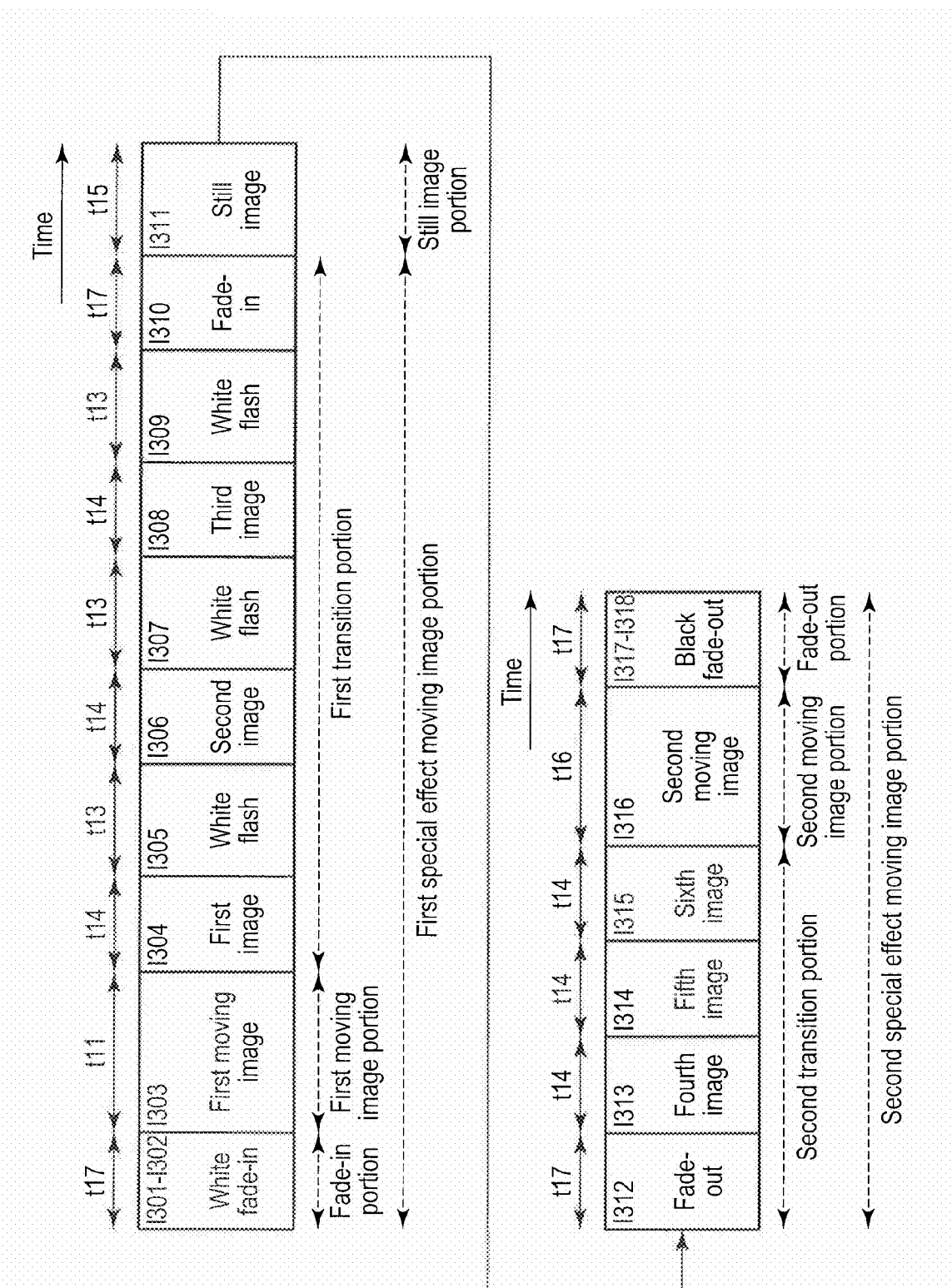
FIG. 9 is a view showing a structural view of images included in a third still and moving image created by the digital camera according to the embodiment.
Figure 11:
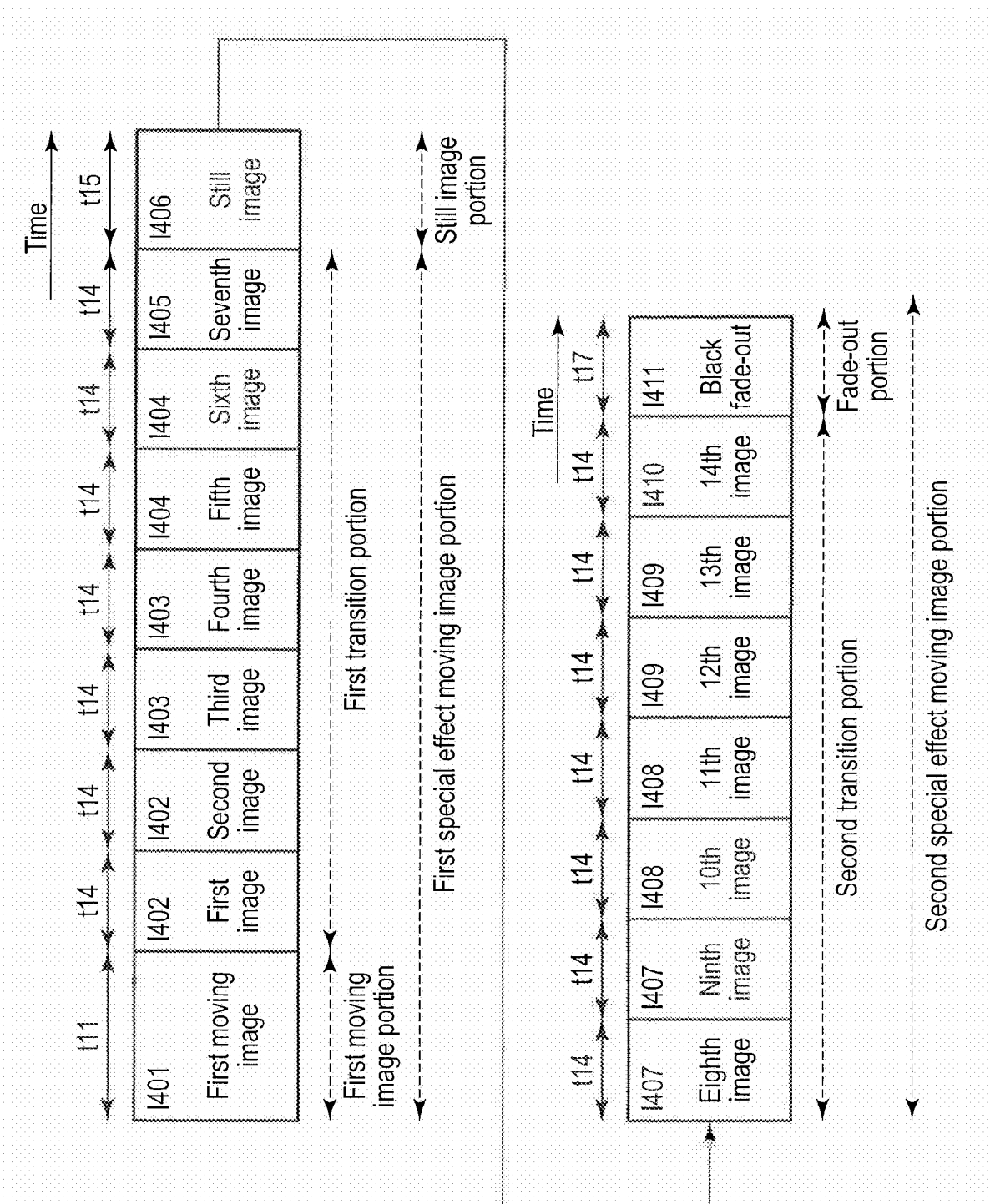
FIG. 11 is a view showing a structural view of images included in a fourth still and moving image created by the digital camera according to the embodiment.

As represented by images I202 to I206 in FIG. 8, the first special effect moving image portion includes a repetition of each white flash and each moving image subjected to the special effect as a first transition portion. Here, the special effect given to the moving image is a soft focus effect for blurring an image and then lowering a luminance around the image so that the image looks as if it was taken by a pinhole camera. A range where the luminance is lowered varies and varies with time. That is, the first transition portion in the first special effect moving image portion is a moving image obtained by interposing each instantaneous white image into a moving image having the soft focus effect and has the lowered ambient luminance at a predetermined timing as represented by images I202 to I206 in FIG. 8. It is to be noted that a time of a white image inserted as the white flash is t13, and a time of a moving image between the white flash and the white flash is t14.

As represented by an image I207 in FIG. 8, a still image portion in the second still and moving image is formed of a still image having the soft focus effect and peripheral light intensity reduction effect given thereto. A length of the still image portion is a time t15.

Figure 7:
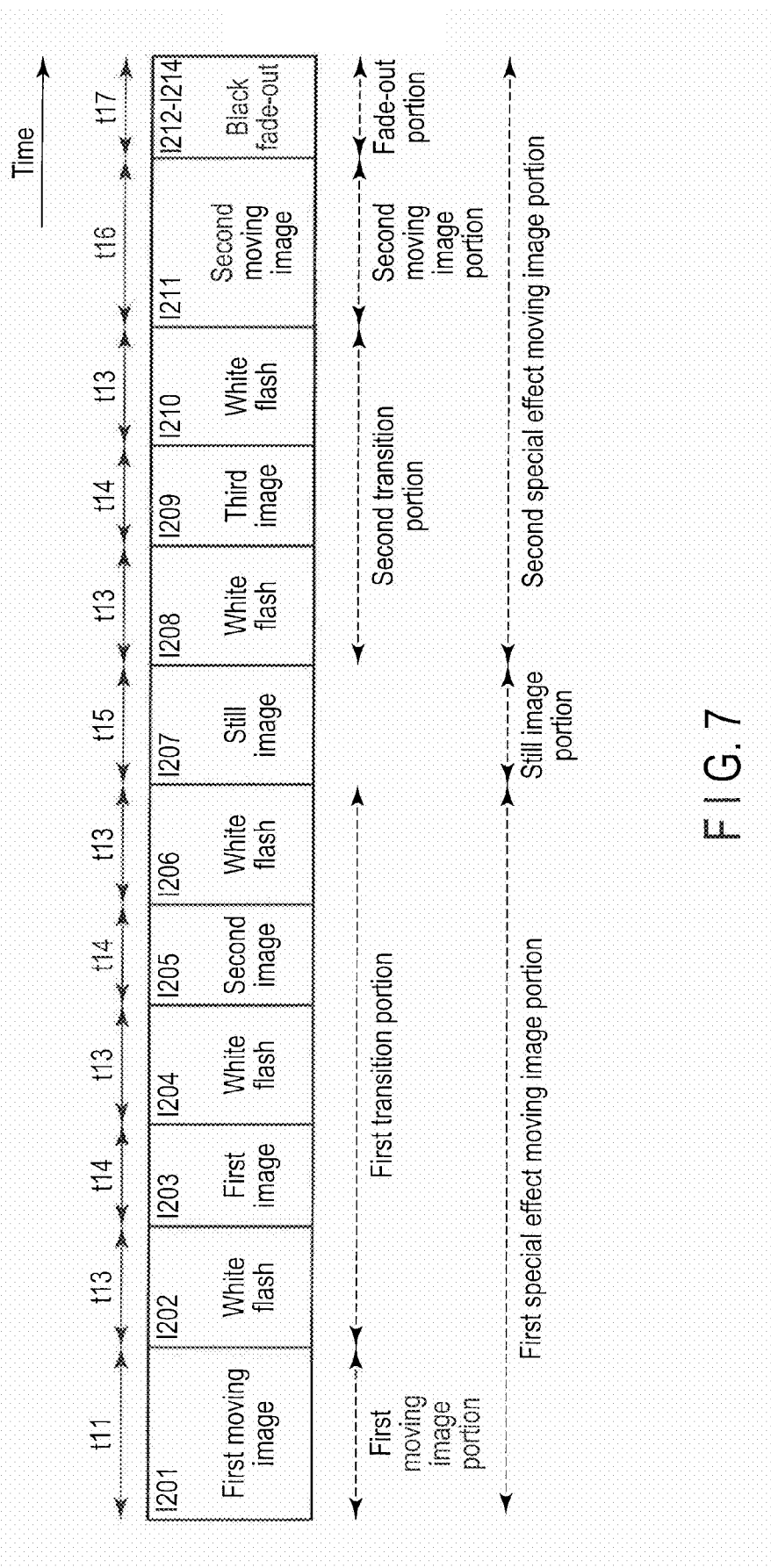
FIG. 7 is a view showing a structural view of images included in a second still and moving image created by the digital camera according to the embodiment.

As represented by images I208 to I214 in FIG. 7 and FIG. 8, a second special effect moving image portion of the second still and moving image includes a second transition portion, a second moving image portion, and a fadeout portion. As represented by the images I208 to I210 in FIG. 8, like the first transition portion, the second transition portion includes a moving image constituted of a repetition of each white flash and a moving image having the soft focus and the peripheral light intensity reduction given thereto. As represented by the image I211 in FIG. 8, the second moving image portion includes a moving image having the soft focus and the peripheral light intensity reduction effects given thereto. The fade-out portion includes a black fadeout moving image as represented by the images I212 to I214 in FIG. 8. The black fadeout moving image is a moving image that has a gradually lowered brightness and changes into a black image. A time from the last white flash to the black fadeout is t16. A time of the black fadeout is t17.

As described above, in the "flashback" as the second still and moving image, the still image in the still image portion is a soft image having the soft focus effect given thereto, and the peripheral light intensity reduction effect is also given to this image. The moving image with a romantic atmosphere that has the soft focus effect and the peripheral light intensity reduction effect for changing a region where the light intensity is reduced with time given thereto and the instantaneous white flash is occasionally interposed is provided before and after the still image so that this still image can be flattered.

[Third Still and Moving Image]

The image processing IC 102 creates a still and moving image having a scenario name "echo" as a third still and moving image. The third still and moving image will now be described with reference to FIG. 9, FIG. 10A, and FIG. 10B. A first special effect moving image portion of the third still and moving image includes a white fade-in moving image as a fade-in portion such as represented by images I301 and I302 in FIG. 10A and a moving image having the soft focus effect given thereto as a first moving image portion as represented by an image I303 in FIG. 10A. That is, the white fade-in moving image is a moving image whose brightness varies so that the moving image gradually appears from a white image. A time of the white fade-in is t17. A time of the image I303 having the soft focus effect given thereto is t11, and it is changed in accordance with each shooting as will be described later.

As represented by images I304 to I309 in FIG. 10A, the first special effect moving image portion further includes a repetition of each moving image having an echo effect and the soft focus effect given thereto and each white flash as a first transition portion. Here, the echo effect as image processing allows an afterimage corresponding to a predetermined number of frames to remain. When each white flash is interposed into the moving image having the echo effect and the soft focus effect given thereto, a sense of continuation of the moving image paused, and an effect that a viewer feels that the continuation of the image is interrupted can be obtained. It is to be noted that a time of the white image inserted as the white flash is t13, and a time of the moving image between the white flash and the white flash is t14. As represented by an image I310 in FIG. 10A, the first special effect moving image includes a fade-in image whose brightness varies so that the image gradually appears from the last white image to the still image as the first transition portion. A time of the fade-in is t17.

As represented by an image I311 in FIG. 10A, a still image portion of the third still and moving image is formed of a still image having the soft focus effect given thereto. A time of this still image is t15.

As represented by an image I312 in FIG. 10A, a second special effect moving image portion of the third still and moving image includes a white fade-out image whose brightness gradually increases so that the still image can change into a white image as a second transition portion. A time of the white fade-out is t17. The second special effect moving image portion further includes a moving image that fades in as the second transition portion, and it also includes a moving image having the soft focus and echo effects given thereto as represented by images I313 to I315 in FIG. 10B after the fade-in image. A time from the fade-in after the still image portion to the moving images having the soft focus and echo effects given thereto is 3×t14. As represented by an image I316 in FIG. 10B, the second special effect moving image portion further includes a moving image having the soft focus alone given thereto as a second moving image portion. A time of the moving image is t16. At the end, as represented by images I317 and I318 in FIG. 10B, the second special effect moving image portion includes a black fade-out moving image. A black fade-out time is t17.

As described above, in "echo" as the third still and moving image, the still image in the still image portion is a soft image having the soft focus effect given thereto. To flatter this still image, the moving image with a fantastic atmosphere having both the soft focus effect and the echo effect given thereto is provided before and after this still image. When the echo effect is given in the first transition portion and the second transition portion, the soft focus effect of the still image portion is flattered.

[Fourth Still and Moving Image]

Figure 12:
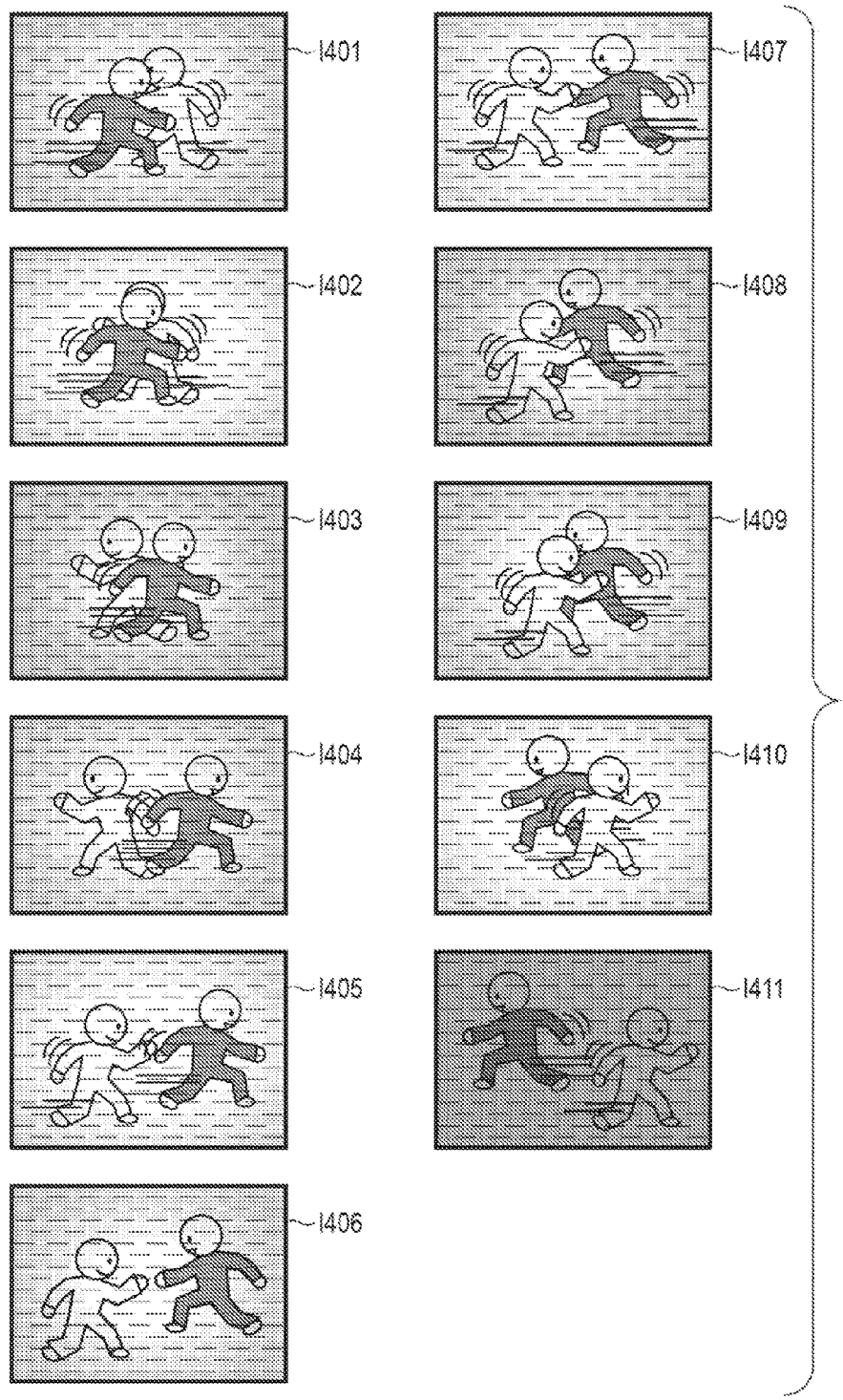
FIG. 12 is a view showing an outline of an example of the fourth still and moving image created by the digital camera according to the embodiment.
Figure 13:
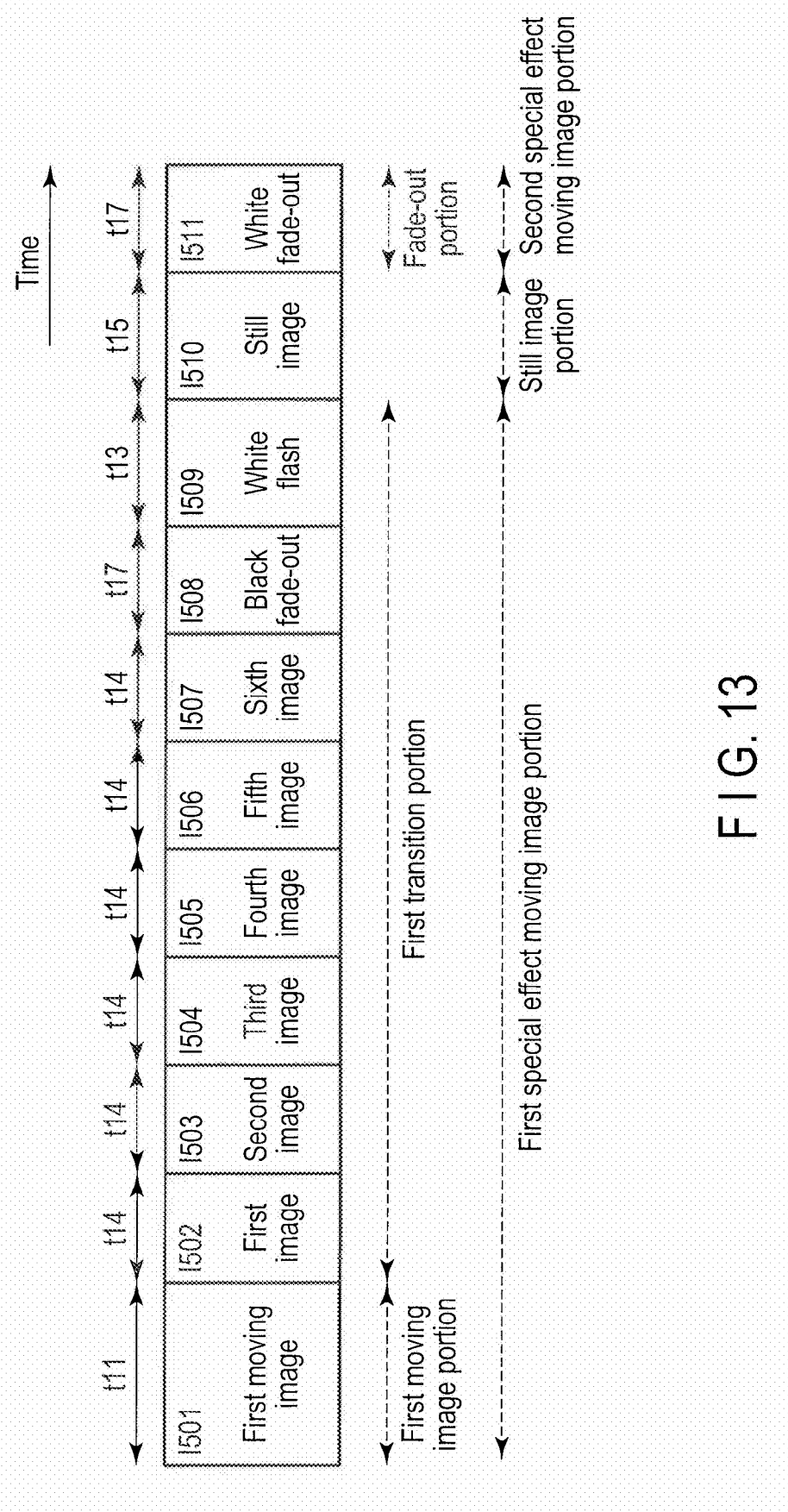
FIG. 13 is a view showing a structural example of images included in a fifth still and moving image created by the digital camera according to the embodiment.

As a fourth still and moving image, the image processing IC 102 creates a still and moving image having a scenario name "blur". The fourth still and moving image will now be described with reference to FIG. 11 and FIG. 12. As represented by an image I401 in FIG. 12, a first special effect moving image portion of the fourth still and moving image includes a moving image subjected to image processing as a first moving image portion. This moving image has been subjected to pop art style image processing, i.e., image processing for increasing a chroma of an image. Further, the moving image has been subjected to image processing for lowering the luminance in an image periphery like a toy photo and changing a color tone or contract. Furthermore, the moving image has been subjected to blurring processing like misting the entire image. This blurring processing is realized by giving fluctuations caused by movement to the image in horizontal and vertical directions, for example. FIG. 12 schematically shows processing like misting by hatching of horizontal lines. A time of this moving image is t11, and it is changed in accordance with each shooting as will be described later.

Moreover, as represented by images I402 to I405 in FIG. 12, the first special effect moving image portion includes moving images subjected to the pop art style image processing, the toy photo type image processing, and the blurring processing such as overall misting. Here, a diameter of an ellipse that defines a range where the peripheral light intensity is lowered changes with time. A time of the images I402 to I405 is 7×t14.

A still image portion of the fourth still and moving image has been subjected to the pop art style image processing and the toy photo type image processing as represented by an image I406 in FIG. 12. A time of this still image is t15.

As represented by images I407 to I410 in FIG. 12, a second special effect moving portion of the fourth still and moving image includes moving images which have been subjected to the pop art style image processing, the toy photo type image processing, and the blurring processing of misting the whole and in which a diameter of an ellipse defining a range where the peripheral light intensity is lowered varies with time as a second transition portion like the first special effect moving portion. A time of the images I407 to I410 is 7×t14. At the end, the second special effect moving portion includes a black fading-out moving image as a fade-out portion as represented by an image I411 in FIG. 12.

In this manner, in "blur" of the four still and moving image, the still image in the still image portion has been subjected to the pop art style image processing, the toy photo type image processing, and the blurring processing of misting the whole. To flatter this still image, the moving image in which the diameter of the ellipse defining the range where the peripheral light intensity is lowered varies with time is provided before and after this still image.

[Fifth Still and Moving Image]

The image processing IC 102 creates a still and moving image having a scenario name "pop art" as a fifth still and moving image. The fifth still and moving image will now be described with reference to FIG. 13 and FIG. 14. As presented by an image I501 in FIG. 14, a first special effect moving image portion of the fifth still and moving image includes a moving image subjected to image processing for lowering the chroma to obtain a pastel image as a first moving image portion. A time of this moving image is t11, and it is changed in accordance with each shooting as will be described later.

Figure 14:
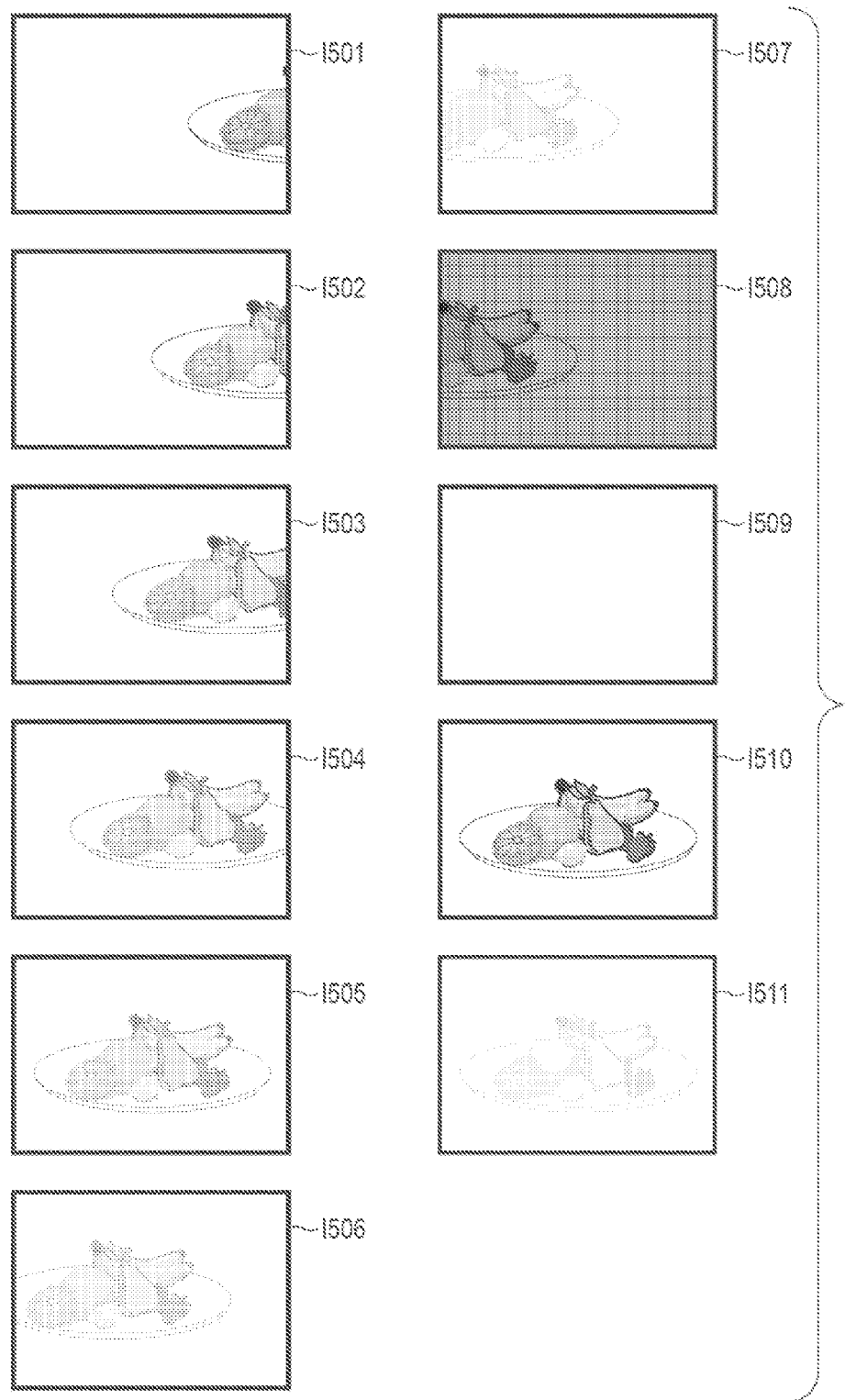
FIG. 14 is a view showing an outline of an example of the fifth still and moving image created by the digital camera according to the embodiment.
Figure 15:
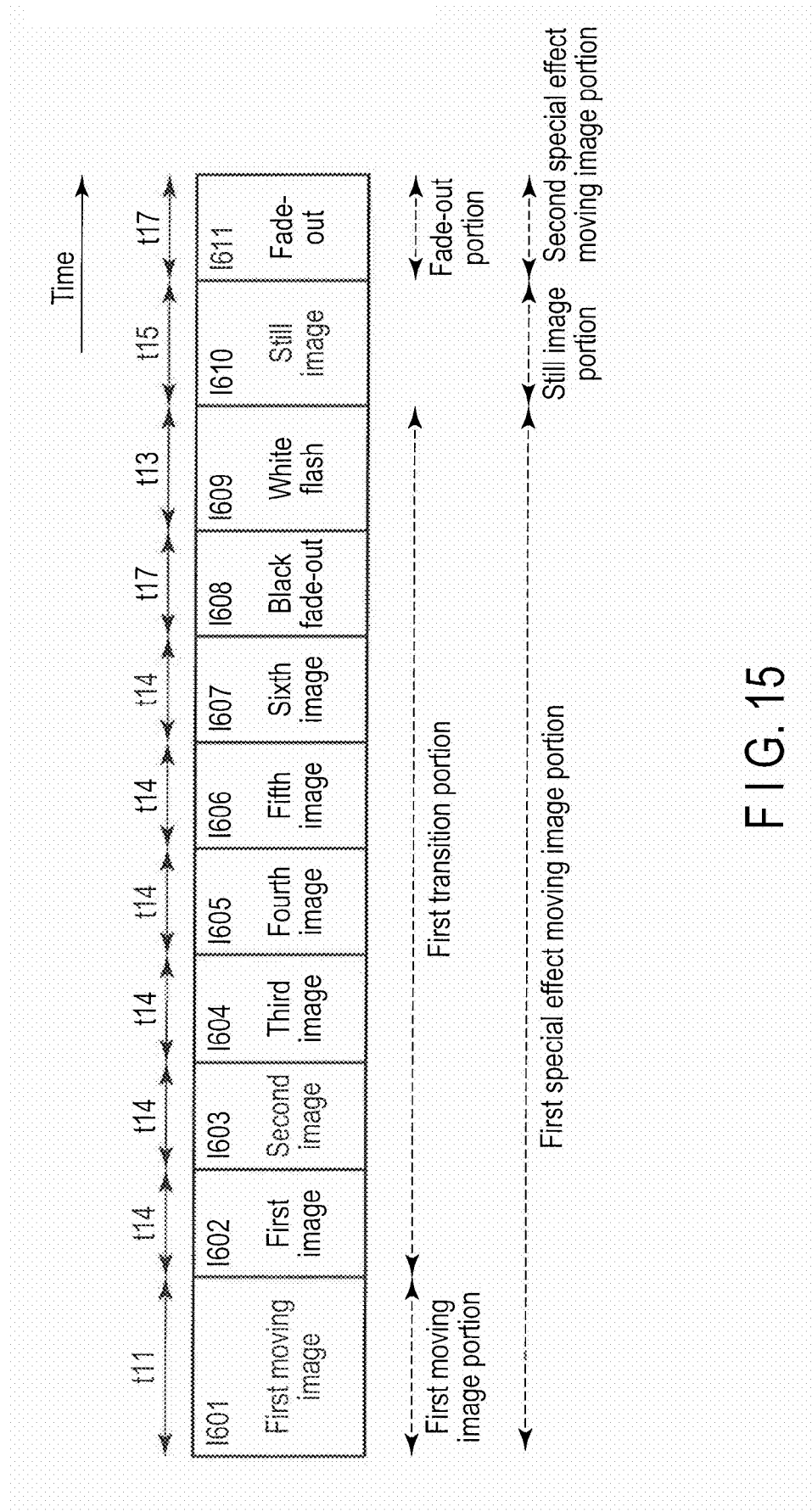
FIG. 15 is a view showing a structural example of images included in a sixth still and moving image created by the digital camera according to the embodiment.
Figure 17:
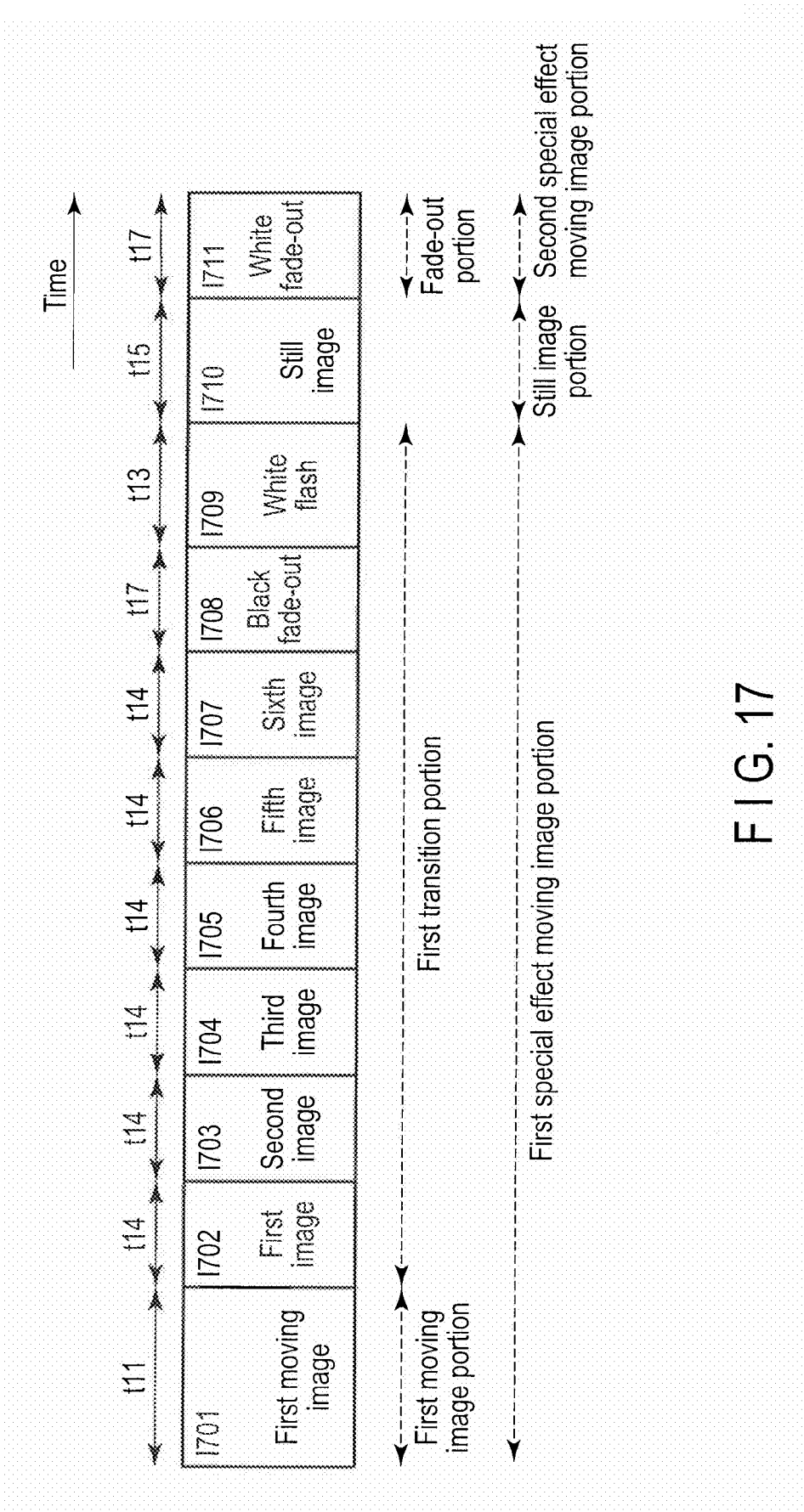
FIG. 17 is a view showing a structural example of images included in a seventh still and moving image created by the digital camera according to the embodiment.

Next, as represented by images I502 to I507 in FIG. 14, the first special effect moving image portion includes moving images subjected to image processing for gradually lowering the chroma from the pastel image represented by the image I501 to provide a monochromatic image as a first transition portion. Thereafter, as represented by an image I508 in FIG. 14, the first special effect moving image portion includes a black fading-out moving image. Further, as represented by an image I509, the first special effect moving image portion includes a white flash. A time of the black fade-out is t17, and a time of the white flash is t13. It is to be noted that each image having the lowered chroma is schematically shown as a thinly-printed image.

As represented by an image I510 in FIG. 14, a still image portion of the fifth still and moving image has been subjected to the pop art style image processing with high chroma. A time of this still image is t15. A second special effect moving image portion includes a white fading-out moving image as a fade-out portion as represented by an image I511 in FIG. 14.

As described above, in "pop art" of the fifth still and moving image, a still image of a still image portion has been subjected to the pop art style image processing with a distinguished chroma. To flatter this still image, a moving image in which the chroma is first gradually lowered to provide a monochromatic image is provided, black fade-out is effected, white flash is interposed, and then a pop art style still image is shown. In this manner, the chroma is gradually lowered, the white flash is used for pausing, and the still image with the high chroma is shown so that a viewer can recognize a visual gap between the special effect image and the still image, thereby emphasizing the chroma increasing effect in the still image portion.

[Sixth Still and Moving Image]

The image processing IC 102 creates a still and moving image having a scenario name "grainy film" as a sixth still and moving image. The sixth still and moving image will now be described with reference to FIG. 15 and FIG. 16. As represented by an image I601 in FIG. 16, a first special effect moving image portion of the sixth still and moving image includes a moving image that has not been subjected to special processing as a first moving image portion. A time of this moving image is t11, and it is changed in accordance with each shooting.

As represented by images I602 to I607 in FIG. 16, the first special effect moving image portion includes moving images subjected to image processing for gradually lowering the chroma and gradually changing an image into a monochromatic image as a first transition portion. A time of the images I602 to I607 is 6×t14. Furthermore, as represented by an image I608 in FIG. 16, the first special effect moving image includes black fade-out for gradually changing into a black image and subsequent white flash as the first transition portion. A time of the black fade-out is t17, and a time of the white flash is t13. It is to be noted that each image having the lowered chroma is schematically shown as a thinly-printed image in FIG. 16.

As represented by an image I610 in FIG. 16, a still image in a still image portion has been subjected to image processing for lowering the chroma to provide a monochromatic image. A time of this monochromatic still image is t15. As represented by an image I611 in FIG. 16, a second special effect moving image portion includes a white fading-out moving image as a fade-out portion.

As described above, in "grainy film" of the sixth still and moving image, the still image of the still image portion has been subjected to the image processing for changing the image into a monochromatic image. To flatter this still image, the moving images in which the chroma is first gradually lowered to provide the monochromatic image are provided, the black fade-out and the white flash for pausing are interposed, and then the monochromatic still image is again shown.

[Seventh Still and Moving Image]

The image processing IC 102 creates a still and moving image having a scenario name "gentle sepia" as a seventh still and moving image. The seventh still and moving image will now be described with reference to FIG. 17 and FIG. 18. As represented by an image I701 in FIG. 18, a first special effect moving image portion of the seventh still and moving image includes a moving image that has not been subjected to special processing as a first moving image portion. A time of this moving image is t11, and it is changed in accordance with each shooting as will be described later.

Figure 18:
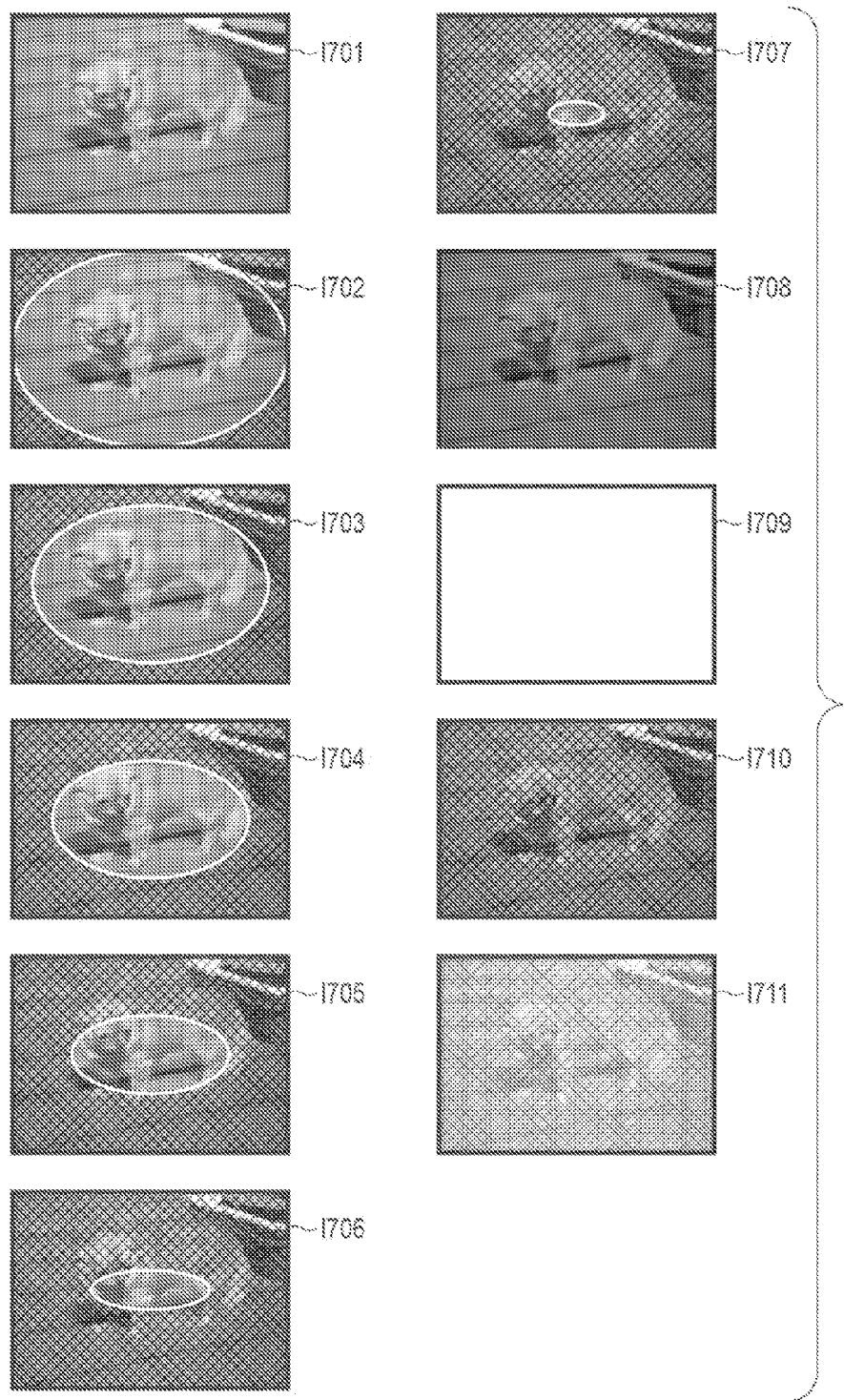
FIG. 18 is a view showing an outline of an example of the seventh still and moving image created by the digital camera according to the embodiment.
Figure 19:
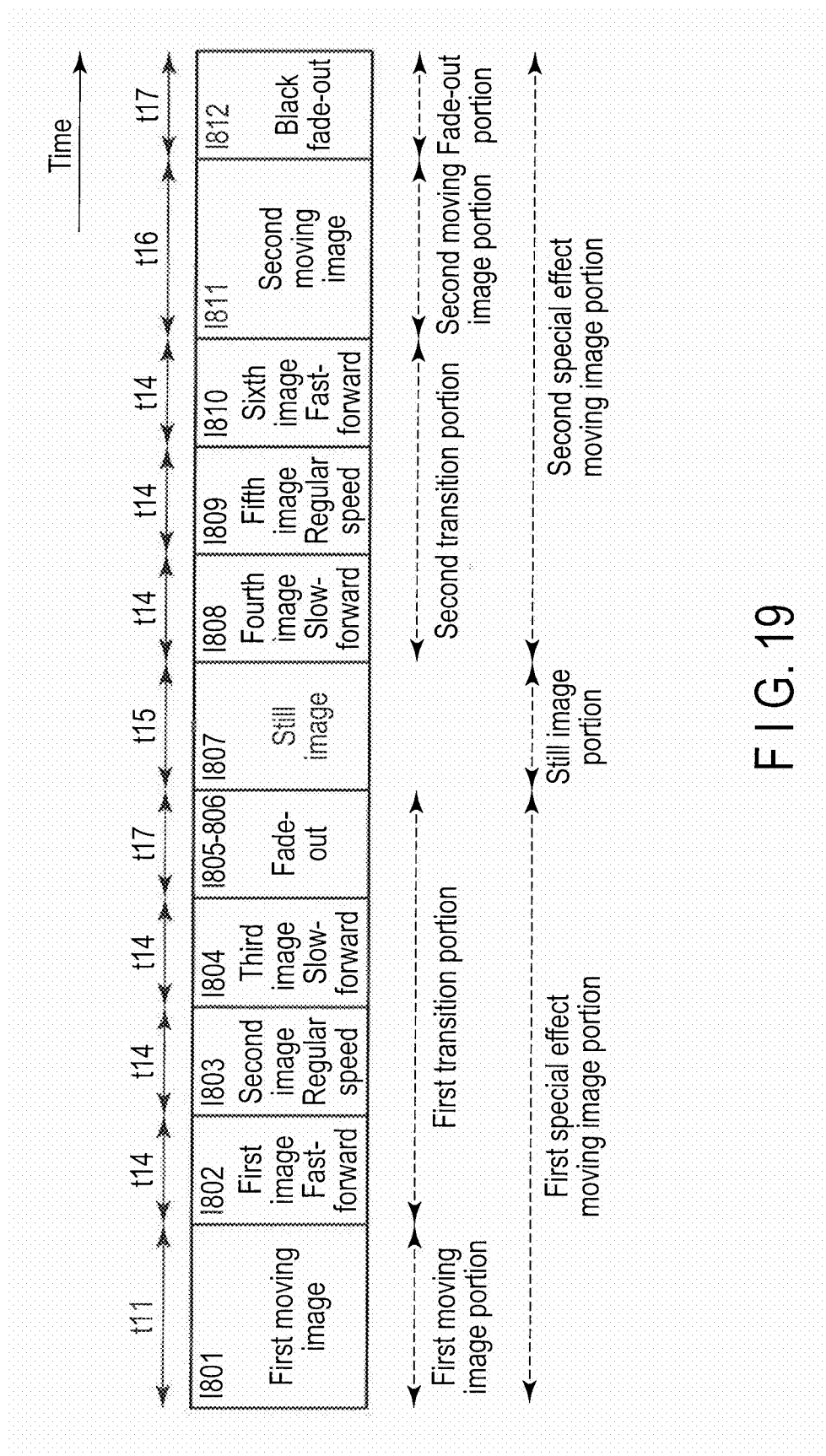
FIG. 19 is a view showing a structural example of images included in an eighth still and moving image created by the digital camera according to the embodiment.

As represented by images I702 to I707 in FIG. 18, the first special effect moving image portion further includes a moving image subjected to image processing for showing the outside of an ellipse having the center at a barycenter of each image in a sepia tone as a first transition portion. The inside of the ellipse is an unprocessed color image. This ellipse is minimized with time. Therefore, as represented by the images I702 to I707 in FIG. 18, the moving image is gradually changed into the sepia tone from the peripheral portion toward the central portion. A time of the images I702 to I707 is 6×t14. As represented by an image I708, the first special effect moving image portion further includes black fade-out for gradually changing the image into a black image and subsequent white flash. A time of the black fade-out is t17, and a time of the white flash is t13. It is to be noted that, in FIG. 18, each image in the sepia tone is schematically shown as a shaded image.

As represented by an image I710 in FIG. 18, a still image of a still image portion in the seventh still and moving image has been subjected to image processing for lowering the chroma to show each image in the sepia tone. A time of the still image in the sepia tone is t15. As represented by an image I711 in FIG. 18, a second special effect moving image portion of the seventh still and moving image includes a white fading-out moving image as a fade-out portion.

As described above, in "gentle sepia" as the seventh still and moving image, the still image of the still image portion has been subjected to the image processing for showing the image in the sepia tone. To flatter this still image, the moving image that changes into the sepia tone from the peripheral portion is provided, the black fade-out and the white flash for pausing are interposed, and then the sepia still image is again shown.

[Eighth Still and Moving Image]

The image processing IC 102 creates a still and moving image having a scenario name "slow motion" as an eighth still and moving image. The eighth still and moving image will now be described with reference to FIG. 19 and FIG. 20. As represented by an image I801 in FIG. 20, a first special effect moving image portion of the eighth still and moving image includes a moving image that has not been subjected to special processing as a first moving image portion. A time of this moving image is t11, and it is changed in accordance with each shooting as will be described later.

Figure 20:
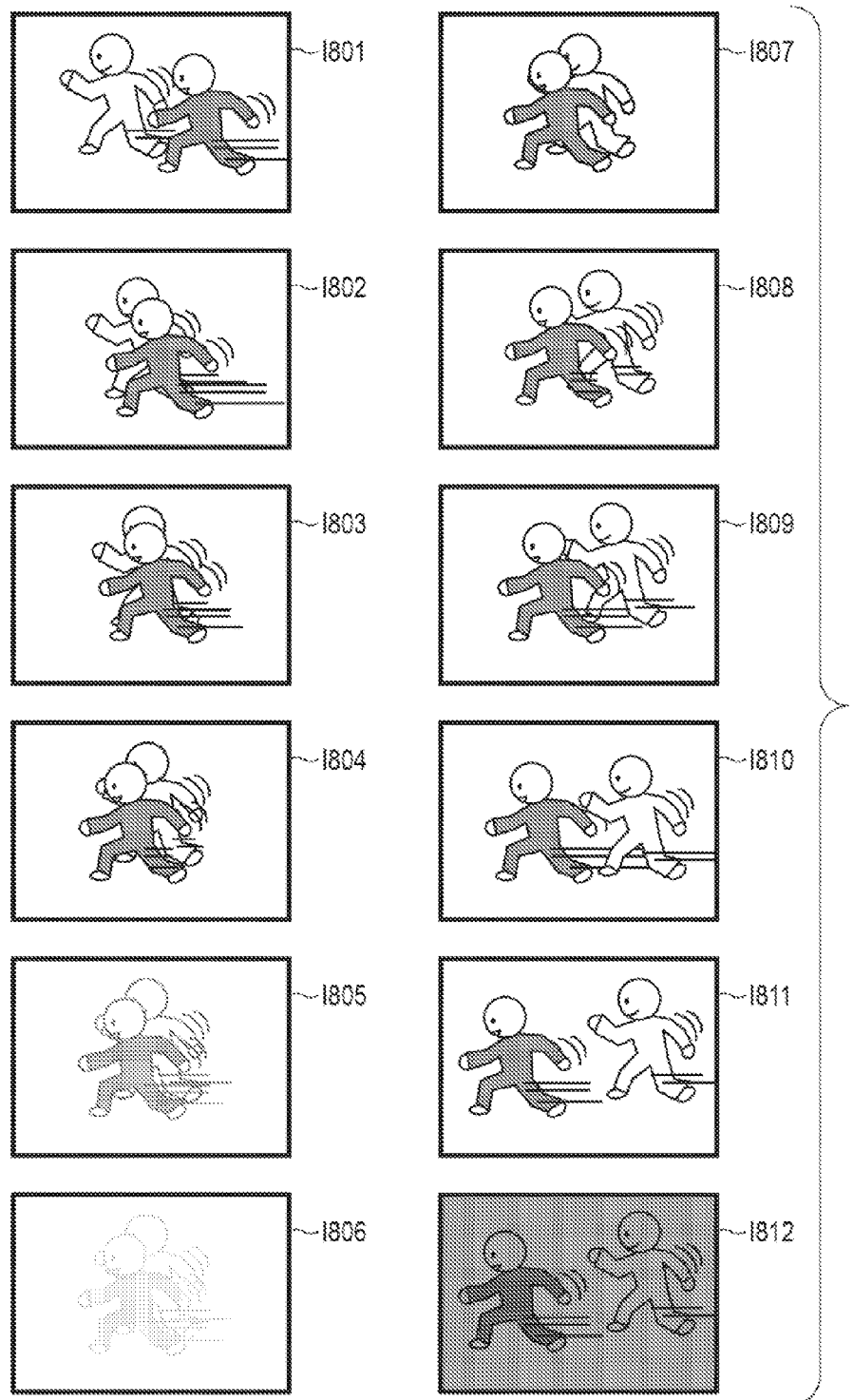
FIG. 20 is a view showing an outline of an example of the eighth still and moving image created by the digital camera according to the embodiment.

As represented by an image I802 in FIG. 20, the first special effect moving image portion further includes a moving image fast-forwarded beyond a regular speed as represented by an image I802 in FIG. 20, a moving image shown at the regular speed as represented by an image I803 in FIG. 20, and a moving image slow-forwarded as compared with the regular speed as represented by an image I804 in FIG. 20 as a first transition portion. In the fast-forward mode, for example, its speed is 1.1 to 1.4-fold of the regular speed. In the slow motion mode, for example, its speed is 0.9 to 0.7-fold of the regular speed. A time of each of the fast-forward mode, the regular speed mode, and the slow motion mode is t14. As represented by images I805 and I806 in FIG. 20, the first special effect moving image portion further includes white fade-out moving images as a first transition portion. A time of the white fade-out is t17.

As represented by an image I807 in FIG. 20, a still image portion of the eighth still and moving image includes a still image that has not been subjected to image processing. A time of this still image is t15.

A second still effect moving image portion of the eighth still and moving image includes a moving image slow-forwarded at a speed lower than a regular speed as represented by an image I808 in FIG. 20, a moving image shown at a regular speed as represented by an image I809 in FIG. 20, and a moving image fast-forwarded at a higher speed than the regular speed as represented by an image I810 in FIG. 20 as a second transition portion. In the slow motion mode, for example, its speed is 0.9 to 0.7-fold the regular speed. In the fast-forward mode, for example, its speed is 1.1 to 1.4-fold the regular speed. A time of each of the slow motion mode, the regular speed mode, and the fast-forward mode is t14. As represented by an image I811 in FIG. 20, the second special moving image portion further includes a moving image that has not been subjected to special processing as a second moving image portion. A time of the moving image is t16. As represented by an image I812 in FIG. 20, the second special effect moving image portion further includes a black fade-out moving image as a fade-out portion. A time of the black fade-out is t17.

As described above, in "slow motion" as the eighth still and moving image, gaps in speed are emphasized as the fast-forward, the regular speed, and the slow speed before the still image to enhance the effect of slow motion, and the gaps in speed are emphasized as the slow speed, the regular speed, and the fast-forward after the still image. That is, for example, when the slow-forward mode is used after the fast-forward mode, the slow-forward effect is emphasized. In this manner, the still image is flattered in the eighth still and moving image.

As shown in schematic views of FIG. 21A and FIG. 21B, in the still and moving image, the first special effect moving image portion is provided before the still image portion subjected to the special effect. The first moving image portion and the first transition portion that connects the first moving image portion with the still image portion are provided to the first special effect moving image portion. As the still and moving image, there are such an image that is immediately terminated since fade-out is effected immediately after the still image portion as shown in FIG. 21A and such an image that includes a second transition portion and a second moving image portion after the still image portion as shown in FIG. 21B. It is to be noted that the still image is subjected to the image processing in each of the first to seventh still and moving images, but the still image is not subjected to the image processing in the eighth still and moving image.

As described above, in each of the first to seventh still and moving images, the moving images of the special effect moving image portion that flatter the still image of the still image portion are provided. For example, in "echo" of the third still and moving image, since the still image of the still image portion is subjected to the soft focus processing, an echo effect similar to the soft focus effect and the soft focus effect are given to the moving images of the special effect moving image portion to flatter this soft focus. Further, for example, in "pop art" of the fifth still and moving image, since the still image of the still image portion has been subjected to the pop art processing that raises the chroma, each moving image in the special effect moving image portion is subjected to monochromatic image that reduces the chroma to obtain a monochromatic image as opposite to the pop art processing, thereby flattering this pop art processing. When the effect that is similar to or opposite to the special effect given to the still image of the still image portion is applied to each image of the special effect moving image portion, the still image is further flattered. That is, the moving image special effect processing that is ingenious according to the still image special effect processing is prepared as a scenario. When scenarios are prepared and a photographer selects a scenario in accordance with a subject, a still and moving image having an intended special effect given thereto can be easily created.

It is to be noted that the above is just an example, and it can be appropriately changed. For example, the fade-in portion and the fade-out portion in each still and moving image may be provided or may not be provided. Therefore, each image that has the fade-in portion in the above explanation may not include the fade-in portion, or each image that has no fade-in portion in the above explanation may include the fade-in portion. The fade-in may be black fade-in or white fade-in, or it may be fade-in from other colors. The fade-out may be black fade-out or white fade-out, or it may be fade-out into other colors.

Moreover, the number of times of white flash may be changed, and the white flash may be inserted only once in a scenario in which the white flash is interposed, or this number may be changed so that no white flash is interposed. Additionally, the number of times of repeating a portion that is repeated, a continuation time, and others can be changed. Further, in a scenario in which the second moving image portion is provided, the second moving image portion may not be provided. Furthermore, in a scenario in which the second moving image portion is not provided, the second moving image portion may be provided as a change.

Moreover, it is possible to create a still and moving image that is not mentioned above and in which effects selected from the following group of the effects included in the respective still and moving images are appropriately combined: the fade-out effect that an entire image gradually changes into a white image or a black image; a fade-in effect that an entire image gradually changes from a white image or a black image; the white flash effect that an entire image changes into a white image in a short time; the sepia effect that a color image gradually changes into a sepia image or a sepia image gradually changes into a color image; a monochrome effect that a color image gradually changes into a monochromatic image or a monochromatic image gradually changes into a color image; the chroma change effect that chroma of an image gradually changes; gradation change effect that a gradation of an image gradually changes; the soft focus effect for blurring an image; the echo effect that an afterimage effect is obtained by superimposing images corresponding to a predetermined number of frames; the slow motion effect for changing the number of frames included per unit time to vary a reproduction speed; the blur effect for misting an image; pinhole effect for reducing a peripheral luminance of an image; and the toy photo effect for lowering the peripheral luminance of an image to change a hue or contrast.

Figure 22:
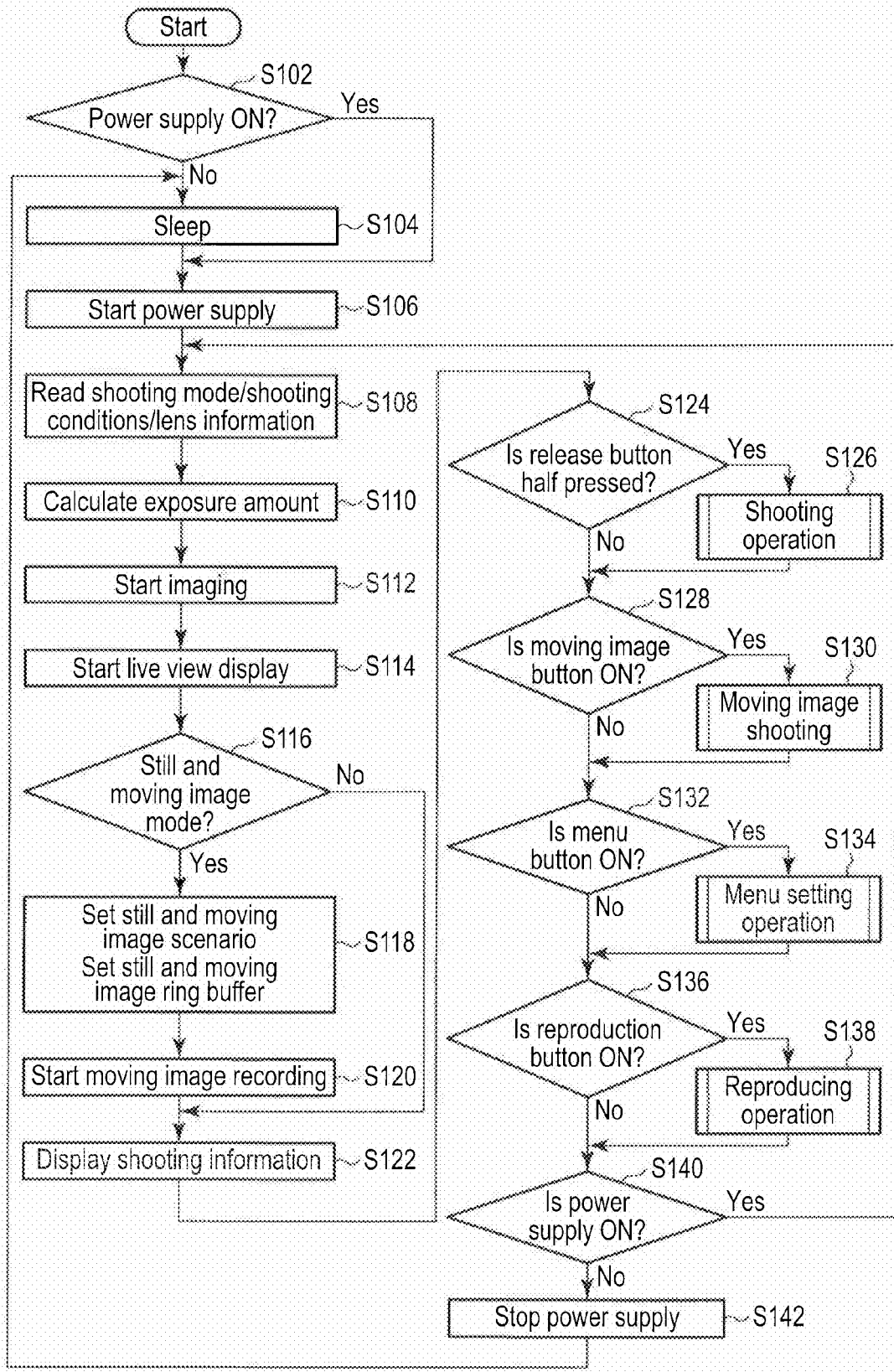
FIG. 22 is a flowchart showing an example of main processing executed by the digital camera according to the embodiment.

An operation of the digital camera 1 according to this embodiment will now be described with reference to FIG. 22. At step S102, the control microcomputer 101 determines whether a power supply is ON. When it is determined that the power supply is ON, the processing advances to step S106. On the other hand, when it is determined that the power supply is not ON, the processing advances to step S104. At step S104, the control microcomputer 101 stands by in a sleep mode. When a signal indicative of activation from the sleep state is input to the control microcomputer 101, the processing advances to step S106. For example, when the power supply ON/OFF lever 22 is turned on, the processing advances to step S106. Therefore, the control microcomputer 101 periodically confirms presence/absence of the signal indicative of activation from the sleep state. At step S106, the control microcomputer 101 starts supply of electric power to each unit in the digital camera 1.

At step S108, the control microcomputer 101 communicates with each unit in the digital camera 1 and reads a shooting mode, shooting conditions, lens information, and others. At step S110, the control microcomputer 101 executes an exposure amount arithmetic operation based on shooting conditions or an intensity detection result and determines an exposure parameter for appropriate exposure. At step S112, the control microcomputer 101 starts imaging. That is, it opens the shutter 120, allows the imaging element 111 to start photoelectric conversion, and executes image processing using the image processing IC 102 to create a live view image. At step S114, the control microcomputer 101 starts live view display for displaying the obtained live view image in the display monitor 140.

At step S116, the control microcomputer 101 determines whether a still and moving image mode is being used. The still and moving image mode is a characteristic mode concerning this embodiment, and it is a mode for recording a still and moving image having processed moving images added before or before and after a still image to emphasize an impression of the still image for a viewer. As described above, the scenarios associated with processing combinations of a still image and moving images are prepared as the still and moving images. When nonuse of the still and moving image mode is determined, the processing advances to step S122. On the other hand, when use of the still and moving image mode is determined, the processing advances to step S118.

At step S118, the control microcomputer 101 determines a scenario of a still and moving image based on selection of a user. Furthermore, the control microcomputer 101 assures a region for a still and moving image ring buffer in the SDRAM 104. At step S120, the control microcomputer 101 starts recording of a moving image in the ring buffer region in the SDRAM 104 set at step S118. That is, each live view image during a predetermined period up to the present is sequentially recorded as a moving image in the SDRAM 104.

It is to be noted that, if the current mode is not the still and moving image mode, releasing the region without assuring it for the ring buffer enables enlarging the region of the SDRAM 104 that can be used for still image recording. When the region of the SDRAM 104 that can be used for still image recording is enlarged, the number of shots in a continuous shooting mode can be increased. Moreover, suppression of continuous access to the SDRAM 104 can reduce the power consumption.

At step S122, the control microcomputer 101 displays shooting information in the display monitor 140. At step S124, the control microcomputer 101 determines whether the release button is half pressed. When it is determined that the release button is half pressed, the processing advances to step S126. At step S126, the control microcomputer 101 executes the shooting operation processing.

Figure 23A:
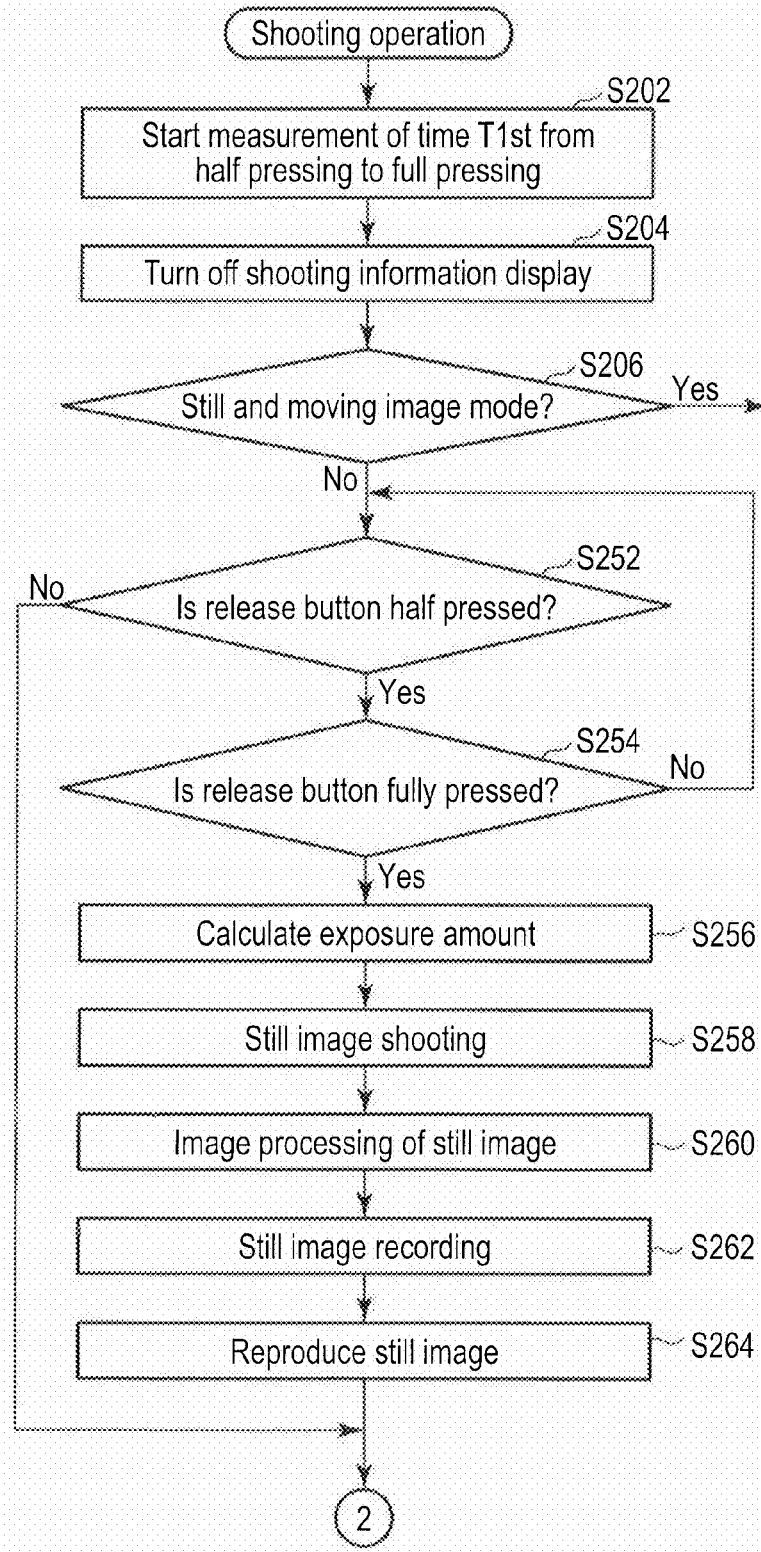

The shooting operation processing will now be described with reference to FIGS. 23A and 23B. At step S202, the control microcomputer 101 starts a timer 105 to measure a time T1st until the release button is fully pressed from the half-pressed state. At step S204, the control microcomputer 101 turns off the shooting information display shown in the display monitor 140. At step S206, the control microcomputer 101 determines whether the current mode is the still and moving image mode. If the current mode is determined to be the still and moving image mode, the processing advances to step S208.

At step S208, the control microcomputer 101 determines whether the release button is still half pressed even now. When it is determined that that release button is not half pressed, the shooting operation processing is terminated, and the processing returns to a main flow explained with reference to FIG. 22. At step S208, when it is determined that the release button has been half pressed, the processing advances to step S210.

At step S210, the control microcomputer 101 determines whether a time T1st until the release button is fully pressed from the half pressed state measured by the timer 105 is a predetermined time t11_min or more. If T1st is smaller than t11_min, the processing returns to step S208. On the other hand, when T1st is 11_min or more, the processing advances to step S212. In this manner, full pressing of the release button is not accepted until a moving image whose length is later-described t11_min or more that is required for the still and moving image is recorded in the ring buffer. At step S212, the control microcomputer 101 determines whether the release button has been fully pressed. When it is determined that the release button has not been fully pressed, the processing returns to step S208. On the other hand, if it is determined that this button has been fully pressed, the processing advances to step S214.

Figure 24:
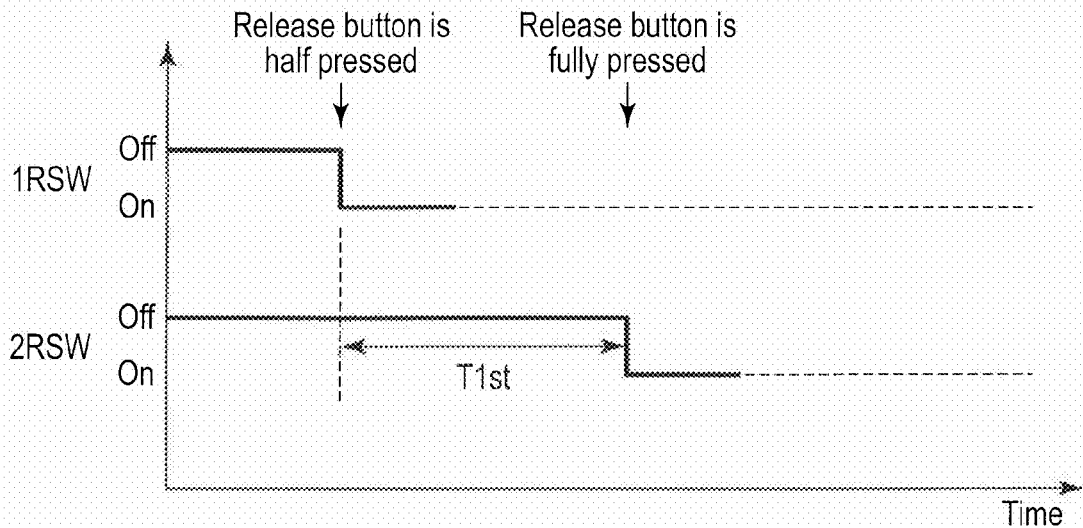
FIG. 24 is a view showing an outline of a relationship between pressing a release button and ON/OFF of a release switch of the digital camera according to the embodiment.

At step S214, the control microcomputer 101 decides on the time T1st until the release button is fully pressed from the half pressed state based on a counter value. As shown in FIG. 24, the time T1st is a time from the moment that the 1st release switch 1RSW is turned on to the moment that the release button is fully pressed, i.e., the 2nd release switch 2RSW is turned on.

Figure 25:
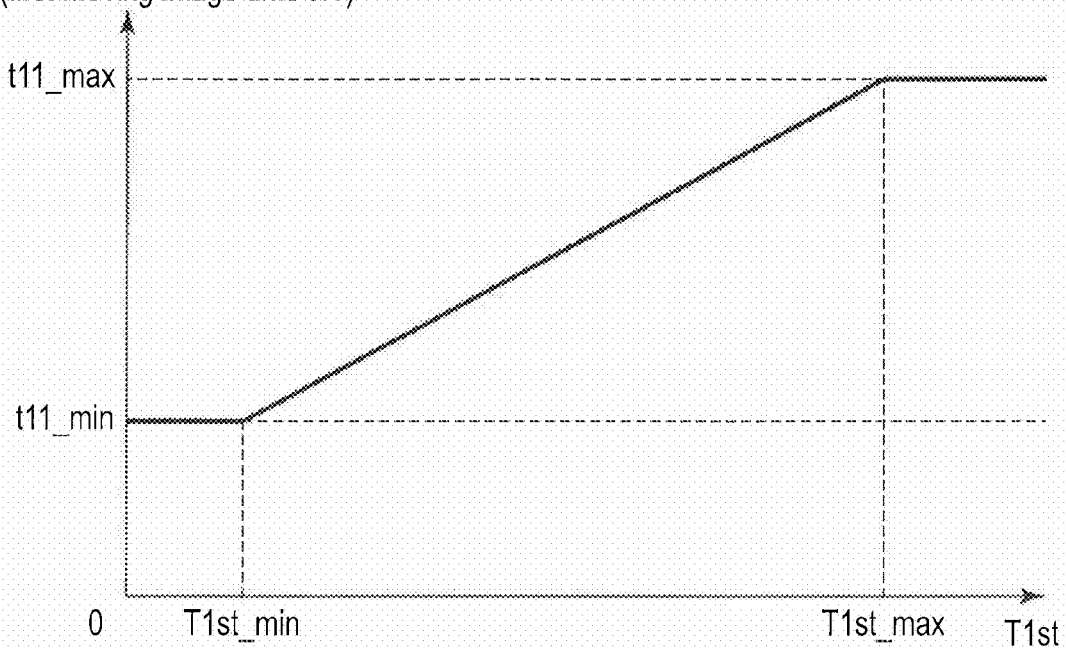
FIG. 25 is a view showing an example of a relationship between a time required for the release button to be fully pressed from a half-pressed state and a first moving image time of the digital camera according to the embodiment.

At step S216, the control microcomputer 101 determines a first moving image time t11 which is a continuation time of the first moving image portion based on the time T1st. The first moving image time t11 is determined based on, e.g., such a relationship as shown in FIG. 25. That is, when the time T1st until the release button is fully pressed from the half pressed state is the predetermined time T1st min or less, the first moving image time t11 is set to the predetermined time t11_min. Additionally, when the time T1st is a predetermined time T1st max or more, the first moving image time t11 is set to the predetermined time t11_max. When the time T1st is equal to T1st min or more and equal to T1st max or less, the first moving image time t11 is set to a time that is proportionate to T1st. In this manner, the longer the time T1st is, the longer the first moving image time t11 is.

In this embodiment, on the assumption that a photographer demands a longer moving image time, based on the fact that a time during which the release button is half pressed is longer, the control microcomputer 101 sets the first moving image time t11 associated with the time during which the release button is half pressed. According to this embodiment, a photographer's intention is reflected on the still and moving image to be created. Further, when the first moving time t11 is set to be equal to t11_min or more and equal to t11_max or less, the still and moving image is adjusted to unnecessarily become extremely short or long.

It is to be noted that the relationship between the first moving image time t11 and the time T1st is not restricted to such a relationship as shown in FIG. 25, and it may be, e.g., a relationship represented by a curve, or the first moving image time t11 may be constantly set to a predetermined length. It is to be noted that t11_max is also restricted by a size of the region of the ring buffer set in the SDRAM 104. Additionally, the measurement of T1st may be started at a timing that the power supply ON/OFF lever 22 is turned on in place of a timing that the release button is half pressed. When this timing is adopted, it is possible to reduce the number of times that full pressing of the release button is not accepted because the time T1st is shorter than t11_min. Furthermore, in the above example, when the still and moving image mode is selected, although recording of each moving image into the ring buffer is started at the timing that the power supply ON/OFF lever 22 is turned on, the recording of each moving image may be started when the release button is half pressed, for example.

At step S218, the control microcomputer 101 calculates a time t20 which is an overall time of the still and moving image based on the selected scenario. At step S220, the control microcomputer 101 calculates an exposure amount and determines exposure conditions such as a shutter speed or an aperture value. At step S222, the control microcomputer 101 executes still image shooting. At step S224, the control microcomputer 101 allows the image processing IC 102 to execute image processing with respect to the still image obtained at step S222. This image processing includes processing such as commonly performed gamma conversion and also includes image processing associated with a scenario. At step S226, the control microcomputer 101 records the created still image in the recording medium 131.

At step S228, the control microcomputer 101 determines whether the moving image time recorded in the ring buffer is a total time t20 or more. When the moving image time is shorter than t20, the processing repeats step S228 and continues recording the moving image into the ring buffer. On the other hand, when the moving image time is t20 or more, the processing advances to step S230. At step S230, the control microcomputer 101 performs rec view display for displaying the still image created at step S224 in the display monitor 140.

At step S232, the control microcomputer 101 stops storage of a moving image into the ring buffer. At step S234, the control microcomputer 101 allows the image processing IC 102 to perform editing based on the moving image stored in the ring buffer, thereby creating a special effect moving image portion. At step S236, the control microcomputer 101 records a still and moving image file concerning the special effect moving image portion created at step S234. At step S238, the control microcomputer 101 resets and opens the ring buffer. It is to be noted that the processing of step S232 to step S238 is executed during the rec view display. Then, the processing is returned to the main flow explained with reference to FIG. 22.

When the control microcomputer 101 determines that the current mode is not the still and moving image mode at step S206, the processing advances to step S252. At step S252, the control microcomputer 101 determines whether the release button is still half pressed. When it is determined that the release button has not been half pressed, the shooting operation processing is terminated, and the processing returns to the main flow explained with reference to FIG. 22. At step 252, it is determined that the release button has been half pressed, and the processing advances to step S254.

At step S254, the control microcomputer 101 determines whether the release button has been fully pressed. If it is determined that the release button has not been fully pressed, the processing returns to step S252. On the other hand, if it is determined that the release button has been fully pressed, the processing advances to step S256. At step S256, the control microcomputer 101 calculates an exposure amount and determines exposure conditions such as a shutter speed or an aperture value. At step S258, the control microcomputer 101 allows the imaging element 111 to execute still image shooting.

At step S260, the control microcomputer 101 allows the image processing IC 102 to execute general image processing to the still image obtained at step S258. Additionally, the image processing includes processing for adding a special effect to an image, e.g., a so-called art filter if a photographer desires. At step S262, the control microcomputer 101 records a created still image in the recording medium 131. At step S264, the control microcomputer 101 performs rec view display of the created still image in the display monitor 140. Then, the processing returns to the main flow described with reference to FIG. 22.

Again referring to FIG. 22, the explanation of the main flow will be continued. After the shooting operation processing, the control microcomputer 101 advances to step S128. At step S124, when it is determined that the release button is not half pressed, the processing advances to step S128. At step S128, the control microcomputer 101 determines whether the moving image button is ON. If it is determined that the moving image button is ON, the processing advances to step S130. At step S130, the control microcomputer 101 executes the moving image shooting processing.

Figure 26:
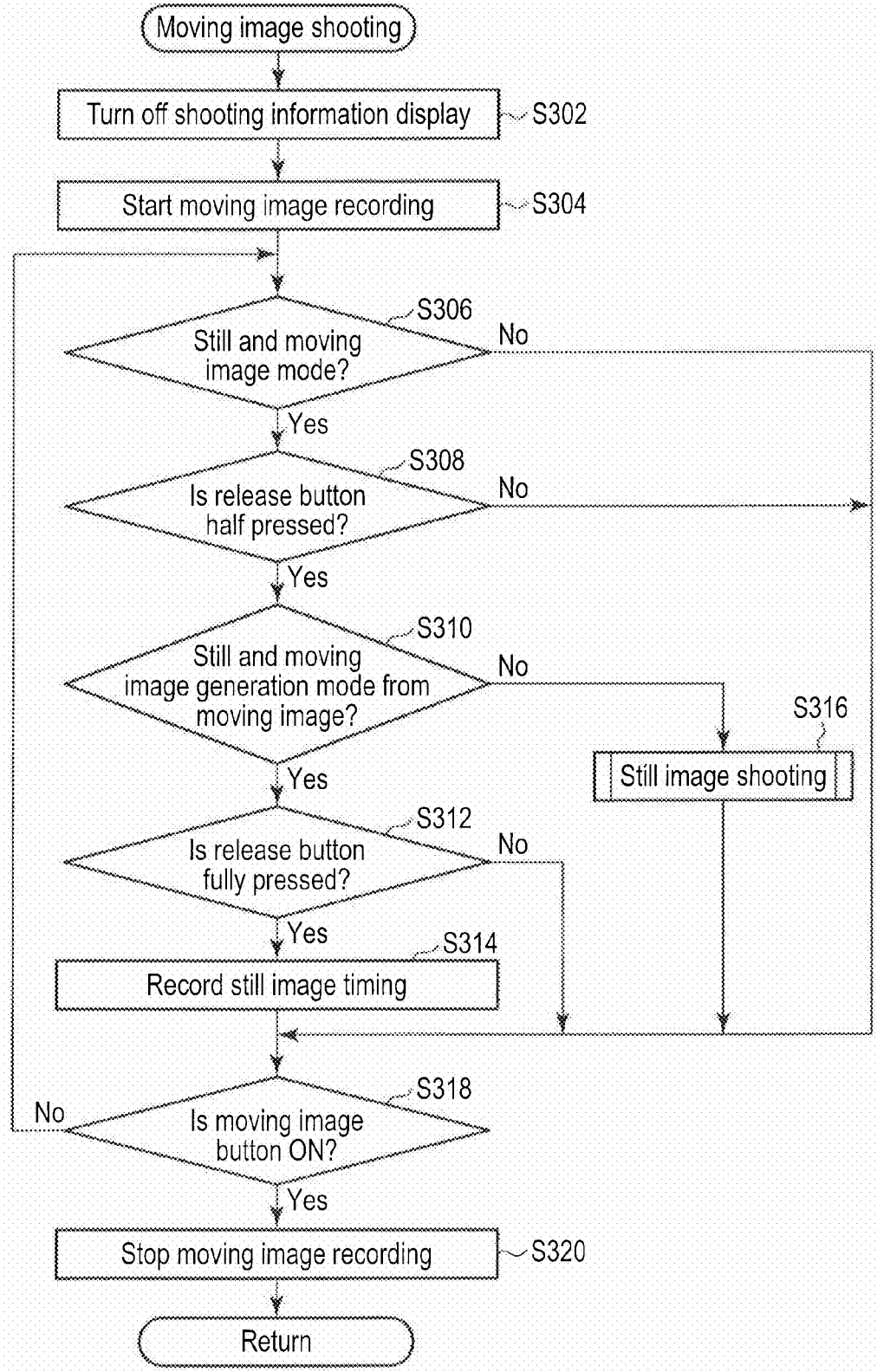
FIG. 26 is a flowchart showing an example of moving image shooting processing executed by the digital camera according to the embodiment.

The moving image shooting processing will now be described with reference to FIG. 26. At step S302, the control microcomputer 101 turns off the shooting information display shown in the display monitor 140. At step S304, the control microcomputer 101 starts recording of a moving image. At step S306, the control microcomputer 101 determines whether the current mode is the still and moving image mode. If it is determined that the current mode is not the still and moving image mode, the processing advances to step S318. On the other hand, if it is determined that the current mode is the still and moving image mode, the processing advances to step S308.

At step S308, the control microcomputer 101 determines whether the release button has been half pressed. If it is determined that the release button has not been half pressed, the processing advances to step S318. On the other hand, if it is determined that the release button has been half pressed, the processing advances to step S310.

At step S310, the control microcomputer 101 determines whether the current mode is a mode for generating a still and moving image from a moving image. If it is determined that the current mode is the mode for generating a still and moving image from a moving image, the processing advances to step S312. At step S312, the control microcomputer 101 determines whether the release button has been fully pressed. If it is determined that it has not been fully pressed, the processing advances to step S318. On the other hand, if it is determined that the release button has been fully pressed, the processing advances to step S314. At step S314, the control microcomputer 101 records a timing at which the release button is fully pressed, i.e., still image timing in association with a moving image. Then, the processing advances to step S318.

At step S310, if the control microcomputer 101 determines that the current mode is not the mode for generating a still and moving image from a moving image, the processing advances to step S316. At step S316, the control microcomputer 101 executes still image shooting processing.

Figure 27:
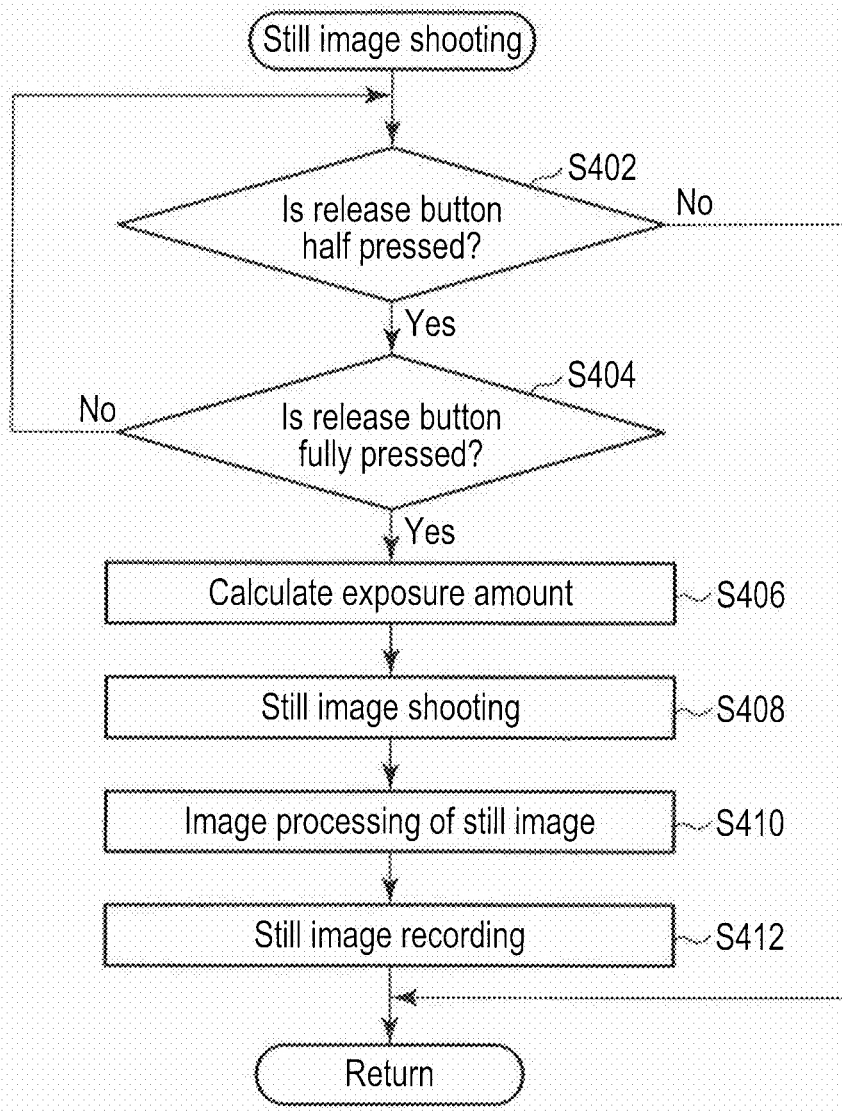
FIG. 27 is a flowchart showing an example of still image shooting processing executed by the digital camera according to the embodiment.

The still image shooting processing will now be described with reference to FIG. 27. At step S402, the control microcomputer 101 determines whether the release button is still half pressed. If it is determined that the release button has not been half pressed, the still image shooting processing is terminated, and the processing returns to the moving image shooting processing described with reference to FIG. 26. At step S402, if it is determined that the release button has been half pressed, the processing advances to step S404. AT step S404, the control microcomputer 101 determines whether the release button has been fully pressed. If it is determined that the release button has not been fully pressed, the processing returns to step S402. On the other hand, if it is determined that the release button has been fully pressed, the processing advances to step S406.

At step S406, the control microcomputer 101 calculates an exposure amount and determines exposure conditions such as a shutter speed or an aperture value. At step S408, the control microcomputer 101 performs still image shooting. At step S410, the control microcomputer 101 allows the image processing IC to perform image processing with respect to a still image obtained at step S408. This image processing includes commonly executed processing. Further, this image processing includes processing for adding a special effect to an image like a so-called art filter if a photographer so demands. At step S412, the control microcomputer 101 records the created still image in the recording medium 131. Thereafter, the processing returns to the moving image shooting processing described with reference to FIG. 26.

Again referring to FIG. 26, the explanation of the moving image shooting processing will be continued. After the end of the still image shooting processing, the processing advances to step S318. At step S318, the control microcomputer 101 determines whether the moving image button has been again turned on. If the moving image button is not ON, the processing returns to step S306. On the other hand, when the moving image button is ON, the processing advances to step S320. At step S320, the control microcomputer 101 stops the moving image recording. Thereafter, the processing returns to the main flow explained with reference to FIG. 22.

According to the moving image shooting processing, if the current mode is not the still and moving image mode, the moving image alone is recorded. If the current mode is the still and the moving image mode and it is not the mode for generating a still and moving image from a moving image, like the shooting operation processing, the moving image and the still image are recorded, the first special effect moving image portion and the second special effect moving image portion are generated from the moving image after end of the moving image shooting, thereby generating a still and moving image. On the other hand, if the current mode is the still and moving image mode and also the mode for generating a still and moving image from a moving image, timing at which the still image was shot is recorded when the release button is pressed during recording the moving image. Based on this recording, the first special effect moving image portion, the still image portion, and the second special effect moving image portion are generated from the moving image after end of shooting the moving image, thereby creating the still and the moving image.

Figure 28A:
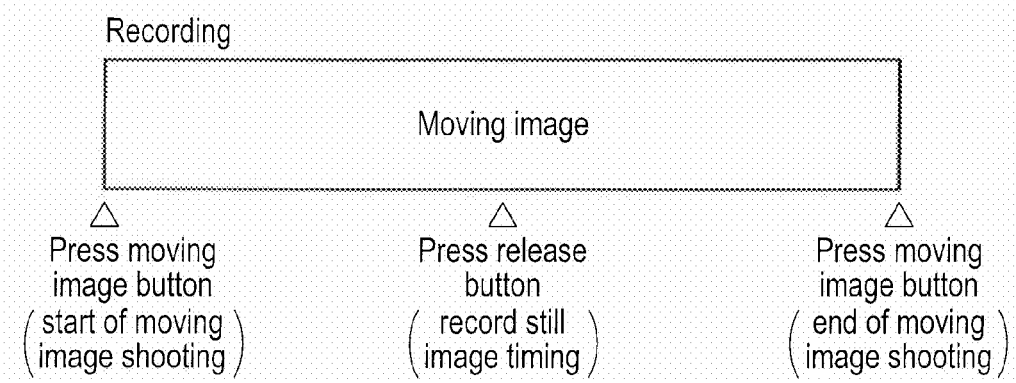
FIG. 28A is a view for explaining creation of a still and moving image from a moving image obtained by the digital camera according to the embodiment.

Generation of a still and moving image from a moving image will now be described with reference to schematic views shown in FIG. 28A and FIG. 28B. As shown in FIG. 28A, the moving image is recorded from start of the moving image shooting by pressing the moving image button to end of the moving image shooting by subsequently pressing the moving image button. Further, the still image timing during the moving image shooting is recorded.

Figure 28B:
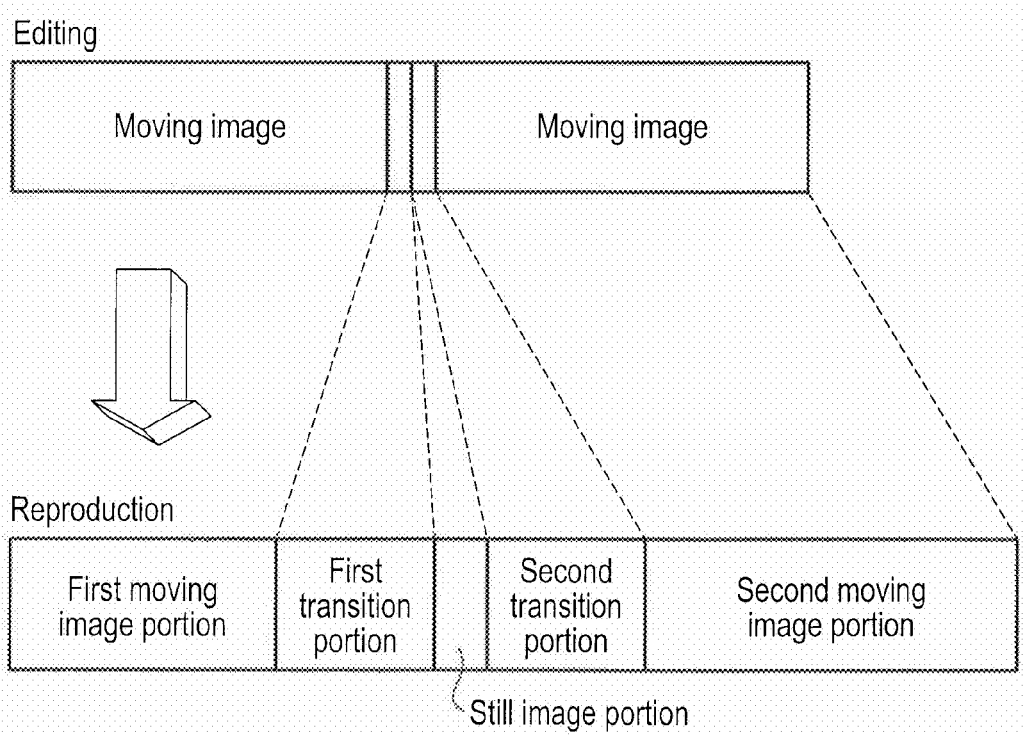
FIG. 28B is a view for explaining creation of a still and moving image from a moving image obtained by the digital camera according to the embodiment.

As shown in FIG. 28B, a still image subjected to special processing constituting the still image portion is created from the moving image in FIG. 28A, and the first transition portion and the second transition portion are generated before and after this still image. Moreover, moving images before and after the still image are used as the first moving image portion and the second moving image portion. As described above, the still and moving image is created from the moving image. The still and moving image created from the moving image in this manner may be saved as a still and moving image file. Further, the still and moving image may be created and reproduced from the moving image every time the reproduction is carried out.

Again referring to FIG. 22, the explanation of the main flow will now be described. After the moving image shooting processing, the control microcomputer 101 advances the processing to step S132. In the determination at step S128, if it is determined that the moving image button is not ON, the processing advances to step S132. At step S132, the control microcomputer 101 determines whether the menu button has been turned on. When it is determined that the menu button has been turned on, the processing advances to step S134. At step S134, the control microcomputer 101 executes menu setting operation processing.

The menu setting operation processing will now be described with reference to a flowchart shown in FIG. 29. At step S502, the control microcomputer 101 determines whether the current mode is a still and moving image mode. When it is determined that the current mode is the still and the moving image mode, the processing advances to step S504. At the step S504, the control microcomputer 101 executes a still image type selecting operation. That is, the control microcomputer 101 displays, e.g., such a selection screen as shown in FIG. 30 in the display monitor 140. For example, as shown in FIG. 30, a list of scenarios for the still and moving image, e.g., zoom or flashback is displayed, and a photographer selects a type of the still and moving image by operating the touch panel 150 or the cross button 21 of the operation unit 160.

Figure 31:
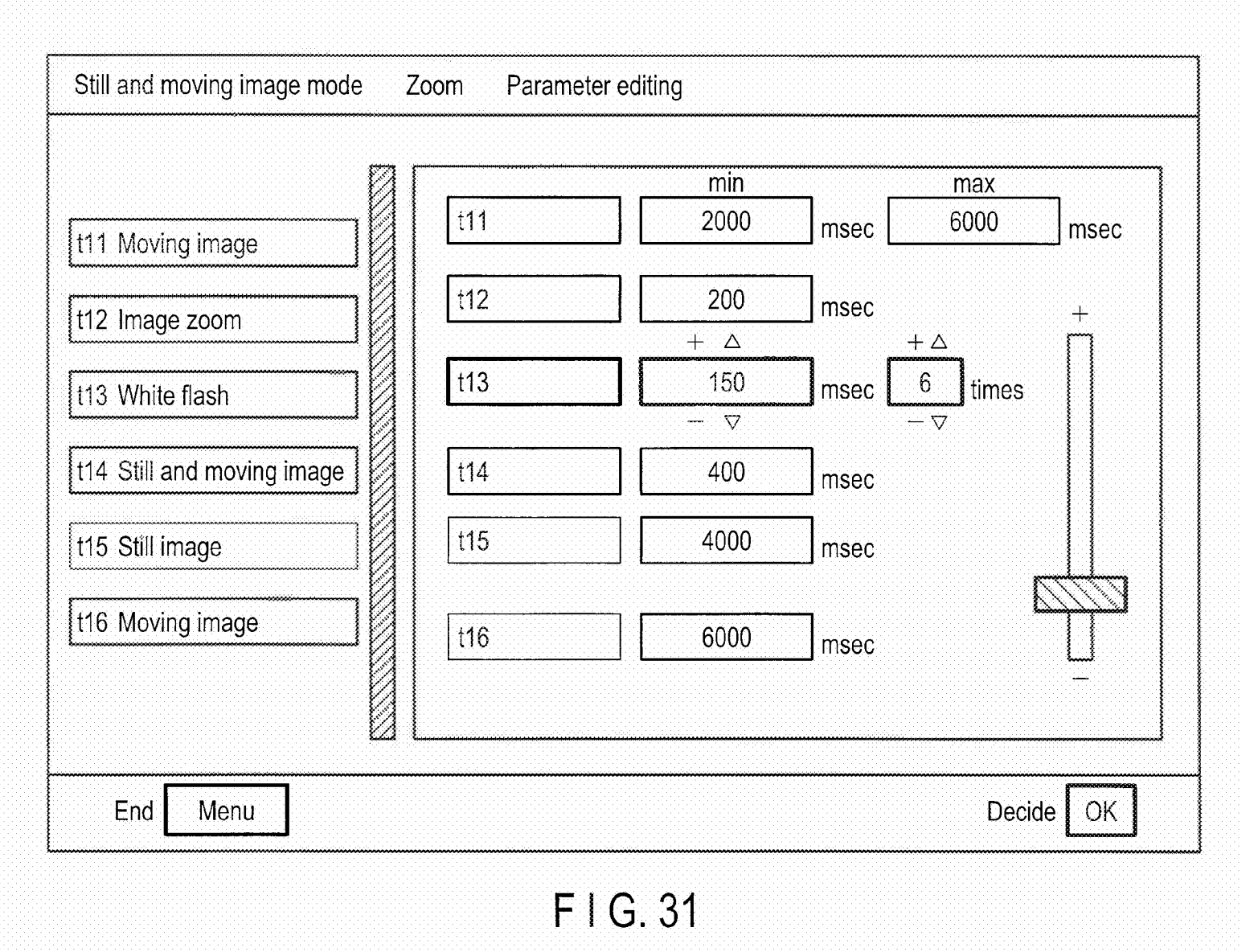

At step S506, the control microcomputer 101 performs a parameter editing operation associated with the scenario selected at step S504. That is, when zoom is selected at step S504, for example, such a parameter editing screen as shown in FIG. 31 is displayed in the display monitor 140. Furthermore, when blur is selected at step S504, for example, such a parameter editing screen as shown in FIG. 32 is displayed in the display monitor 140. A photographer performs input in such a parameter editing screen to instruct settings of various still and moving image parameters. For example, in FIG. 31, the photographer can perform input with such a slider as shown at a right end of FIG. 31 by using the touch panel 150, select a parameter to be edited or change numerical value by using the cross button 21 of the operation SW 160, or change each numerical value by appropriate use of the main dial 12 and the sub-dial 13 of the operation SW 160. The control microcomputer 101 sets various kinds of parameters concerning the still and moving image based on an instruction from the photographer. After step S506, the processing returns to the main flow described with reference to FIG. 22.

On the other hand, if the control microcomputer 101 determined that the current mode is not the still and moving image, the processing advances to step S508. At step S508, the control microcomputer 101 configures various settings other than the still and moving image. A description on these settings will be omitted here. After step S508, the processing returns to the main flow explained with reference to FIG. 22.

It is to be noted that each scenario of the still and moving image may be associated with selection of the scene mode or the art filter. For example, based on such a correspondence relationship as shown in the following Table 2, the settings can be configured by selecting the scene mode or the art filter.

TABLE 2

| Shooting mode | Mode/filter type | Scenario |
| --- | --- | --- |
| Scene mode | Auto mode | Zoom |
|  | Portrait mode | Flashback |
|  | Sports mode | Slow motion |
|  | Candle | Echo |
|  | Night view mode | Echo |
|  | Landscape mode | Blur |
|  | Macro mode | Pop art |
| Art filter | Pop art | Pop art |
|  | Grainy film | Grainy film |
|  | Gentle sepia | Gentle sepia |

Again referring to FIG. 22, the description of the main flow will be continued. The control microcomputer 101 advances to step S136 after the menu setting operation processing. If it is determined that the menu button is not ON at step S132, the processing advances to step S136. At step S136, the control microcomputer 101 determines whether the reproduction button is ON. If the reproduction button is ON, the processing advances to step S138. At step S138, the control microcomputer 101 executes reproducing operation processing.

Figure 33:
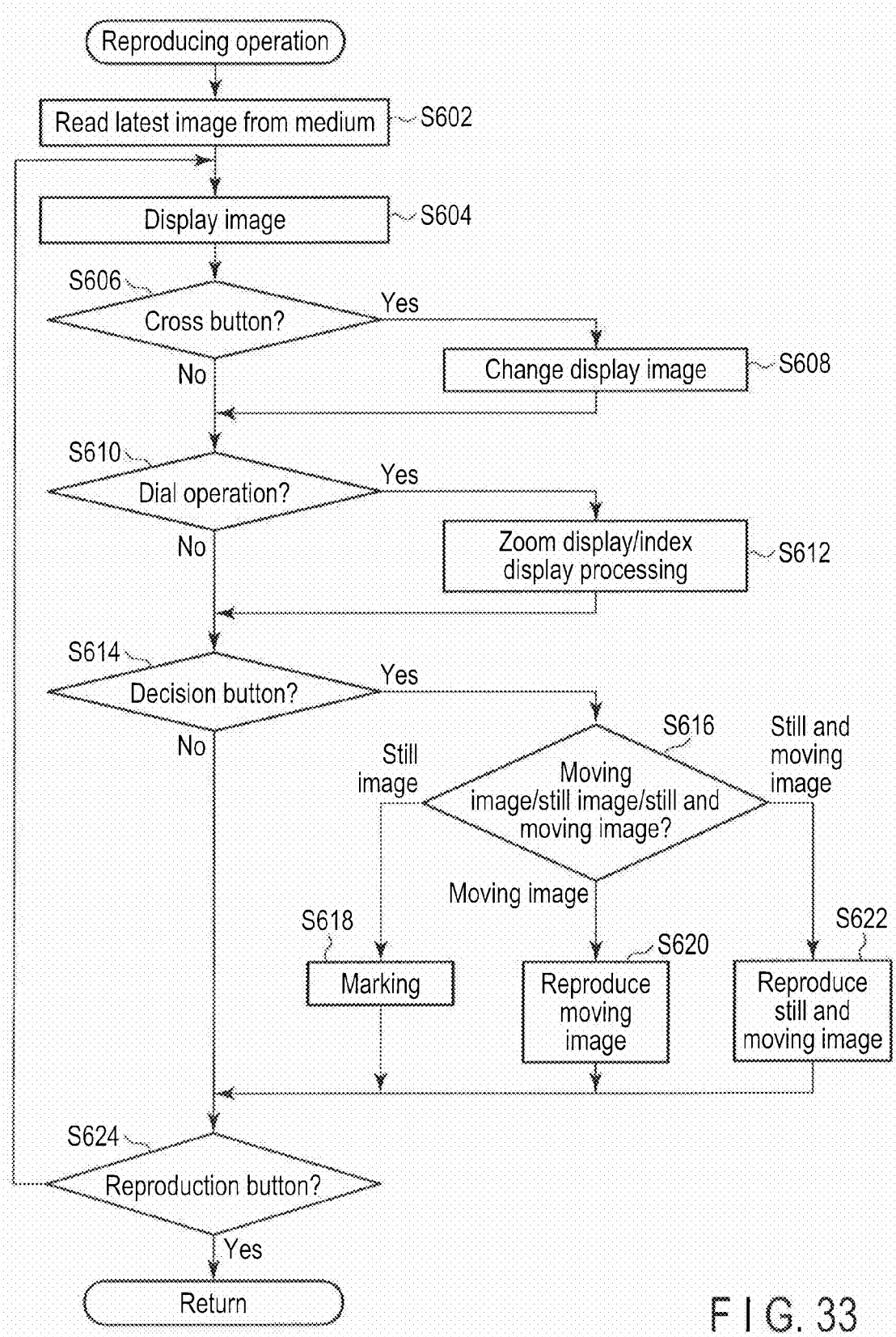
FIG. 33 is a flowchart showing an example of a reproducing operation processing executed by the digital camera according to the embodiment.

The reproducing operation processing will now be described with reference to FIG. 33. At step S602, the control microcomputer 101 reads the latest image data from the recording medium 131. At step S604, the control microcomputer 101 displays the read image in the display monitor 140. At step S606, the control microcomputer 101 determines whether the cross button of the operation SW 160 has been operated. If it is determined that the cross button has not been operated, the processing advances to step S610. On the other hand, if it is determined that the cross button has been operated, the processing advances to step S608. At step S608, the control microcomputer 101 changes a display image to be displayed in the display monitor 140. Thereafter, the processing advances to step S610.

At step S610, the control microcomputer 101 determines whether the dial operation has been performed. If it is determined that the dial operation has not been performed, the processing advances to step S614. If it is determined that the dial operation has been performed, the processing advances to step S612. At step S612, the control microcomputer 101 executes zoom display of a display image or index display in the display monitor 140. Then, the processing advances to step S614. The index display is a display method of displaying a list of simplified images (thumbnail images, screen nail images) in a matrix form of, e.g., 2×2, 3×3, 4×4, or 5×5 in the display monitor 140.

At step S614, the control microcomputer 101 determines whether the decision button has been pressed. If it is determined that the decision button has not been pressed, the processing advances to step S624. On the other hand, if it is determined that the decision button has been pressed, the processing advances to step S616.

At step S616, the control microcomputer 101 determines which one of a still image, a moving image, and a still and moving image a selected image corresponds to. If a still image is determined, the processing advances to step S618. At step S618, the control microcomputer 101 carries out marking with respect to the image for which the decision button was pressed. Then, the processing advances to step S624.

If the control microcomputer 101 determined the moving image at step S616, the processing advances to step S620. At step S620, the control microcomputer 101 displays the moving image in the display monitor 140. Thereafter, the processing advances to step S624.

If the control microcomputer 101 determined the still and moving image at step S616, the processing advances to step S622. At step S622, the control microcomputer 101 displays the still and moving image on the display monitor 140. Subsequently, the processing advances to step S624. It is to be noted that, in reproduction of the still and moving image file, reproducing the still and moving image file as the still and moving image described above or reproducing a still image portion in the still and moving image file as a still image may be selected.

At step S624, the control microcomputer 101 determines whether the reproduction button has been again pressed. If it is determined that the reproduction button has not been pressed, the processing returns to step S604. On the other hand, if it is determined that the reproduction button has been pressed, the processing returns to the main flow described with reference to FIG. 22.

Again referring to FIG. 22, the description of the main flow will be continued. The control microcomputer 101 advances the processing to step S140 after the reproducing operation processing. At step S136, if it is determined that the reproduction button is not ON, the processing advances to step S140. At step S140, the control microcomputer 101 determines whether the power supply is ON. If the power supply is determined to be ON, the processing returns to step S108. On the other hand, if the power supply is determined to be not ON, the processing advances to step S142. At step S142, the control microcomputer 101 stops supply of electric power, and the processing returns to step S104.

Figure 34:
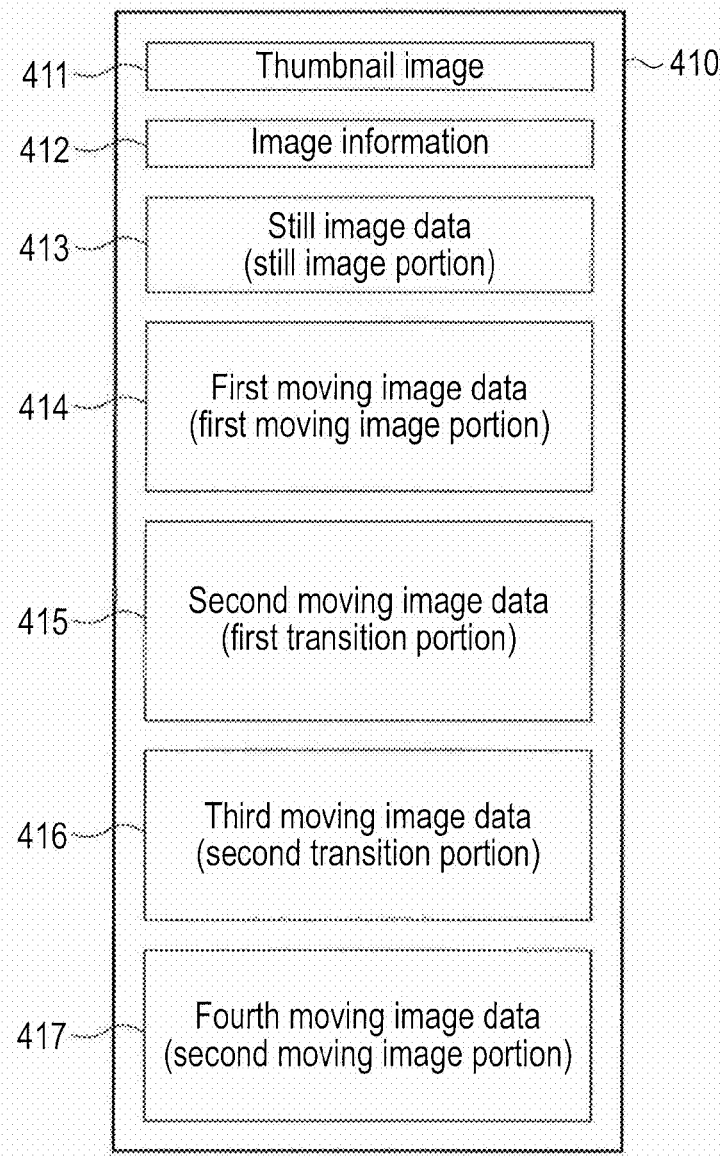
FIG. 34 is a block diagram showing an example of a file configuration of a still and moving image created by the digital camera according to the embodiment.

Based on the above-described operation, the digital camera 1 creates a still image file, a moving image file, and a still and moving image file, and records the files in the recording medium 131. Furthermore, the digital camera 1 reproduces the still image file, the moving image file, and the still and moving image file. Here, a configuration of the still image file will now be described. FIG. 34 shows an example of a configuration of the still and moving image file. The still and moving image file 410 includes a thumbnail image 411, image information 412, still image data 413, first moving image data 414 constituting the first moving image portion, second moving image data 415 constituting the first transition portion, third moving image data 416 constituting the second transition portion, and fourth moving image data 417 constituting the second moving image portion.

The thumbnail image 411 is a thumbnail image associated with the still image data 413. The thumbnail image is also referred to as a screen nail image, and it is a simplified image used in the index display and also an image generated by compressing the still image data 413. The image information 412 includes various kinds of information conforming to the Exif standard. The still image data 413 is a still image constituting the still image portion of the still and moving image, and it is an image in e.g., the JPEG format. Each of the first moving image data 414, the second moving image data 415, the third moving image data 416, and the fourth moving image data 417 is a moving image in, e.g., the MPEG format.

It is to be noted that the fourth moving image data 417 may not be present depending on a type of the still and moving image, like "pop art", for example. Data of the fade-in portion or the fade-out portion may be included in adjacent moving image data, or it may be further provided as independent data. Moreover, for example, the first moving image portion and the first transition portion may be integrated as one piece of data as the first special effect moving image data without separating them. Information such as a reproduction order of the first moving image data 414, the second moving image data 415, the still image data 413 having a predetermined time, the third moving image data 416, and the fourth moving image data 417 required for reproducing these pieces of data as the still and moving image file is recorded in the image information 412.

Figure 35:
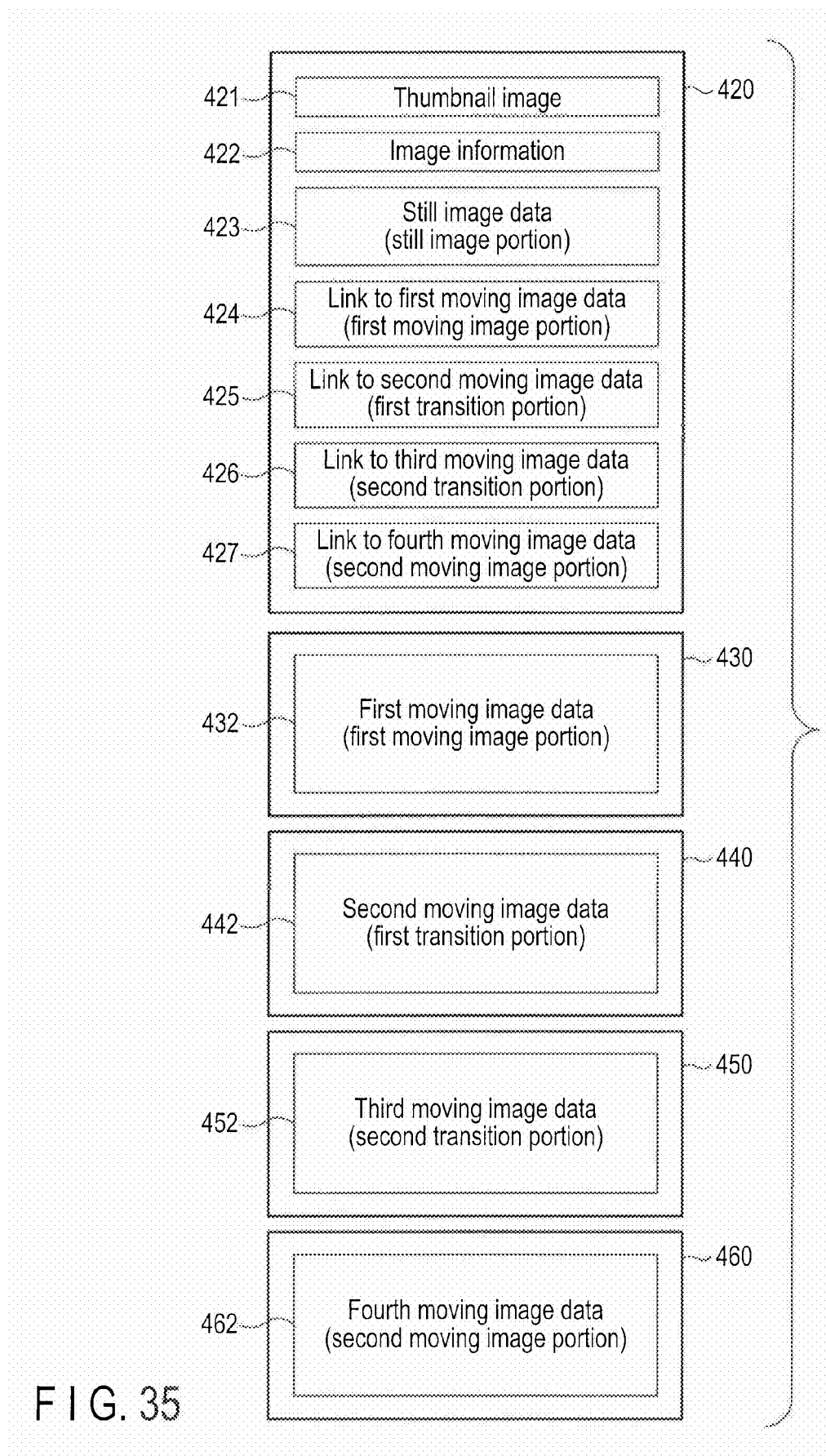
FIG. 35 is a block diagram showing another example of a file configuration of a still and moving image created by the digital camera according to the embodiment.

FIG. 35 shows another example of the configuration of the still and moving image file. In this example, a first moving image portion, a second transition portion, and a second moving image portion are configured as files different from a still and moving image file 420. That is, aside from the still and moving image file 420, a first file 430 including first moving image data 432, a second file 440 including second moving image data 442 constituting the first transition portion, a third file 450 including third moving image data 452 constituting the second transition portion, and a fourth file 460 including fourth moving image data 462 constituting the second moving image portion are present. The still and moving image file 420 further comprises a thumbnail image 421, image information 422, and a still image 423. Furthermore, the still image file 420 has a link 424 to the first moving image data 432 of the first file 430, a link 425 to the second moving image data 442 of the second file 440, a link 426 to the third moving image data 452 of the third file 450, and a link 427 to the fourth moving image data 462 of the fourth file 460.

It is to be noted that the fourth file 460 may not be present depending on a type of the still and moving image, e.g., the pop art. Data in the fade-in portion or the fade-out portion may be included in adjacent moving image data, or it may be provided as independent data. Additionally, for example, the first moving image portion and the first transition portion may be integrated as one piece of data as the first special effect moving image data without separating them. Information such as a reproduction order of the first moving image data 432, the second moving image data 442, the still image data 423 having a predetermined time, the third moving image data 452, and the fourth moving image data 462 required for reproducing these pieces of data as the still and moving image file is recorded in the image information 422.

Further, the still and moving image may be edited into one general moving image file, and it may be recorded as a moving image file. When the still and moving image is recorded as the general moving image file, general versatility, e.g., browsing using the WEB is enhanced.

[Modification]

A modification of the foregoing embodiment will now be described with reference to the drawings. In the foregoing embodiment, a special effect moving image portion and others are generated at the time of shooting, and a still and moving image is created. On the other hand, in this modification, a special effect moving image portion and others are generated at the time of reproduction, and a still and moving image is created and reproduced. FIG. 36 shows a structural example of a still and moving image file according to this modification. As shown in this drawing, a still and moving image file 510 includes a thumbnail image 511, image information 512, image identification information 513, still image data 514, still image timing information 515, and moving image data 516. The thumbnail image 511 is a thumbnail image associated with the still image data 514. The image information 512 includes various kinds of information conforming to the Exif standard. The image identification information 513 includes identification information indicative of any one of a still image file, a moving image file, and a still and moving image file. This image identification information 513 is used when an icon is displayed to be superimposed on a thumbnail image so that a user can recognize an image type at a glance at the time of the index display that a list of images is displayed (see step S612). The still image data 514 is a still image constituting a still image portion of the still and moving image, and it is, e.g., an image of the JPEG format. The still image timing information 515 records information concerning a timing of the still image relative to a moving image. The moving image data 516 is moving image data that is used for generating a first special effect moving image portion and a second special effect moving image portion, and it is, e.g., a moving image of the MPEG format.

Moreover, FIG. 37 shows another structural example of the still and moving image file according to this modification. As shown in this drawing, in this file configuration, the moving image in the data described with reference to FIG. 36 is configured as a moving image file 530 including moving image data 532, which is a file different from the still and moving image file 520. Therefore, the still and moving image file 520 includes moving image link information 526 in which link information to the moving image file 530 including the moving image data 532 is recorded. The remaining configuration is the same as the still and moving image file described with reference to FIG. 36. That is, the still and moving image file 520 further includes a thumbnail image 521, image information 522, image identification information 523, still image data 524, and still image timing information 525.

Figure 38B:
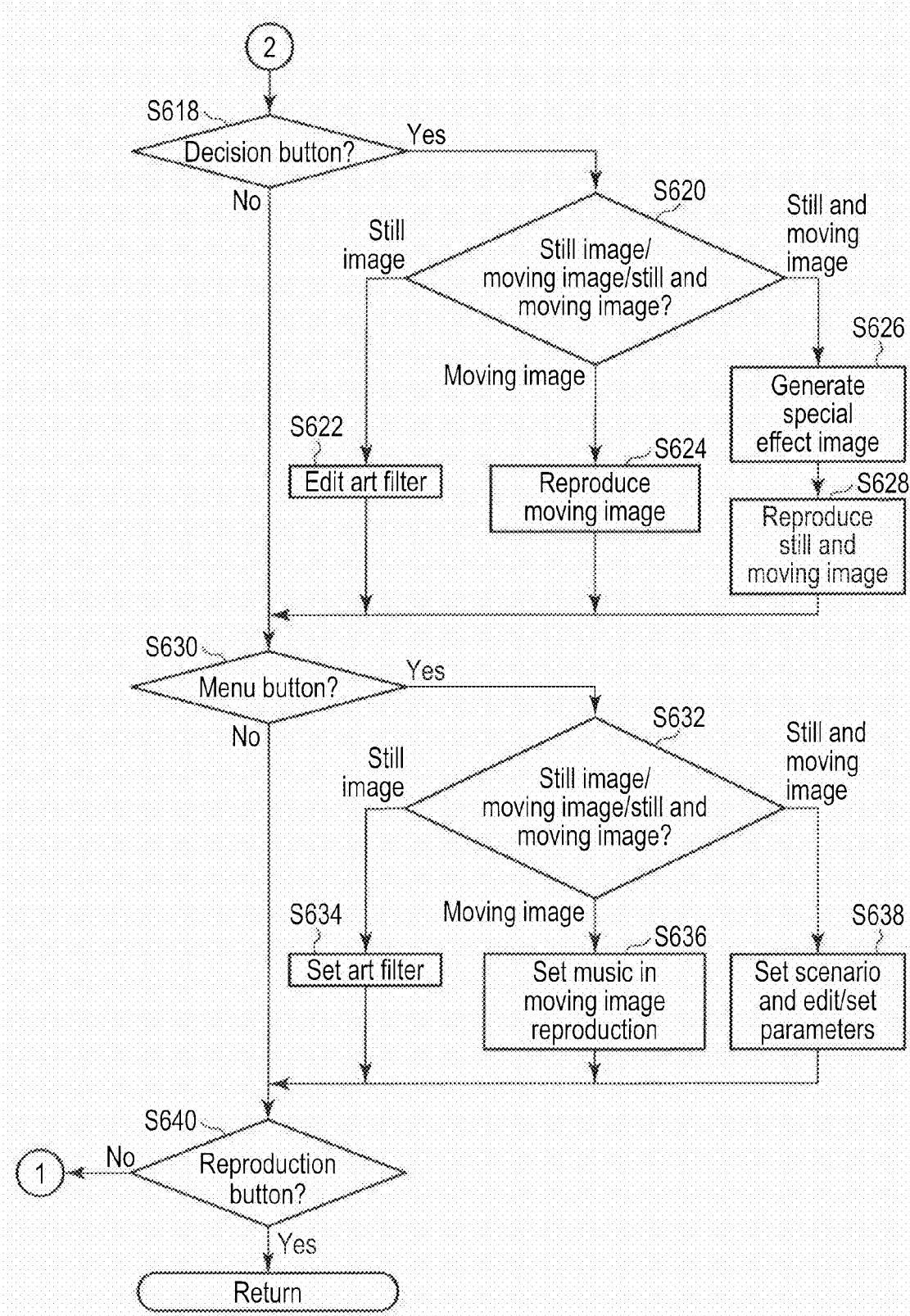

Reproducing operation processing according to this modification will now be described with reference to FIGS. 38A and 38B. At step S602, the control microcomputer 101 reads the latest image data from the recording medium 131. At step S604, the control microcomputer 101 displays the read image in the display monitor 140. At step S606, the control microcomputer 101 determines whether a cross button 21 of the operation SW 160 has been operated. If it is determined that the cross button 21 has not been operated, the processing advances to step S614. On the other hand, if it is determined that the cross button 21 has been operated, the processing advance to step S608.

At step S608, the control microcomputer 101 changes a display image to be displayed in the display monitor 140. Thereafter, the processing advances to step S610. At step S610, the control microcomputer 101 determines whether the image is a moving image or a still and moving image. If it is determined that the image is not a moving image nor a still and moving image, the processing advances to step S614. On the other hand, if it is determined that the image is a moving image or a still and moving image, the processing advances to step S612. At step S612, the control microcomputer 101 displays information indicative of a type of the image, i.e., a moving image or a still and moving image, or a type of the still and moving image in the display monitor 140. Thereafter the processing advances to step S614.

At step S614, the control microcomputer 101 determines whether a dial operation has been performed. If it is determined that the dial operation has not been performed, the processing advances to step S618. If it is determined that the dial operation has been performed, the processing advances to step S616. At step S616, the control microcomputer 101 performs zoom display of a display image or index display in the display monitor 140. Then, the processing advances to step S618.

At step S618, the control microcomputer 101 determines whether the decision button has been pressed. If it is determined that the decision button has not been pressed, the processing advances to step S630. On the other hand, if it is determined that the decision button has been pressed, the processing advances to step S620. At step S620, the control microcomputer 101 determines which one of a still image, a moving image, and a still and moving image a selected image corresponds to. If a still image is selected, the processing advances to step S622. At step S622, the control microcomputer 101 allows the image processing IC 102 to perform editing concerning the art filter as required, thereby displaying an edited image in the display monitor 140. Display may be carried out in the form of slide-show display for a predetermined time. Then, the processing advances to step S630.

If it is determined that the control microcomputer 101 determined that the image is a moving image at step S620, the processing advances to step S624. At step S624, the control microcomputer 101 displays a moving image in the display monitor 140. Thereafter, the processing advances to step S630.

If the control microcomputer 101 determined the still and moving image at step S620, the processing advances to step S626. At step S626, the control microcomputer 101 allows the image processing IC 102 to generate a first special effect moving image portion, a still image portion, and a second special effect moving image portion, thereby creating a still and moving image. At step S628, the control microcomputer 101 displays the still and moving image created at step S628 in the display monitor 140. Then, the processing advances to step S630.

At step S630, the control microcomputer 101 determines whether the menu button has been pressed. If it is determined that the menu button has not been pressed, the processing advances to step S640. On the other hand, if it is determined that the menu button has been pressed, the processing advances to step S632.

At step S632, the control microcomputer 101 determines which one of a still image, a moving image, and a still and moving image a selected menu corresponds to. If it is determined that the selected menu is a still image, the processing advances to step S634. At step S634, the control microcomputer 101 sets the art filter. Thereafter, the processing advances to step S640.

At step S632, if the control microcomputer 101 determined that the selected menu is a moving image, the processing advances to step S636. At step S636, the control microcomputer 101 sets music at the time of moving image reproduction. Then, the processing advances to step S640.

At step S632, if the control microcomputer 101 determined that the selected menu is a still and moving image, the processing advances to step S638. At step S638, the control microcomputer 101 sets a type of the still and moving image or sets various kinds of parameters concerning the still and moving image. Thereafter, the processing advances to step S640.

At step S640, the control microcomputer 101 determines whether the reproduction button has been again pressed. If it is determined that the reproduction button has not been pressed, the processing returns to step S604. On the other hand, if it is determined that the reproduction button has been pressed, the processing returns to the main flow described with reference to FIG. 22. According to this modification, any other portion functions in the same manner and exercises the same effect as the foregoing embodiment.

As described above, according to this embodiment and its modification, a still and moving image having moving images that flatter a still image added before and after the still image is created. In the still and moving image, since the still image is flattered by the moving images, the still and moving image becomes a more impressive picture for a viewer as compared with a picture including a still image alone.

It is to be noted that various kinds of processing described with reference to the flowcharts are examples, and a processing order and others can be appropriately changed as long as consistency is maintained as a matter of course. Furthermore, the foregoing embodiments and modifications can be selectively executed by one digital camera as a matter of course.

In the foregoing embodiment, although the digital camera that creates still and moving images is taken as an example and has been described, it can be adapted to various kinds of apparatuses that create a still and moving image from information including a still image and moving images that are continuously obtained. That is, for example, a personal computer or a smartphone provided with a program configured to create a still and moving image fetches data of a still image and moving images shot by a digital camera in advance, and the personal computer or the smartphone can create or reproduce a still and moving image. Moreover, a smartphone or a tablet having a shooting function may perform shooting and create a still and moving image. As described above, the same function and the same effect can be obtained even if any device other than the digital camera is used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus which generates one piece of image including a moving image and a still image which are continuously shot, the apparatus comprising:
    an imaging unit configured to acquire the moving image and the still image;
    a still image acquisition instruction unit configured to instruct to acquire the still image;
    a moving image acquisition start instruction unit configured to instruct to start acquisition of the moving image prior to acquisition of the still image;
    a time measuring unit configured to measure a time from a start of acquisition of the moving image to acquisition of the still image and output the measured time;
    a moving image time determination unit configured to determine a moving image time which is a time of the moving image included in the one piece of image based on a result of the time measurement performed by the time measuring unit;
a storage unit configured to temporarily store the still image and the moving image; and
a control unit configured to cause the storage unit to continuously store the moving image irrespective of the instruction from the still image acquisition instruction unit when a time elapsed from the start of acquisition of the moving image is less than a minimum time set for the moving image time.

2. An imaging apparatus which generates one piece of image including a moving image and a still image which are continuously shot, the apparatus comprising:
an imaging unit configured to acquire the moving image and the still image;
a still image acquisition instruction unit configured to instruct to acquire the still image;
a moving image acquisition start instruction unit configured to instruct to start acquisition of the moving image prior to acquisition of the still image;
a time measuring unit configured to measure a time from a start of acquisition of the moving image to acquisition of the still image and output the measured time; and
a moving image time determination unit configured to determine a moving image time which is a time of the moving image included in the one piece of image based on a result of the time measurement performed by the time measuring unit;
wherein a maximum time is set for the moving image time, and
the moving image time determination unit determines the moving image time as the maximum time when a time elapsed from the start of acquisition of the moving image exceeds a predetermined time.

3. An imaging apparatus which generates one piece of image including a moving image and a still image which are continuously shot, the apparatus comprising:
an imaging unit configured to acquire the moving image and the still image;
a still image acquisition instruction unit configured to instruct to acquire the still image;
a moving image acquisition start instruction unit configured to instruct to start acquisition of the moving image prior to acquisition of the still image;
a time measuring unit configured to measure a time from a start of acquisition of the moving image to acquisition of the still image and output the measured time;
a moving image time determination unit configured to determine a moving image time which is a time of the moving image included in the one piece of image based on a result of the time measurement performed by the time measuring unit;
a storage unit configured to temporarily store the still image and the moving image;
a control unit configured to cause the storage unit to continuously store the moving image irrespective of the instruction from the still image acquisition instruction unit when a time elapsed from the start of acquisition of the moving image is less than a minimum time; and
a special effect processing unit configured to create a special effect still image by executing one selected from pieces of still image special effect processing with respect to the still image,
wherein the moving image time determination unit determines a minimum time and a maximum time in accordance with the selected still image special effect processing, and determines the moving image time as the maximum time when a time elapsed from the start of acquisition of the moving image exceeds a predetermined time.

4. An image generation method of generating one piece of image including a moving image and a still image which are continuously shot, the method comprising:
acquiring the moving image and the still image;
instructing to acquire the still image;
instructing to start acquisition of the moving image prior to acquisition of the still image;
measuring a time from a start of acquisition of the moving image to acquisition of the still image and outputting the measured time;
determining a moving image time which is a time of the moving image included in the one piece of image based on an output of the time measurement;
setting a minimum time for the moving image time;
temporarily storing the still image and the moving image; and
continuously storing the moving image irrespective of the instruction to acquire the still image when a time elapsed from the start of acquisition of the moving image is less than the minimum time.

5. An image generation method of generating one piece of image including a moving image and a still image which are continuously shot, the method comprising:
acquiring the moving image and the still image;
instructing to acquire the still image;
instructing to start acquisition of the moving image prior to acquisition of the still image;
measuring a time from a start of acquisition of the moving image to acquisition of the still image and outputting the measured time;
determining a moving image time which is a time of the moving image included in the one piece of image based on an output of the time measurement;
setting a maximum time for the moving image time, and
determining the moving image time as the maximum time when a time elapsed from the start of acquisition of the moving image exceeds a predetermined time.

6. An image generation method of generating one piece of image including a moving image and a still image which are continuously shot, the method comprising:
acquiring the moving image and the still image;
instructing to acquire the still image;
instructing to start acquisition of the moving image prior to acquisition of the still image;
measuring a time from a start of acquisition of the moving image to acquisition of the still image and outputting the measured time;
determining a moving image time which is a time of the moving image included in the one piece of image based on an output of the time measurement;
temporarily storing the still image and the moving image;
continuously storing the moving image irrespective of the instruction to acquire the still image when a time elapsed from the start of acquisition of the moving image is less than a minimum time; and
creating a special effect still image by executing one selected from pieces of still image special effect processing with respect to the still image; and
determining the minimum time and a maximum time in accordance with the selected still image special effect processing, and determining the moving image time as the maximum time when a time elapsed from the start of acquisition of the moving image exceeds a predetermined time.

* * * * *